United States Patent
Lin et al.

(10) Patent No.: US 11,601,972 B2
(45) Date of Patent: Mar. 7, 2023

(54) METHOD AND APPARATUS FOR SENDING AND RECEIVING SIGNALING IN WIRELESS LOCAL AREA NETWORK

(71) Applicant: Huawei Technologies Co., Ltd., Shenzhen (CN)

(72) Inventors: Yingpei Lin, Shanghai (CN); Jiayin Zhang, Shanghai (CN); Jun Luo, Kista (SE); Le Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 118 days.

(21) Appl. No.: 16/932,333

(22) Filed: Jul. 17, 2020

(65) Prior Publication Data

US 2020/0351939 A1 Nov. 5, 2020

Related U.S. Application Data

(63) Continuation of application No. 16/411,961, filed on May 14, 2019, now Pat. No. 10,721,768, which is a (Continued)

(30) Foreign Application Priority Data

Oct. 20, 2014 (WO) ................ PCT/CN2014/088972
Dec. 5, 2014 (WO) ................ PCT/CN2014/093183

(51) Int. Cl.
*H04W 74/04* (2009.01)
*H04L 5/00* (2006.01)
(Continued)

(52) U.S. Cl.
CPC ........... *H04W 74/04* (2013.01); *H04L 5/0053* (2013.01); *H04L 5/0092* (2013.01); *H04L 9/40* (2022.05);
(Continued)

(58) Field of Classification Search
CPC .............. H04W 74/04; H04W 72/042; H04W 72/0453; H04W 48/12; H04W 48/17;
(Continued)

(56) References Cited

U.S. PATENT DOCUMENTS 10,342,042 B2 * 7/2019 Lin ...................... H04L 5/0092
10,721,768 B2 * 7/2020 Lin ...................... H04L 5/0092
(Continued)

FOREIGN PATENT DOCUMENTS

CN 102790662 A 11/2012
CN 103534967 A 1/2014
(Continued)

OTHER PUBLICATIONS

US 8,681,884 B2, 03/2014, Srinivasa et al. (withdrawn)
(Continued)

*Primary Examiner* — Jae Y Lee
(74) *Attorney, Agent, or Firm* — Slater Matsil, LLP

(57) ABSTRACT

The method includes generating, by an access point (AP), signaling that includes an AP identifier (ID) field, a bandwidth (BW) field, a guard interval (GI) field, a cyclic redundancy check (CRC) field, and a tail field, the AP ID field is used to indicate an ID of the AP, the BW field is used to indicate bandwidth required for data transmission subsequent to the signaling, the GI is used to indicate a length of a cyclic prefix (CP) required for data transmission subsequent to the signaling, the CRC field is used to guard a field before the CRC field in the signaling, and the Tail field is used to empty an encoder and a decoder, where the CRC field and the Tail field are the last two fields of the signaling. The method also includes sending, by the AP, the signaling.

20 Claims, 46 Drawing Sheets

Related U.S. Application Data continuation of application No. 15/492,053, filed on Apr. 20, 2017, now Pat. No. 10,342,042, which is a continuation of application No. PCT/CN2015/070252, filed on Jan. 7, 2015.

(51) Int. Cl.

| | | |
|---|---|---|
| *H04W 72/04* | (2023.01) | |
| *H04L 9/40* | (2022.01) | |
| *H04L 69/22* | (2022.01) | |
| *H04W 72/0453* | (2023.01) | |
| *H04W 48/12* | (2009.01) | |
| *H04W 48/00* | (2009.01) | |
| *H04L 27/26* | (2006.01) | |
| *H04W 84/12* | (2009.01) | |
| *H04W 88/08* | (2009.01) | |

(52) U.S. Cl.
CPC ........... *H04L 69/22* (2013.01); *H04W 72/042* (2013.01); *H04W 72/0453* (2013.01); *H04L 27/2601* (2013.01); *H04W 48/12* (2013.01); *H04W 48/17* (2013.01); *H04W 84/12* (2013.01); *H04W 88/08* (2013.01)

(58) Field of Classification Search
CPC .... H04W 84/12; H04W 88/08; H04L 5/0053; H04L 5/0092; H04L 29/06; H04L 69/22; H04L 27/2601; H04L 1/0083; H04L 5/0007; H04L 12/28
See application file for complete search history.

(56) References Cited

U.S. PATENT DOCUMENTS

| | | | |
|---|---|---|---|
| 2004/0066769 A1 | 4/2004 | Ahmavaara et al. | |
| 2004/0192294 A1 | 9/2004 | Pan et al. | |
| 2006/0176908 A1 | 8/2006 | Kwon et al. | |
| 2011/0096796 A1 | 4/2011 | Zhang et al. | |
| 2012/0127940 A1 | 5/2012 | Lee et al. | |
| 2012/0269142 A1 | 10/2012 | Porat et al. | |
| 2013/0044743 A1 | 2/2013 | Zhang et al. | |
| 2013/0121244 A1 | 5/2013 | Vermani et al. | |
| 2013/0142095 A1 | 6/2013 | Calcev et al. | |
| 2013/0170411 A1 | 7/2013 | Vermani et al. | |
| 2014/0307645 A1* | 10/2014 | Ji | H04L 1/203 370/329 |
| 2014/0369276 A1* | 12/2014 | Porat | H04L 5/0053 370/329 |
| 2015/0071233 A1 | 3/2015 | Wang et al. | |
| 2015/0085777 A1 | 3/2015 | Seok | |
| 2015/0163028 A1* | 6/2015 | Tandra | H04L 5/0044 370/203 |
| 2015/0207599 A1* | 7/2015 | Kim | H04L 5/0092 370/329 |
| 2015/0327276 A1* | 11/2015 | Rebeiz | H04W 72/0493 370/329 |
| 2016/0234779 A1 | 8/2016 | Kenney et al. | |
| 2017/0303280 A1* | 10/2017 | Chun | H04L 5/0094 |

FOREIGN PATENT DOCUMENTS

| | | |
|---|---|---|
| CN | 103582137 A | 2/2014 |
| CN | 103891342 A | 6/2014 |
| CN | 103959670 A | 7/2014 |
| EP | 1638247 A1 | 3/2006 |
| EP | 2373075 A1 | 10/2011 |
| JP | 2011525773 A | 9/2011 |
| JP | 2013504248 A | 2/2013 |
| JP | 2017535220 A | 11/2017 |
| KR | 20140018390 A | 2/2014 |
| RU | 2292666 C2 | 1/2007 |
| RU | 2304856 C2 | 8/2007 |
| RU | 2364037 C2 | 8/2009 |
| WO | 2012012567 A1 | 1/2012 |
| WO | 2013055117 A2 | 4/2013 |
| WO | 2013064526 A1 | 5/2013 |
| WO | 2013104992 A2 | 7/2013 |
| WO | 2013152111 A1 | 10/2013 |
| WO | 2013157787 A1 | 10/2013 |
| WO | 2013162280 A1 | 10/2013 |
| WO | 2014012406 A1 | 1/2014 |

OTHER PUBLICATIONS

Kamali, B. et al., "Understanding WiMAX: An IEEE-802.16 Standard-Based Wireless Technology", IEEE Potentials, Sep./Oct. 2012, pp. 23-27.

Seok, Y. et al., "HEW PPDU Format for Supporting MIMO-OFDMA," IEEE 802. 11-14/1210r1, Sep. 2014, 16 pages.

IEEE P802.11 ac™/D4.0, Draft STANDARD for Information Technology—Telecommunications and information exchange between systems—Local and metropolitan area networks—Specific requirements, Part 11: Wireless LAN Medium Access Control (MAC) and Physical Layer (PHY) specifications, Amendment 4: Enhancements for Very High Throughput for Operation in Bands below 6 GHz, Oct. 2012, 408 pages.

* cited by examiner

```
┌─────────────────────────────────────────────────────┐
│  An AP generates signaling, where the signaling     │
│  includes an AP ID field, a BW field, a GI field,   │
│  a CRC field, and a tail Tail field, the APP ID     │
│  field is used to indicate an ID of the AP, the     │
│  BW field is used to indicate bandwidth required    │
│  for data transmission subsequent to the signaling, │── S801
│  the GI is used to indicate a length of a CP        │
│  required for data transmission subsequent to the   │
│  signaling, the CRC field is used to guard a field  │
│  before the CRC field in the signaling, and the     │
│  Tail field is used to empty an encoder and a       │
│  decoder, where the CRC field and the Tail field    │
│  are the last two fields of the signaling           │
└─────────────────────────────────────────────────────┘
                          │
                          ▼
┌─────────────────────────────────────────────────────┐
│             The AP sends the signaling              │── S802
└─────────────────────────────────────────────────────┘
```

FIG. 8

A STA receives signaling sent by an access point AP, where the signaling includes an AP ID field, a BW field, a GI field, a CRC field, and a Tail field, the AP ID field is used to indicate an ID of the AP, the BW field is used to indicate bandwidth required for data transmission subsequent to the signaling, the GI is used to indicate a length of a CP required for data transmission subsequent to the signaling, the CRC field is used to guard a field before the CRC field in the signaling, and the Tail field is used to empty an encoder and a decoder, where the CRC field and the Tail field are the last two fields of the signaling — S1801

The STA separately parses the AP ID field, the BW field, and the GI field to obtain the ID of the AP, and the bandwidth and the length of the CP that are required for data transmission subsequent to the signaling, where if the ID of the AP does not match an AP ID associated with the STA, parsing of a field after the AP ID field is stopped — S1802

FIG. 18

| Field | Bits | OFDM symbol |
|---|---|---|
| Tail | 6 bits | Third and fourth OFDM symbol |
| CRC | 8 bits | |
| R | 2 bits | |
| NDP indication | 1 bit | |
| Extra CRC of L-SIG | 2 bits | |
| Smoothing/BF indication | 1 bit | |
| Aggregation indication | 1 bit | |
| Number of spatial streams | 3 bits | |
| STBC indication | 1 bit | First and second OFDM symbol |
| LDPC indication | 1 bit | |
| MCS of a data part | 4 bits | |
| GI of a data part | 2 bits | |
| BW | 2 bits | |
| Uplink/downlink indication | 1 bit | |
| BSSID & PAID | 12 bits | |
| SU/MU | 1 bit | |

FIG. 40e

METHOD AND APPARATUS FOR SENDING AND RECEIVING SIGNALING IN WIRELESS LOCAL AREA NETWORK

CROSS-REFERENCE TO RELATED APPLICATIONS

This application is a continuation of U.S. application Ser. No. 16/411,961, filed on May 14, 2019, which is a continuation of U.S. application Ser. No. 15/492,053, filed on Apr. 20, 2017, now U.S. Pat. No. 10,342,042, which is a continuation of International Application No. PCT/CN2015/070252, filed on Jan. 7, 2015, which claims priority to International Patent Application No. PCT/CN2014/088972, filed on Oct. 20, 2014, and International Application No. PCT/CN2014/093183, filed on Dec. 5, 2014. All of the aforementioned patent applications are hereby incorporated by reference in their entireties.

TECHNICAL FIELD

The present embodiments relate to the communications field, and in particular, to a method and an apparatus for sending and receiving signaling in a wireless local area network.

BACKGROUND

A wireless local area network (WLAN for short) is a network system in which data is transmitted over the air by using a radio frequency technology. With wide application of an intelligent terminal, people have ever-increasing demands for network data traffic, and using the WLAN to bear the traffic has become one of very important manners of transmitting information and data.

For development of a WLAN technology, a standard of the WLAN technology needs to be formulated, popularized, and applied. Institute of Electrical and Electronics Engineers (IEEE for short) 802.11 series are main standards of the WLAN, and go through several generations of mainstream standards such as 802.11, 802.11b/g/a, 802.11n, and 802.11ac.

The WLAN technology is based on a computer network and wireless communications technology, and in a computer network structure, a logical link control (LLC for short) layer and an application layer above the LLC layer may have a same or different requirements for different physical layers (PHY for short). Therefore, a WLAN standard is mainly for the physical layer and a Media Access Control (MAC for short) layer, and relates to a used technical specification and technical standard, such as a radio frequency range and an air interface communications protocol.

A physical layer frame in the WLAN standard may also be referred to as a physical layer convergence procedure (PLCP for short) protocol data unit (PPDU for short), and includes a PLCP header and a PLCP service data unit (PSDU for short). The PLCP header mainly includes a training field and a signaling (SIG for short) field.

Currently, the 802.11ax that is being researched and formulated continues evolving the WLAN technology. In the 802.11ax standard, orthogonal frequency division multiple access (OFDMA for short) is used to improve transmission efficiency. However, there is no OFDMA-based design solution for common signaling in the WLAN system at present.

SUMMARY

Embodiments of the present invention provide a method and an apparatus for sending and receiving signaling in a wireless local area network (WLAN), so as to resolve a prior-art problem that there is no orthogonal frequency division multiple access (OFDMA)-based design solution for common signaling in a WLAN system.

To achieve the foregoing objective, the embodiments of the present invention provide the following solutions.

A first aspect of the disclosure provides a method for sending signaling in a wireless local area network WLAN, where the method includes: generating, by an access point (AP), signaling, where the signaling includes a single-user (SU)/multi-user (MU) field, the SU/MU field is used to indicate whether scheduling transmission is single-user transmission or multi-user transmission. The method also includes if the SU/MU field indicates that this scheduling transmission is single-user transmission, the signaling does not include a high efficiency Wi-Fi Signaling Field 2 (HEW-SIG2) that includes resource indication information. Additionally, the method includes sending, by the AP, the signaling.

A second aspect of the disclosure provides a method for receiving signaling in a wireless local area network WLAN, where the method includes receiving, by a station, signaling, where the signaling includes a SU/MU field, the SU/MU field is used to indicate whether scheduling transmission is single-user transmission or multi-user transmission. The method also includes if the SU/MU field indicates that this scheduling transmission is single-user transmission, the signaling does not include a HEW-SIG2 that includes resource indication information. Additionally, the method includes receiving or sending, by the station, data according to the received signaling.

A third aspect of the disclosure provides an apparatus for sending signaling in a wireless local area network WLAN, where the apparatus includes: a first module, configured to generate, a signaling, where the signaling includes a SU/MU field, the SU/MU field is used to indicate whether scheduling transmission is single-user transmission or multi-user transmission; and if the SU/MU field indicates that this scheduling transmission is single-user transmission, the signaling does not include a HEW-SIG2 that includes resource indication information; a second module, configured to send, the signaling.

A fourth aspect of the disclosure provides an apparatus for receiving signaling in a wireless local area network WLAN, where the apparatus includes: a first module, configured to receive a signaling, where the signaling includes a SU/MU field, the SU/MU field is used to indicate whether scheduling transmission is single-user transmission or multi-user transmission; and if the SU/MU field indicates that this scheduling transmission is single-user transmission, the signaling does not include a HEW-SIG2 that includes resource indication information; a second module, configured to receive or send data according to the received signaling.

The embodiments of the present invention provide a method and an apparatus for sending and receiving signaling in a WLAN, and the method includes: generating, by an AP, signaling, where the signaling includes an AP identifier (ID) field, a bandwidth (BW) field, a guard interval (GI) field, a cyclic redundancy check (CRC) field, and a Tail field, the AP identifier (ID) field is used to indicate an ID of the AP, the BW field is used to indicate bandwidth required for data transmission subsequent to the signaling, the GI field is used to indicate a length of a CP required for data transmission subsequent to the signaling, the CRC field is used to guard a field before the CRC field in the signaling, and the Tail field is used to empty an encoder and a decoder, where the CRC field and the Tail field are the last two fields of the signaling; and sending, by the AP, the signaling. The foregoing solution provides an OFDMA-based design solution for common signaling in a WLAN system, thereby resolving a prior-art problem that there is no OFDMA-based design solution for common signaling in the WLAN system.

BRIEF DESCRIPTION OF THE DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

FIG. 2 is a schematic structural diagram of a signaling field in the 802.11a;

FIG. 4 is a schematic structural diagram of a signaling field in the 802.11a;

FIG. 8 is a schematic flowchart of a method for sending signaling in a WLAN according to an embodiment of the present invention;

FIG. 18 is a schematic flowchart of a method for receiving signaling in a WLAN according to an embodiment of the present invention;

FIG. 40a to FIG. 40m are schematic structural diagrams of HE-SIG-A or HE-SIG-B according to an embodiment of the present invention;

DETAILED DESCRIPTION OF ILLUSTRATIVE EMBODIMENTS

Physical layer frame structures in three generations of typical WLAN standards 802.11a, 802.11n, and 802.11ac are briefly described as follows.

Figure 1:
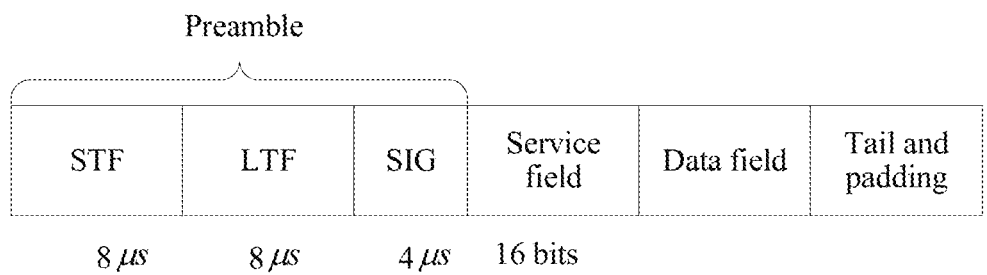
FIG. 1 is a schematic structural diagram of a physical layer frame stipulated in the 802.11a standard.

FIG. 1 is a schematic structural diagram of a physical layer frame stipulated in the 802.11 standard. A physical layer convergence procedure (PLCP) header includes a short training field (STF for short), a long training field (LTF for short), and a signaling (SIG) field. The PLCP header part may also be referred to as a preamble part. The STF is used for data packet detection, automatic gain control (AGC) setting, initial frequency offset estimation, and initial time synchronization. The LTF is located after the STF and is used for channel estimation, and more accurate frequency offset estimation and initial time synchronization. The SIG field is located after the LTF, and includes an orthogonal frequency division multiplexing (OFDM for short) symbol that is used to identify a rate and length information of the data packet.

Figure 2:
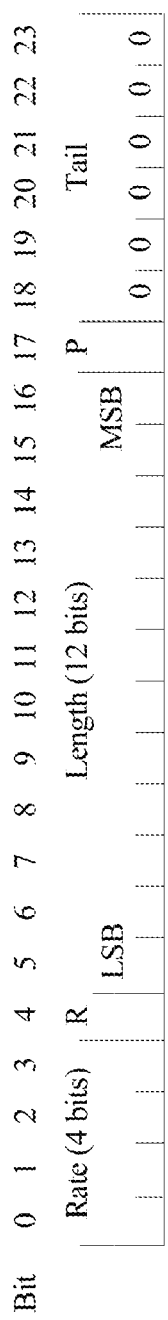

The SIG field in the 802.11a standard includes a single element of $4^{\mu s}$ (an OFDM element of $3.2^{\mu s}$ and a cyclic prefix (CP for short) of $0.8^{\mu s}$). A waveform of the SIG field includes 64 subcarriers, and a location range of the subcarriers of the SIG field is $-32, -31, \ldots, -1, 0, 1, \ldots, 31$. Subcarriers that carry signals are located in a and 0 is a direct current subcarrier. The SIG field is transmitted by means of binary phase shift keying (BPSK for short) modulation and half-rate binary convolutional coding; therefore, as shown in FIG. 2, the SIG includes 24 information bits. Bits 0 to 3 are rate bits and are used to indicate a modulation and coding scheme (MCS for short) used in data part transmission, bit 4 is a reservation bit, and bits 5 to 16 are length bits and are used to indicate a length of data or an amount of data. Bit 5 is a least significant bit (LSB for short), and bit 16 is a most significant bit (MSB for short). Bit 17 is a check bit and is used to perform even parity check on the first 17 bits. Because binary convolutional coding is separately performed on the SIG and the following data part, 6 bits of a tail are set to 0, to empty an encoder and a decoder.

Figure 3:
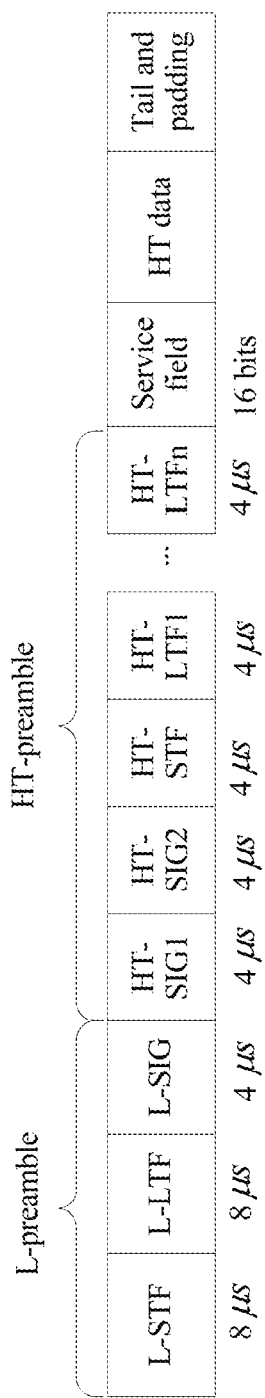
FIG. 3 is a schematic structural diagram of a physical layer frame in a mixed format stipulated in the 802.11n standard.

FIG. 3 is a schematic structural diagram of a physical layer frame in a mixed format stipulated in the 802.11n standard. A PLCP header in a mixed format in the 802.11n includes two parts: a legacy PLCP header and a PLCP header in the 802.11n. The legacy (L for short) herein mainly refers to a PLCP header part in the 802.11a. High throughput (HT for short) herein mainly refers to the PLCP header part in the 802.11n. To ensure backward compatibility, an L-STF in the L-Preamble part is the same as an STF field in a preamble in the 802.11a, an L-LTF field is the same as an LTF field in the preamble in the 802.11a, and an L-SIG field is the same as an SIG field in the preamble in the 802.11a. The HT Preamble part includes an HT-SIG field, an HT-STF, and an HT-LTF. The HT-SIG field includes two OFDM symbols: HT-SIG1 and HT-SIG2, includes new signaling information in the 802.11n standard, and is further used for auto-detection between an 802.11n data packet and a legacy 802.11a data packet. The HT-STF is used to reset an automatic gain. The HT-LTF includes one or more OFDM symbols, and is used for multiple-input multiple-output (MIMO for short) channel estimation. An HT data field is located after the HT-LTF.

Figure 4:
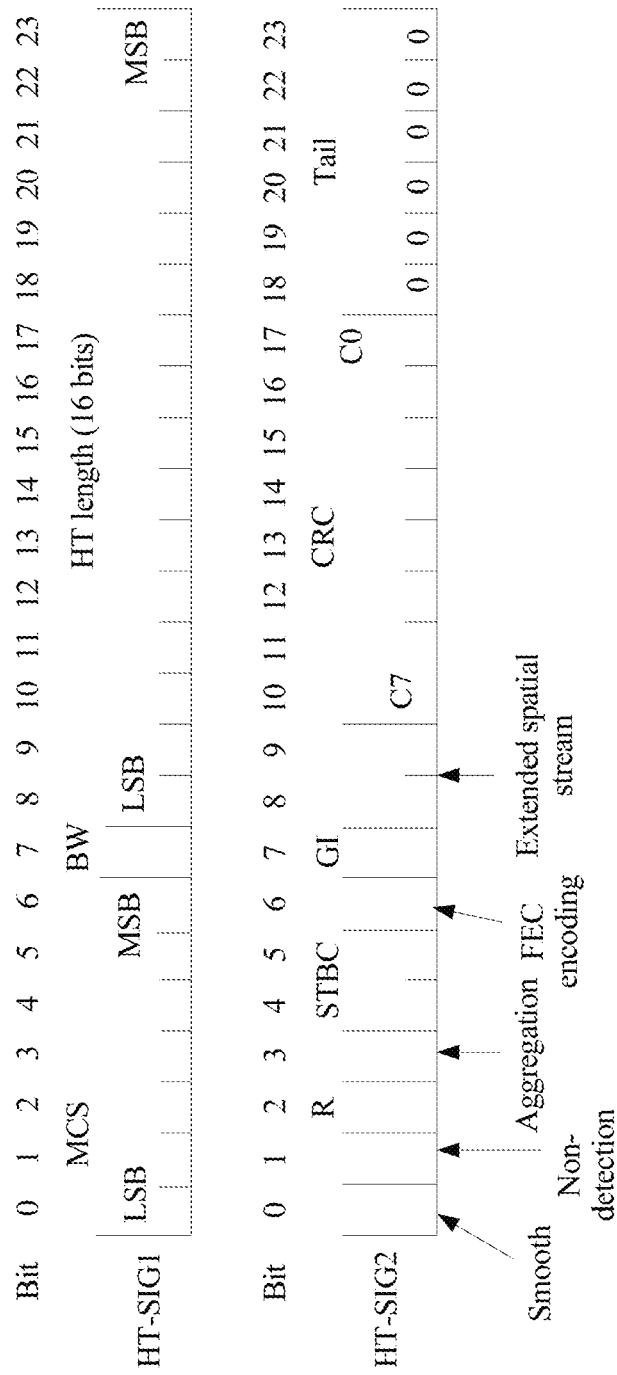

Schematic structural diagrams of the two symbols HT-SIG1 and HT-SIG2 are shown in FIG. 4. Quantities of subcarriers and modulation and coding modes of the HT-SIG1 and the HT-SIG2 are the same as those of SIG in the 802.11a; therefore, each symbol includes 24 information bits, and 6 bits of a tail are set to 0, to empty an encoder and a decoder. In the HT-SIG1, the first 7 bits represent an MCS indication, and one MCS is selected from 0-76 to send a subsequent data part. Bit 7 is used to indicate whether data is sent on a bandwidth of 20 MHz or a bandwidth of 40 MHz. This information can enable a receiver on a bandwidth of 20 MHz to not receive a signal sent on a bandwidth of 40 MHz, thereby reducing power consumption. Bits 8 to 23 are used to indicate a length of data, which ranges from 0 to 65535 bytes. In the HT-SIG2, a smooth field at bit 0, a non-detection field at bit 1, and an extended spatial streams field at bits 8 to 9 are used to indicate information about sending in a beam forming manner, because the 802.11n supports sending in a beam forming manner. Bit 2 is a reservation bit. Bit 3 is an aggregation bit and is used to indicate whether a data part is a single MAC protocol data unit (MPDU) or aggregation of MPDUs (A-MPDU for short). Bits 4 to 5 represent space time block coding (STBC for short), where 0 represents that STBC coding is not performed, 3 is a reserved value, and 1 and 2 are used to indicate differences between different numbers of space time streams and different numbers of spatial streams that are obtained when different MCSs are used. A forward error correction (FEC for short) encoding bit is used to indicate whether an encoding mode of data is binary convolutional coding (BCC for short) or low-density parity-check (LDPC for short) coding. Bit 7 is used to indicate whether a CP in a data transmission part is a short CP ($0.4^{\mu s}$) or a long CP ($0.8^{\mu s}$). Bits 10 to 17 are CRC guard bits and are used to guard bits 0 to 23 of the HT-SIG1 and bits 0 to 9 of the HT-SIG2.

Figure 5:
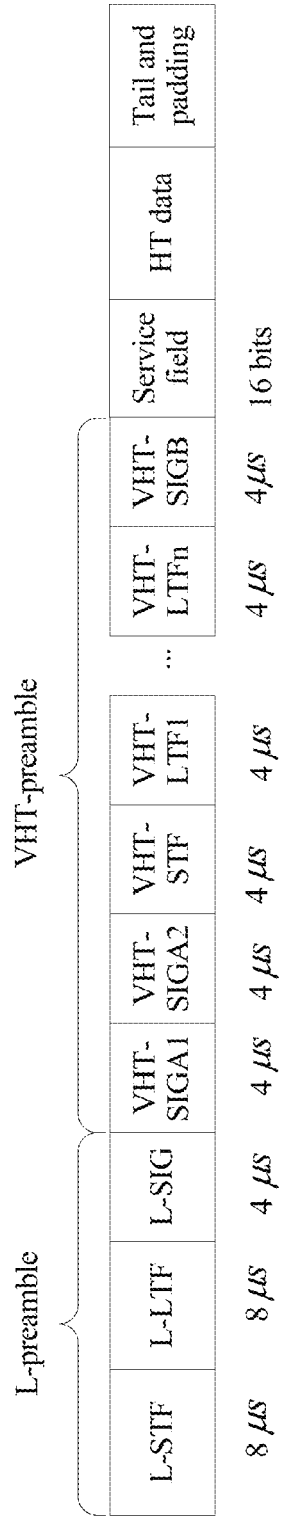
FIG. 5 is a schematic structural diagram of a physical layer frame stipulated in the 802.11ac standard.

FIG. 5 is a schematic structural diagram of a physical layer frame stipulated in the 802.11ac standard. A preamble (or a PLCP header) in the 802.11ac includes two parts: a legacy preamble and a VHT preamble. The L herein mainly refers to a PLCP header part in the 802.11a. The very high throughput (VHT for short) herein refers to a PLCP header part in the 802.11ac. To ensure backward compatibility, the L-Preamble part in the preamble in the 802.11ac is the same as an L-Preamble part in a preamble in the 802.11n. The VHT Preamble part includes a VHT-SIGA field, a VHT-STF, a VHT-LTF, and a VHT-SIGB field. The VHT-SIGA field includes two OFDM symbols: VHT-SIGA1 and VHT-SIGA2, includes new signaling information in the 802.11ac standard, and is further used for auto-detection between an 802.11ac data packet and legacy 802.11a and 802.11n data packets. Structures and functions of the VHT-STF and the VHT-LTF are similar to those of an HT-STF and an HT-LTF. The VHT-SIGB field is a new field in the preamble in the 802.11ac and is used to support a multi-user (MU for short) MIMO function.

Figure 6:
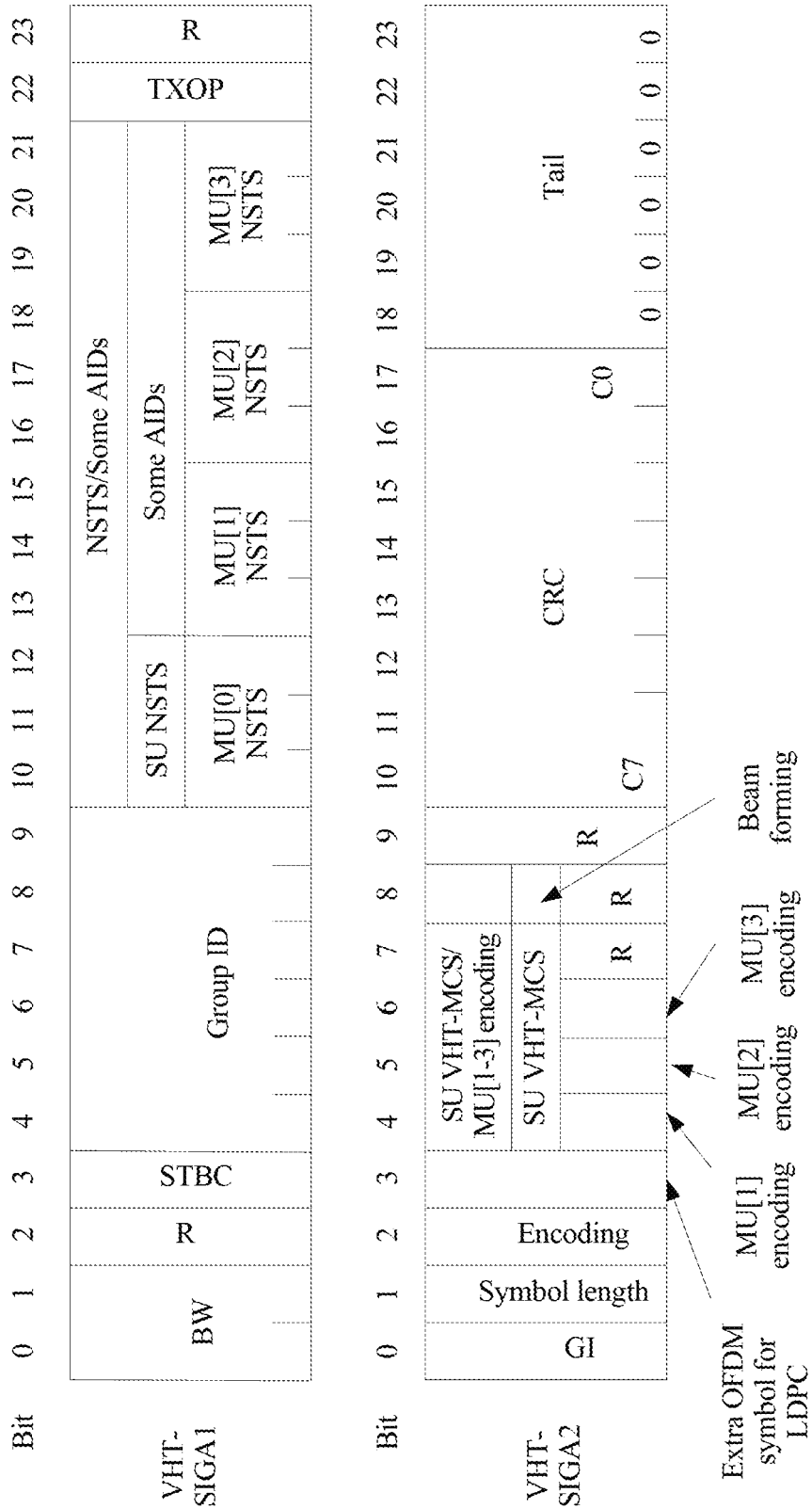
FIG. 6 is a schematic structural diagram of a signaling field in the 802.11ac.

Schematic structural diagrams of the two symbols VHT-SIGA1 and VHT-SIGA2 are shown in FIG. 6. Quantities of subcarriers and modulation and coding modes of the HT-SIG-A1 and the VHE-SIG-A2 are the same as those of SIG in the 802.11a; therefore, each symbol includes 24 information bits, and 6 bits of a tail are set to 0, to empty an encoder and a decoder. In the VHT-SIG-A1, bits 0 to 1 are used to indicate transmission bandwidth of data after the VHT-SIG-A, and 2 bits are used to indicate bandwidths of 20 MHz, 40 MHz, 80 MHz, and 160 MHz. Bit 2 is a reservation bit, and bit 3 is used to indicate whether STBC is used. Bits 4 to 9 are used to indicate groups during MU-MIMO transmission. During single-user (SU for short) transmission, a group identifier (ID for short) in a data packet sent to an access point (AP for short) is 0, and a group ID in a data packet sent by the AP is 1. The rest of bits 4 to 9 indicate groups of MU. For bits 10 to 21, during SU transmission, bits 10 to 12 are used to indicate a number of space time streams (NSTS for short), and bits 13 to 21 are used to indicate some association identifiers (AID for short) of a station (STA for short) and are used by a receive end to determine whether to receive information sent by the STA. During MU transmission, bits 10 to 12, bits 13 to 15, bits 16 to 18, and bits 19 to 21 are separately used to indicate an NSTS carried by data of each user in the group. Bit 22 is used to indicate whether a non-AP STA is allowed to enter a sleep state in a transmission opportunity (TXOP for short). Bit 23 is a reservation bit. In the VHT-SIG-A2, bit 0 is used to indicate whether a CP in a data transmission part after the VHT-SIG-A is a short CP ($0.4^{\mu s}$) or a long CP ($0.8^{\mu s}$). Bit 1 is used to indicate whether a symbol length exceeds a specific value during short CP transmission. Bit 2 is used to indicate an encoding mode. During SU transmission, 0 represents BCC coding, and 1 represents LDPC coding. During MU transmission, when MU[0] NSTS indicated by bits 10 to 12 in the VHT-SIG-A1 is a non-zero value, bit 2 being 0 represents BCC coding, and bit 2 being 1 represents LDPC coding; or when MU[0] NSTS is 0, the bit is a reservation bit. Bit 3 is used to indicate whether an extra OFDM symbol needs to be added when the LDPC coding is used. For bits 4 to 7, during SU transmission, bits 4 to 7 indicate an MCS of data transmission; during MU transmission, multi-user scenarios of bits 4, 5, and 6 are similar to that of bit 2. Bit 8 is used to indicate whether beam forming is used during SU transmission. Bit 9 is a reservation bit. Bits 10 to 17 are consistent with bits 10 to 17 in the HT-SIG2 in the 802.11n, and are used to guard bits 0 to 23 of the VHT-SIG-A1 and bits 0 to 9 of the VHT-SIG-A2.

The following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

To facilitate clear description of the technical solutions in the embodiments of the present invention, words such as "first" and "second" are used in the embodiments of the present invention to distinguish between the same items or similar items that provide basically the same functions or purposes. Persons skilled in the art may understand that the words such as "first" and "second" do not restrict the number and the implementation order.

Embodiment 1

Figure 7:
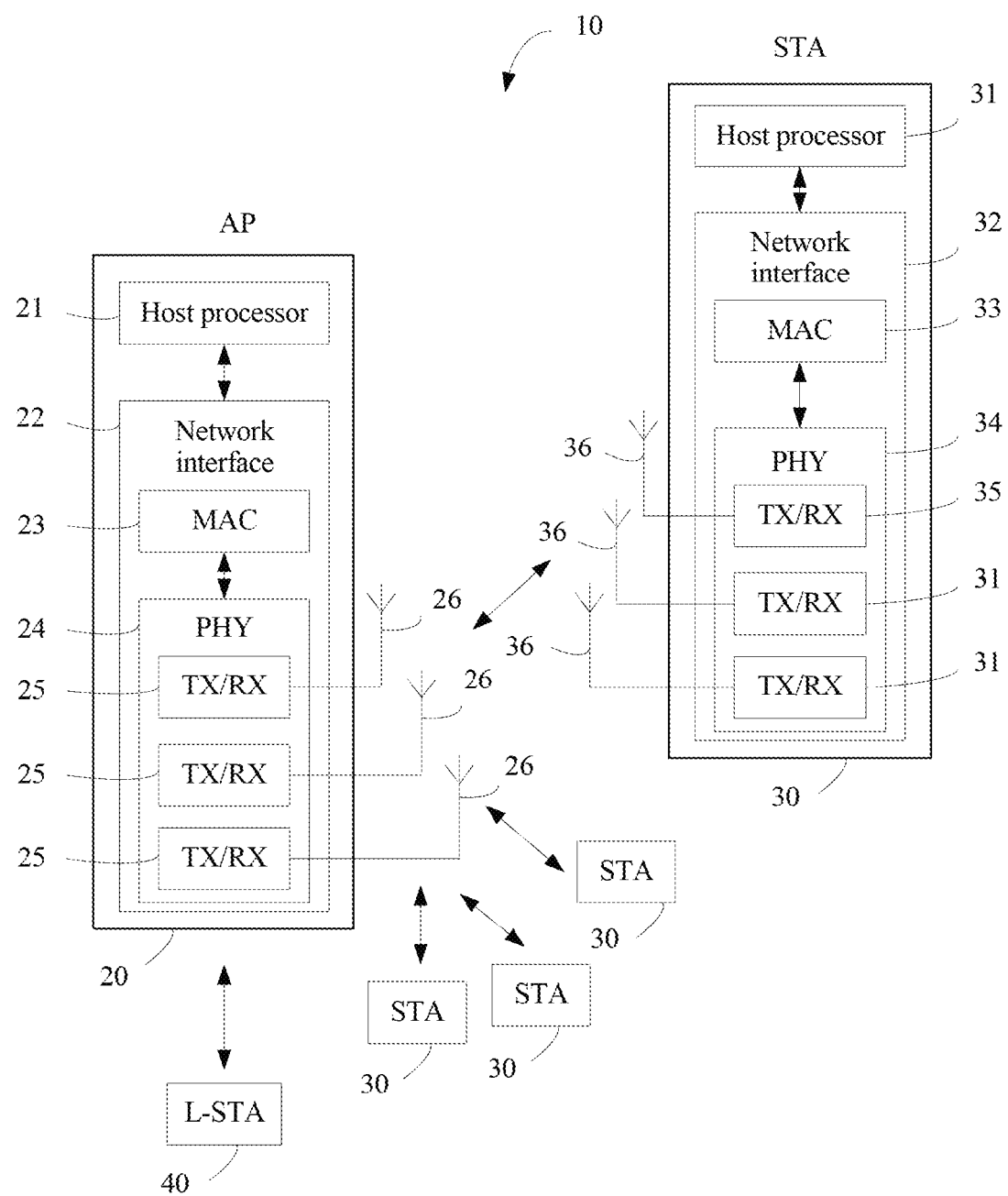
FIG. 7 is a schematic diagram of a network architecture of a wireless local area network (WLAN) according to an embodiment of the present invention.

FIG. 7 is a schematic diagram of a network architecture of a WLAN applied in this embodiment of the present invention, and the network architecture of the WLAN 10 includes an AP 20 and multiple STAs 30. The WLAN 10 supports uplink (UL for short) or downlink (DL) MU MIMO communication between the AP 20 and the multiple STAs 30, and the WLAN 10 supports UL SU communication or DL SU communication between the AP 20 and each STA in the multiple STAs 30.

The AP 20 includes a host processor 21 coupled to a network interface 22. The network interface 22 includes a MAC 23 and a PHY 24. The PHY 24 includes multiple transceivers (transmit/receive, TX/RX for short) 25, and the transceivers 25 are coupled to multiple antennas 26. In this embodiment of the present invention, the MAC 23 and the PHY 24 are configured to perform operations according to a first communications protocol (for example, the IEEE 802.11ax standard that is in a standardization process at present). Certainly, the MAC 23 and the PHY 24 may also be configured to perform operations according to a second communications protocol (for example, the IEEE802.11n standard, the IEEE802.11a standard, and the IEEE802.11ac standard). This is not specifically limited in this embodiment of the present invention. The first communications protocol herein is referred to as a high efficiency wireless local area network (High Efficiency WLAN, HEW) protocol, and the second communications protocol herein is referred to as a legacy protocol.

The STA 30 includes a host processor 31 coupled to a network interface 32, and the network interface 32 includes a MAC 33 and a PHY 34. The PHY 34 includes multiple transceivers 35, and the transceivers 35 are coupled to multiple antennas 36. At least one of the multiple STAs 30 is configured to perform an operation according to the HEW protocol.

Certainly, the WLAN 10 may further include an L-STA 40, where the L-STA 40 is configured to perform an operation according to the legacy protocol instead of the HEW protocol. This is not specifically limited in this embodiment of the present invention.

Persons of ordinary skill in the art easily understand that FIG. 7 merely exemplarily presents a schematic diagram of a possible network architecture of a WLAN. Certainly, another possible architecture may further exist. This is not specifically limited in this embodiment of the present invention.

Persons of ordinary skill in the art easily understand that both a station (STA) side and an AP side may include multiple transceivers and antennas, and FIG. 7 merely exemplarily lists three transceivers and three antennas on the STA side and the AP side separately, but quantities of the transceivers and the antennas are not limited thereto. This is not specifically limited in this embodiment of the present invention.

Persons of ordinary skill in the art easily understand that the WLAN 10 may include multiple STAs 30 and multiple L-STAs 40, and FIG. 7 merely exemplarily lists four STAs 30 and one L-STA 40, but quantities of the STAs 30 and the L-STAs 40 are not limited thereto. This is not specifically limited in this embodiment of the present invention.

FIG. 8 is a method for sending signaling in a WLAN according to an embodiment of the present invention, and the method includes the following.

S801. An AP generates signaling, where the signaling includes an AP ID field, a bandwidth (BW for short) field, a guard interval (GI for short) field, a CRC field, and a tail field, the AP ID field is used to indicate an ID of the AP, the BW field is used to indicate bandwidth required for data transmission subsequent to the signaling, the GI is used to indicate a length of a CP required for data transmission subsequent to the signaling, the CRC field is used to guard a field before the CRC field in the signaling, and the Tail field is used to empty an encoder and a decoder, where the CRC field and the Tail field are the last two fields of the signaling.

S802. The AP sends the signaling.

Preferably, in step S801 of this embodiment of the present invention, the AP ID field may be the first field of the signaling. Therefore, after receiving a data packet sent by the AP, a receive end STA side may first parse the AP ID field, to determine whether the received data packet is a data packet sent by an AP associated with the STA. If the received data packet is the data packet sent by the AP associated with the STA, parsing of the data packet continues. If the received data packet is not the data packet sent by the AP associated with the STA, parsing of the data packet is stopped, thereby saving system resources.

Figure 9:
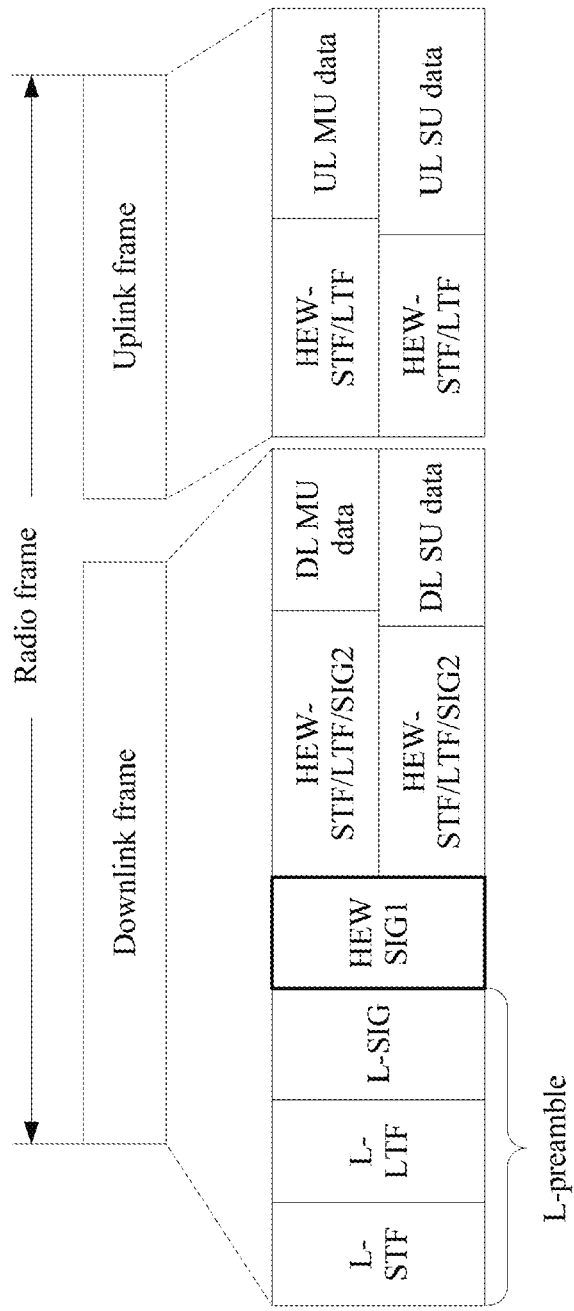
FIG. 9 is a schematic diagram of a location of high efficiency Wi-Fi Signaling Field 1 (HEW-SIG1) in a data frame according to an embodiment of the present invention.

Exemplarily, an example in which the signaling generated by the AP is referred to as HEW-SIG1 is used for description. It is assumed that a location of the HEW-SIG1 in a data frame is shown in FIG. 9, where the HEW-SIG1 is located after an L-Preamble. Therefore, decoding of the HEW-SIG1 is based on channel estimation of the L-Preamble, and transmission parameters of SIG/SIGA in 802.11a, 802.11n, and 802.11ac are still inherited. On a bandwidth of 20 MHz, 52 subcarriers of 64 subcarriers are used as useful subcarriers, including four pilot subcarriers. Those are consistent with transmission parameters of the L-Preamble. The HEW-SIG1 is transmitted by using MCS0, that is, BPSK/quadrature binary phase shift keying (QBPSK for short) modulation, and half-rate BCC coding; therefore, one OFDM symbol carries 24-bit information.

Figure 10:
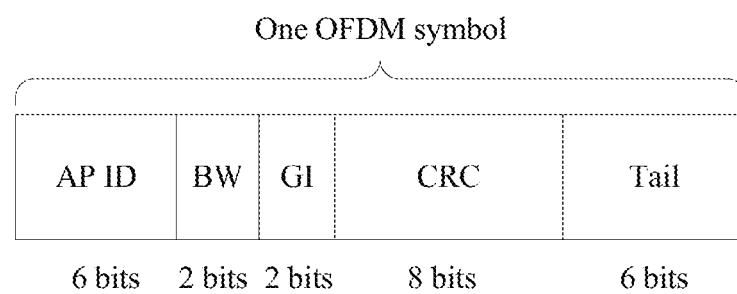
FIG. 10 is a schematic structural diagram 1 of HEW-SIG1 according to an embodiment of the present invention.

As shown in FIG. 10, when the HEW-SIG1 has only one OFDM symbol, except the 8-bit CRC field and the 6-bit Tail field that is used to empty a codec, only 10 bits are available for the AP ID field, the BW field, and the GI field. The BW field and the GI field each need 2 bits, and the AP ID field is 6 bits, and may be used to distinguish IDs of 26=64 different APs.

Specific content of fields carried on the OFDM symbol of the HEW-SIG1 is shown in Table 1. The 6-bit AP ID field is used to represent IDs of 26=64 different APs; the 2-bit BW field is used to represent bandwidth using scenarios for 20 MHz, 40 MHz, 80 MHz, and 160 MHz; the 2-bit GI field is used to indicate four CP lengths, where 0.8 and 1.6 are mandatory, and the rest two may be 0.4, 2.4, 3.2, and the like; and the CRC field and the Tail field are consistent with that of SIG/SIGA in the 802.11n and the 802.11ac.

TABLE 1

| Bit | Field | Quantity of bits | Meaning |
| --- | --- | --- | --- |
| B 0-B 5 | AP ID | 6 | Used to represent an ID of an AP. |
| B 6-B 7 | BW | 2 | 0 represents 20 MHz, 1 represents 40 MHz, 2 represents 80 MHz, and 3 represents 160 MHz. |
| B 8-B 9 | GI | 2 | 0 represents $0.8^{\mu s}$, 1 represents $1.6^{\mu s}$, and 2 represents $3.2^{\mu s}$. |
| B 10-B 17 | CRC | 8 | Used to guard bits 0 to 9. |
| B 18-B 23 | Tail | 6 | Used to empty an encoder and a decoder, and all bits are 0. |

Persons of ordinary skill in the art easily understand that FIG. 10 merely exemplarily presents a possible schematic structural diagram of HEW-SIG1. Certainly, fields in the HEW-SIG1 may be further arranged in another manner. This is not specifically limited in this embodiment of the present invention.

Figure 11:
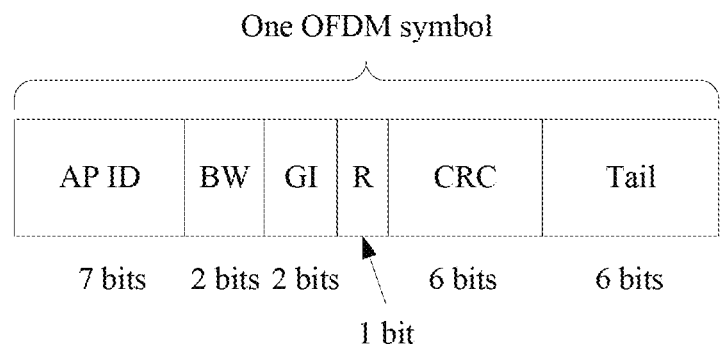
FIG. 11 is a schematic structural diagram 2 of HEW-SIG1 according to an embodiment of the present invention.

Further, because to-be-transmitted information bits are limited, bits of CRC may be compressed, for example, 6 bits are used to perform CRC check, and in this case, 12 bits may be used to carry useful information. The 2-bit BW, the 2-bit GI, and the 7-bit AP ID may be carried, and another possible field of the signaling may be further carried, or the remaining 1 bit is reserved, as shown in FIG. 11. Certainly, if 4 bits are used to perform check, 14 bits may be used to carry useful information. Except the carried 2-bit BW, 2-bit GI, and 7-bit AP ID, 3 bits may be further used to carry extra information or may be used as a reservation field. This is not specifically limited in this embodiment of the present invention.

Further, in the method for sending signaling in a WLAN according to this embodiment of the present invention, the signaling generated in step S801 further includes at least one of the following fields: a next-signaling MCS field, a next-signaling length field, a frame structure indication field, an SU/MU field, a transition time field, a duration field, a forward error correction FEC encoding field, a STA quantity field, or a station identifier (STAID for short) length field, where the next-signaling MCS field is used to indicate a transmission MCS of next signaling, the next-signaling length field is used to indicate a length of the next signaling, the frame structure indication field is used to indicate a frame structure of this scheduling transmission, the SU/MU field is used to indicate whether this scheduling transmission is SU transmission or MU transmission, the transition time field is used to indicate a downlink-uplink transition time point, the duration field is used to indicate a remaining duration of occupying a channel by this scheduling transmission, the FEC encoding field is used to indicate a data encoding mode in this scheduling transmission, the STA quantity field is used to indicate a quantity of STAs in this scheduling transmission, and the STAID length field is used to indicate a length of a STAID of a STA in this scheduling transmission.

Specifically, in addition to the AP ID field, the BW field, the GI field, the CRC field, and the Tail field, there may be multiple other fields in the HEW-SIG1.

Figure 12:
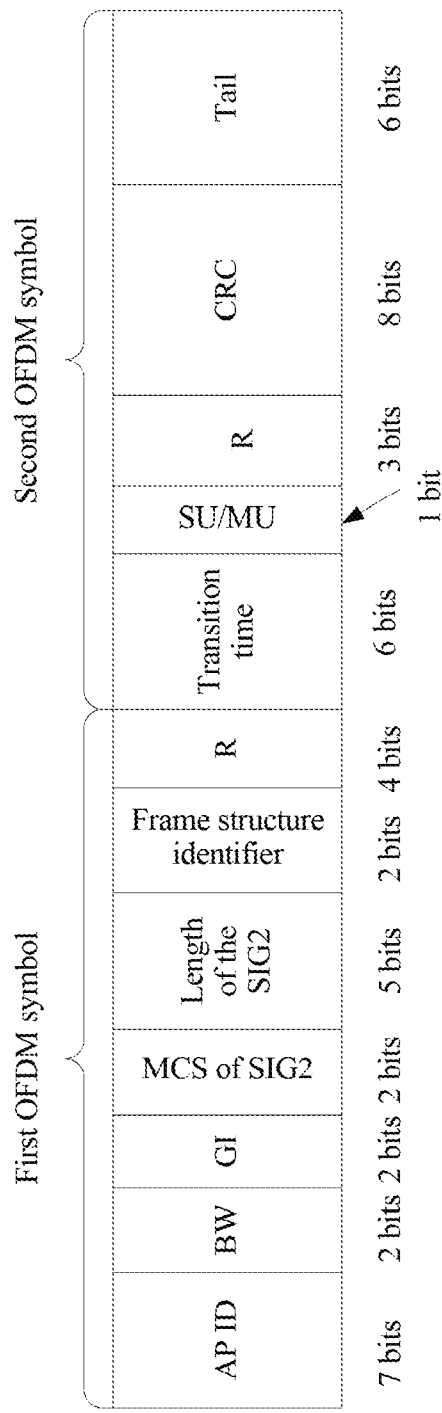
FIG. 12 is a schematic structural diagram 3 of HEW-SIG1 according to an embodiment of the present invention.

Exemplarily, an example in which the next signaling of the HEW-SIG1 is high efficiency Wi-Fi Signaling Field 2 (HEW-SIG2) is used for description. Similarly, it is assumed that a location of the HEW-SIG1 in a data frame is shown in FIG. 9, one OFDM symbol carries 24-bit information, and the HEW-SIG1 includes two $4^{\mu s}$ OFDM symbols. As shown in FIG. 12, the HEW-SIG1 may include an AP ID field, a BW field, a GI field, an HEW-SIG2 MCS field, an HEW-SIG2 length field, a frame structure indication field, a transition time field, an SU/MU field, a CRC field, and a Tail field. An order of the fields and a quantity of bits of each field are shown in FIG. 12.

Specific content of fields carried on a first OFDM symbol and a second OFDM symbol in the HEW-SIG1 are respectively shown in Table 2 and Table 3. The 7-bit AP ID field is used to represent IDs of $2^7=128$ different APs; the 2-bit BW field is used to represent bandwidth using scenarios for 20 MHz, 40 MHz, 80 MHz, and 160 MHz; the 2-bit GI field is used to represent four CP lengths, where 0.8 and 1.6 are mandatory, and the rest two may be 0.4, 2.4, 3.2, and the like; the HEW-SIG2 MCS field and the HEW-SIG2 length field respectively indicate a transmission MCS and a length of the HEW-SIG2; the frame structure indication field is used to indicate an uplink/downlink transmission manner of a frame in this scheduling transmission; the transition time field is used to indicate a downlink-uplink transition time point; the SU/MU field is used to indicate whether this scheduling transmission is SU transmission or MU transmission; and the CRC field and the Tail field are consistent with that of SIG/SIGA in the 802.11n and the 802.11ac.

TABLE 2

| Name | Bit Field | | Quantity of bits | Meaning |
|---|---|---|---|---|
| HEW-SIG1-1 | B 0-B 6 | AP ID | 7 | Used to represent an ID of an AP. |
| | B 7-B 8 | BW | 2 | 0 represents 20 MHz, 1 represents 40 MHz, 2 represents 80 MHz, and 3 represents 160 MHz. |
| | B 9-B 10 | GI | 2 | 0 represents $0.8^{\mu s}$, 1 represents $1.6^{\mu s}$, and 2 represents $3.2^{\mu s}$. |
| | B 11-B 12 | HEW-SIG2 MCS | 2 | Indicating that a transmission MCS of HEW-SIG2 is MCS0-3. |
| | B 13-B 17 | HEW-SIG2 length | 5 | Indicating a length of HEW-SIG2. |
| | B 18-B 19 | Frame structure identifier | 2 | 0 represents DL, 1 represents UL, 2 represents DL + UL, and 3 represents reservation. |
| | B 20-B 23 | Reservation | 4 | |

TABLE 3

| Name | Bit Field | | Quantity of bits | Meaning |
|---|---|---|---|---|
| HEW-SIG1-1 | B 0-B 5 | Transition time | 6 | Indicating a downlink-uplink transition time point. |
| | B 6 | SU/MU | 1 | 0 represents SU transmission, and 1 represents MU transmission. |
| | B 7-B 9 | Reservation | 3 | |
| | B 10-B 17 | CRC | 8 | Used to guard bits 0 to 33 of the HEW-SIG1. |
| | B 18-B 23 | Tail | 6 | Used to empty an encoder and a decoder, and all bits are 0. |

Persons of ordinary skill in the art easily understand that FIG. 12 merely exemplarily presents a possible schematic structural diagram of HEW-SIG1. Certainly, the HEW-SIG1 may further include another field, and fields in the HEW-SIG1 may be further arranged in another manner. This is not specifically limited in this embodiment of the present invention.

Figure 13:
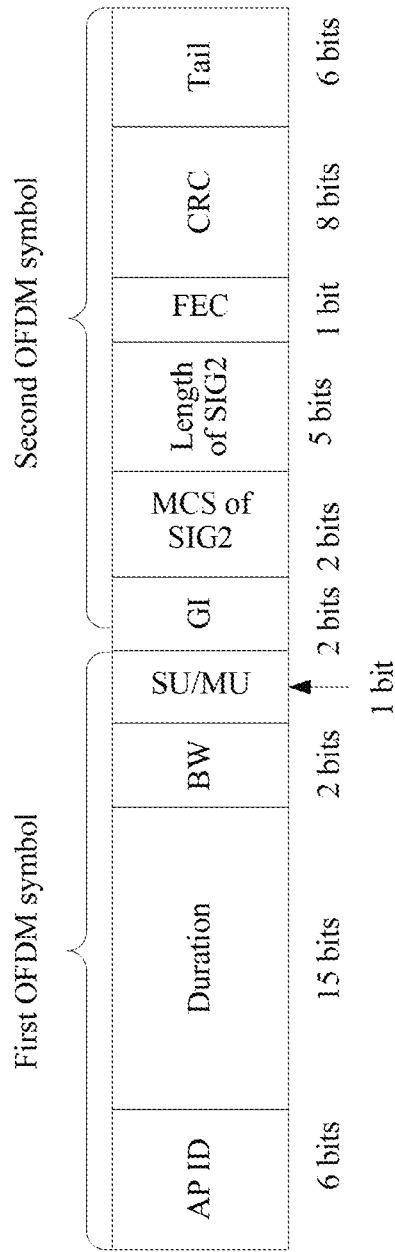
FIG. 13 is a schematic structural diagram 4 of HEW-SIG1 according to an embodiment of the present invention.

Exemplarily, a schematic structural diagram of HEW-SIG1 may be shown in FIG. 13. Compared with the HEW-SIG1 provided in FIG. 12, a duration field and an FEC encoding field are added to the HEW-SIG1 provided in FIG. 13, and a frame structure indication field and a transition time field are removed.

Figure 14:
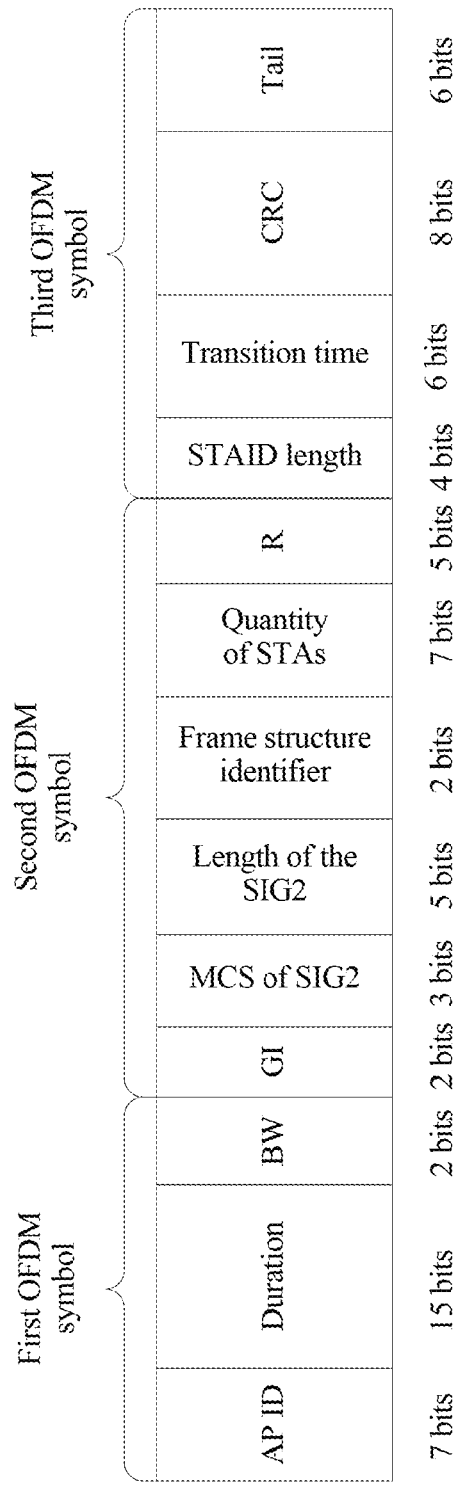
FIG. 14 is a schematic structural diagram 5 of HEW-SIG1 according to an embodiment of the present invention.

Alternatively, exemplarily, a schematic structural diagram of HEW-SIG1 may be shown in FIG. 14, where the HEW-SIG1 includes three $4^{\mu s}$ OFDM symbols. This is not specifically limited in this embodiment of the present invention.

It should be noted that a reservation field of the HEW-SIG1 in schematic structural diagrams of the HEW-SIG1 provided above may be used to indicate another signaling. This is not specifically limited in this embodiment of the present invention.

It should be noted that, in this embodiment of the present invention, some fields of the HEW-SIG1 may be reused. Exemplarily, in the schematic structural diagram of the HEW-SIG1 shown in FIG. 12, when the frame structure indication field indicates that a frame structure of this scheduling transmission is an uplink structure or a downlink structure, the transition time field is not needed, and in this case, 6 bits of the transition time field may be reused for another signaling bit, for example, information such as an MCS for transmitting an acknowledgment character (ACK for short). This is not specifically limited in this embodiment of the present invention.

It should be noted that, a STA field may also be used to indicate whether this scheduling transmission is SU transmission or MU transmission. For example, if a value of the STA field is 1, it may indicate that this scheduling transmission is the SU transmission; or if a value of the STA field is not 1, it may indicate that this scheduling transmission is the MU transmission.

Further, in the method for sending signaling in a WLAN according to this embodiment of the present invention, if the frame structure indication field indicates that the frame structure of this scheduling transmission is the uplink structure, after the AP sends the signaling (step S802), the method may further include: receiving, by the AP, an uplink data packet sent by the STA; and sending, by the AP, an acknowledgment message to the STA, where the acknowledgment message is used to indicate that the AP receives the uplink data packet.

Figure 15:
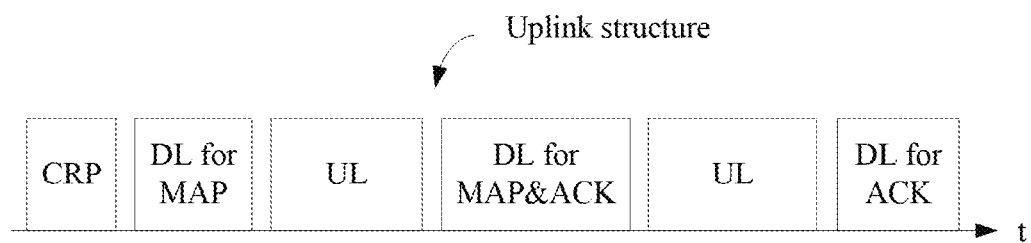
FIG. 15 is a schematic diagram of an uplink frame structure format according to an embodiment of the present invention.

Specifically, in this embodiment of the present invention, when only the uplink data packet exists, a frame structure format may be shown in FIG. 15. First, the AP sends a channel reserved packet (CRP for short), to enter a scheduling transmission stage. Then the AP sends an L-Preamble and an HEW Preamble, where the HEW Preamble includes HEW-SIG1, an HEW-STF, an HEW-LTF, and HEW-SIG2. The HEW-SIG2 includes a resource allocation indication in an uplink transmission stage. The STA performs uplink transmission on an indicated resource in a following uplink transmission timeslot according to the resource allocation indication in the HEW-SIG2. If still only uplink data exists in the following, after the first uplink transmission timeslot ends, the AP sends an ACK of just received uplink data and indicates a resource allocation status of a next uplink timeslot. If uplink data transmission ends, the AP sends only an ACK of just received uplink data.

A media access protocol (MAP for short) in FIG. 15 is the resource allocation indication.

Optionally, in the method for sending signaling in a WLAN according to this embodiment of the present invention, if the frame structure indication field indicates that the frame structure of this scheduling transmission is the downlink structure, after the AP sends the signaling (step S802), the method may further include: sending, by the AP, a downlink data packet to the STA; and receiving, by the AP, an acknowledgment message sent by the STA, where the acknowledgment message is used to indicate that the STA receives the downlink data packet.

Figure 16:
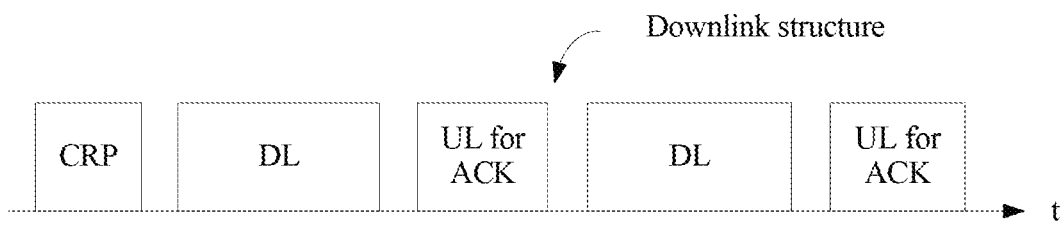
FIG. 16 is a schematic diagram of a downlink frame structure format according to an embodiment of the present invention.

Specifically, in this embodiment of the present invention, when only the downlink data packet exists, a frame structure format may be shown in FIG. 16. First, the AP sends a CRP, to enter a scheduling transmission stage. Then the AP sends downlink data, where an initial part of the downlink data includes an L-Preamble and an HEW Preamble. The HEW Preamble includes HEW-SIG1, an HEW-STF, an HEW-LTF, and HEW-SIG2. The downlink data is sent immediately after the HEW Preamble. The HEW-SIG2 includes a resource allocation indication in a downlink transmission stage and/or a resource indication of replying an ACK in the uplink. The STA receives the downlink data on a corresponding resource according to the resource allocation indication in the HEW-SIG2. After downlink data transmission ends, the STA sends the ACK of the just received downlink data.

Optionally, in the method for sending signaling in a WLAN according to this embodiment of the present invention, if the frame structure indication field indicates that the frame structure of this scheduling transmission is a structure cascading downlink and uplink, after the AP sends the signaling (step S802), the method may further include: sending, by the AP, a downlink data packet to the STA; receiving, by the AP, an uplink data packet and a first acknowledgment message that are sent by the STA, where the first acknowledgment message is used to indicate that the STA receives the downlink data packet; and sending, by the AP, a second acknowledgment message to the STA, where the second acknowledgment message is used to indicate that the AP receives the uplink data packet.

Figure 17:
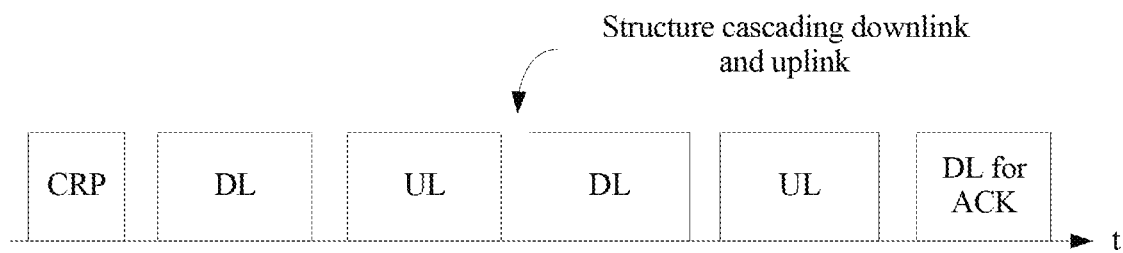
FIG. 17 is a schematic diagram of a frame structure format cascading downlink and uplink according to an embodiment of the present invention.

Specifically, in this embodiment of the present invention, when both the downlink data packet and the uplink data packet exist, a frame structure format may be shown in FIG. 17. First, the AP sends a CRP, to enter a scheduling transmission stage. Then the AP sends an L-Preamble and an HEW Preamble. The HEW Preamble includes HEW-SIG1, an HEW-STF, an HEW-LTF, and HEW-SIG2. The HEW-SIG2 includes resource locations of receiving, on the STA side, data in a downlink transmission timeslot and sending, on the STA side, data in an uplink transmission timeslot. If downlink data and uplink data still exist after one downlink transmission and uplink transmission end, after the uplink data ends, downlink transmission and uplink transmission continue, starting from the downlink data. In an uplink transmission time period, transmission of an ACK reply for the downlink data is included; and in a downlink transmission time period, transmission of an ACK of the uplink data is included. If transmission finally ends with an uplink timeslot, transmission of an ACK reply of the AP for uplink transmission needs to be followed, as shown in the last part of FIG. 17.

Certainly, if the frame structure indication field indicates that the frame structure of this scheduling transmission is a structure cascading downlink and uplink, after the AP sends the signaling (step S802), the method may further include: receiving, by the AP, an uplink data packet sent by the STA; sending, by the AP, a downlink data packet and a second acknowledgment message to the STA, where the second acknowledgment message is used to indicate that the AP receives the uplink data packet; and receiving, by the AP, a first acknowledgment message sent by the STA, where the first acknowledgment message is used to indicate that the STA receives the downlink data packet.

This embodiment of the present invention imposes no specific limitation on this.

Further, if the downlink-uplink transition time point is T, a value M of the transition time field is:

$$M = (T - \text{End time of the next signaling})/\text{Time domain length of each resource unit during this scheduling} \quad \text{Formula (1)}$$

Specifically, in a case of 20 MHz data transmission and 256-point Fast Fourier Transform (FFT for short), a symbol length is $12.8^{\mu s}$, and a CP length of $0.8^{\mu s}$ is added; it may be obtained that the shortest OFDM symbol length is $13.6^{\mu s}$ in the case of 20 MHz data transmission and 256-point FFT. The longest length that can be indicated in the SIG in the L-Preamble is $5484^{\mu s}$, and an L-Preamble length of $20^{\mu s}$ is subtracted; the remaining $5464^{\mu s}$ is used to transmit a Preamble and data in an HEW part. Assuming that a time domain of a resource unit in a scheduling stage includes n OFDM symbols, a maximum quantity of possible downlink-uplink switch points is M=5464/13.6/n. Assuming that n=8, the maximum quantity of downlink-uplink switch points is M=5464/13.6/8=50. If the transition time field occupies 6 bits, $2^6$=64 switch points can be indicated, and all the downlink-uplink switch points that exist when n=8 can be indicated. Certainly, if time domains of resource units include different quantities of OFDM symbols, quantities of bits required by the transition time field are different. This is not specifically limited in this embodiment of the present invention.

The method for sending signaling in a WLAN according to this embodiment of the present invention includes: generating, by an AP, signaling, where the signaling includes an AP ID field, a BW field, a GI field, a CRC field, and a Tail field, the AP ID field is used to indicate an ID of the AP, the BW field is used to indicate bandwidth required for data transmission subsequent to the signaling, the GI is used to indicate a length of a CP required for data transmission subsequent to the signaling, the CRC field is used to guard a field before the CRC field in the signaling, and the Tail field is used to empty an encoder and a decoder, where the CRC field and the Tail field are the last two fields of the signaling; and sending, by the AP, the signaling. The foregoing solution provides an OFDMA-based design solution for common signaling in a WLAN system, thereby resolving a prior-art problem that there is no OFDMA-based design solution for common signaling in the WLAN system.

FIG. 18 is a method for receiving signaling in a WLAN according to an embodiment of the present invention, and the method includes:

S1801. A STA receives signaling sent by an access point (AP), where the signaling includes an AP ID field, a BW field, a GI field, a CRC field, and a Tail field, the AP ID field is used to indicate an ID of the AP, the BW field is used to indicate bandwidth required for data transmission subsequent to the signaling, the GI is used to indicate a length of a CP required for data transmission subsequent to the signaling, the CRC field is used to guard a field before the CRC field in the signaling, and the Tail field is used to empty an encoder and a decoder, where the CRC field and the Tail field are the last two fields of the signaling.

S1802. The STA parses the AP ID field, the BW field, and the GI field to respectively obtain the ID of the AP, and the bandwidth and the length of the CP that are required for data transmission subsequent to the signaling.

If the ID of the AP does not match an AP ID associated with the STA, parsing of a field after the AP ID field is stopped.

Specifically, in step S1801 of this embodiment of the present invention, for a schematic structural diagram of the signaling received by the STA, reference may be made to FIG. 10, and details are not repeatedly described in this embodiment of the present invention.

Preferably, in step S1801 of this embodiment of the present invention, the AP ID field may be the first field of the signaling. Therefore, after receiving a data packet sent by the AP, the STA may first parse the AP ID field, to determine whether the received data packet is a data packet sent by an AP associated with the STA. If the received data packet is the data packet sent by the AP associated with the STA, parsing of the data packet continues. If the received data packet is not the data packet sent by the AP associated with the STA, parsing of the data packet is stopped, thereby saving system resources.

Further, in the method for receiving signaling in a WLAN according to this embodiment of the present invention, the signaling may further include at least one of the following fields: a field of a transmission MCS of next signaling of the signaling, a next-signaling length field, a frame structure indication field, an SU/MU field, a transition time field, a duration field, an FEC encoding field, a STA quantity field, or a STAID length field, where the next-signaling MCS field is used to indicate the transmission MCS of the next signaling, the next-signaling length field is used to indicate a length of the next signaling, the frame structure indication field is used to indicate a frame structure of this scheduling transmission, the SU/MU field is used to indicate whether this scheduling transmission is SU transmission or MU transmission, the transition time field is used to indicate a downlink-uplink transition time point, the duration field is used to indicate a remaining duration of occupying a channel by this scheduling transmission, the FEC encoding field is used to indicate a data encoding mode in this scheduling transmission, the STA quantity field is used to indicate a quantity of STAs in this scheduling transmission, and the STAID length field is used to indicate a length of a STAID of a STA in this scheduling transmission, where the frame structure of this scheduling transmission includes an uplink structure, a downlink structure, or a structure cascading downlink and uplink.

The method for receiving signaling in a WLAN according to this embodiment of the present invention may further include: parsing, by the STA, the at least one of the following fields to obtain at least one piece of the following information: the MCS of the next signaling, the length of the next signaling, the frame structure of this scheduling transmission, whether this scheduling transmission is the SU transmission or the MU transmission, the downlink-uplink transition time point, the remaining duration of occupying the channel by this scheduling transmission, the data encoding mode in this scheduling transmission, the quantity of stations STAs in this scheduling transmission, or the length of the STAID of the STA in this scheduling transmission.

Specifically, in this embodiment of the present invention, for a schematic structural diagram of the signaling received by the STA, reference may be made to FIG. 12 to FIG. 14, and details are not repeatedly described in this embodiment of the present invention.

Further, the method for receiving signaling in a WLAN according to this embodiment of the present invention may further include: reading, by the STA, resource indication information in the next signaling; determining, by the STA, a resource location of the STA according to the resource indication information; and transmitting, by the STA, an uplink data packet and/or a downlink data packet at the resource location.

Figure 19A:
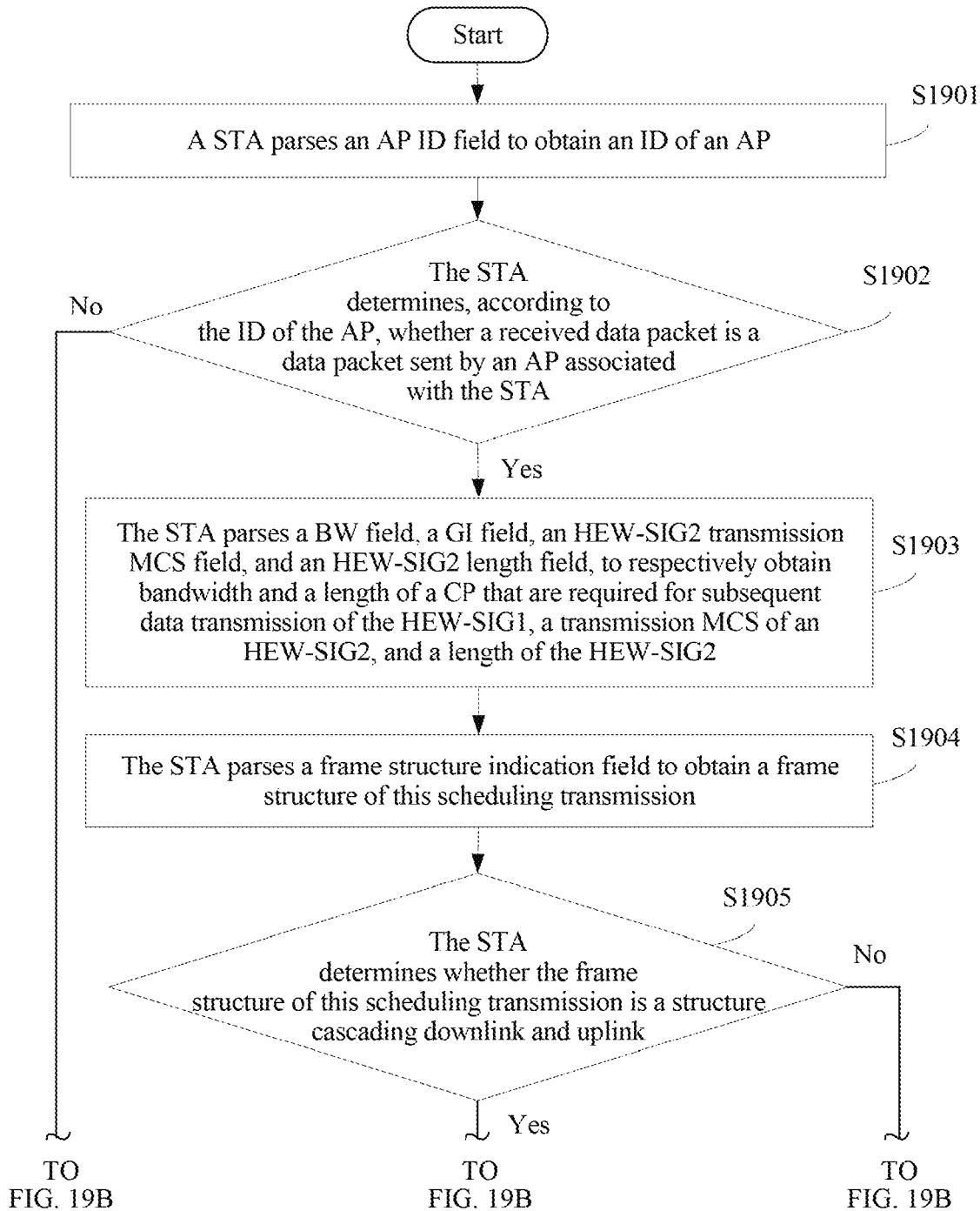
FIG. 19A and FIG. 19B are a schematic flowchart of parsing signaling HEW-SIG1 according to an embodiment of the present invention.
Figure 19B:
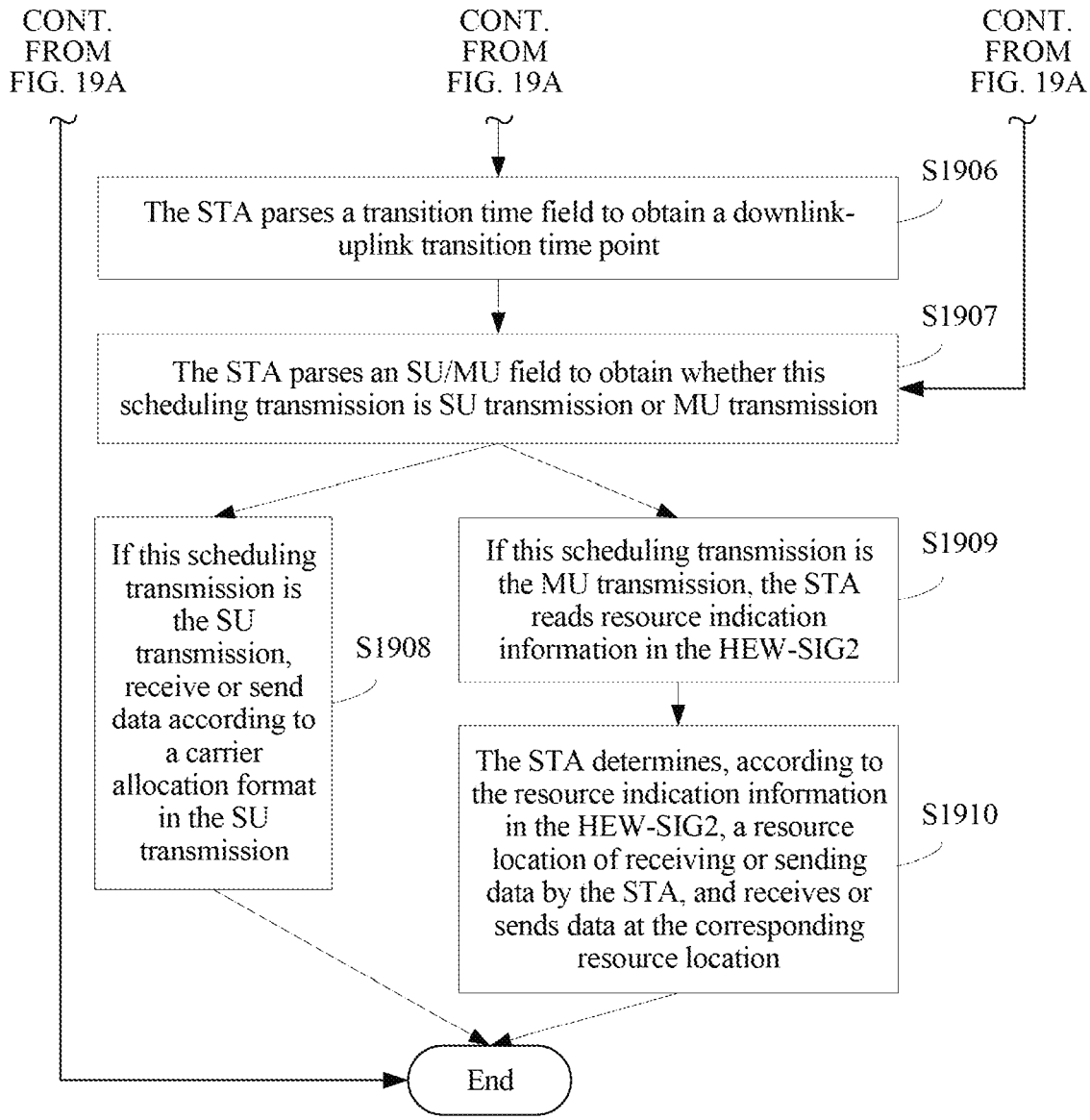

Exemplarily, if the AP ID field is the first field of the signaling, and the schematic structural diagram of the signaling received by the STA is specifically shown in FIG. 12, a schematic flowchart of parsing signaling HEW-SIG1 by the STA after receiving a data packet is provided herein. As shown in FIG. 19A and FIG. 19B, a procedure includes the following steps:

S1901. The STA parses an AP ID field to obtain an ID of an AP.

S1902. The STA determines, according to the ID of the AP, whether the received data packet is a data packet sent by an AP associated with the STA.

If the received data packet is the data packet sent by the AP associated with the STA, step S1903 is performed; or if the received data packet is not the data packet sent by the AP associated with the STA, the procedure ends.

S1903. The STA parses a BW field, a GI field, an HEW-SIG2 transmission MCS field, and an HEW-SIG2 length field, to respectively obtain bandwidth and a length of a CP that are required for subsequent data transmission of the HEW-SIG1, a transmission MCS of the HEW-SIG2, and a length of the HEW-SIG2.

S1904. The STA parses a frame structure indication field to obtain a frame structure of this scheduling transmission.

S1905. The STA determines whether the frame structure of this scheduling transmission is a structure cascading downlink and uplink.

If the frame structure of this scheduling transmission is the structure cascading downlink and uplink, step S1906 is performed; or if the frame structure of this scheduling transmission is not the structure cascading downlink and uplink, step S1907 is performed.

S1906. The STA parses a transition time field to obtain a downlink-uplink transition time point.

S1907. The STA parses an SU/MU field to learn whether this scheduling transmission is SU transmission or MU transmission.

If this scheduling transmission is the SU transmission, step S1908 is performed; or if this scheduling transmission is the MU transmission, step S1909 is performed.

S1908. If this scheduling transmission is the SU transmission, receive or send data according to a carrier allocation format in the SU transmission.

S1909. If this scheduling transmission is the MU transmission, the STA reads resource indication information in the HEW-SIG2.

S1910. The STA determines, according to the resource indication information in the HEW-SIG2, a resource location of receiving or sending data by the STA, and receives or sends data at the corresponding resource location.

At this point, the procedure of parsing the signaling HEW-SIG1 ends.

It should be noted that, when SU transmission is performed, because subsequent transmission resources are only used by one user, the resource indication information in the HEW-SIG2 is not needed. However, when MU transmission is performed, locations in which a STA receives (downlink) and sends (uplink) data need to be indicated in the HEW-SIG2; and when the MU transmission is performed, to ensure receiving and sending quality, it is ensured as much as possible that pilots exist in both a receiving part and a sending part of each STA. Therefore, allocation structures of subcarriers are different during the SU transmission and the MU transmission, and more pilot design is required for the MU transmission compared with the SU transmission. In conclusion, the SU/MU field may be added to indicate whether this scheduling transmission is the SU transmission or the MU transmission.

Further, if the signaling includes the transition time field, that the STA parses the transition time field to obtain the downlink-uplink transition time point specifically includes: determining, by the STA, the downlink-uplink transition time point according to a value of the transition time field, a time domain length of a resource unit, and an end time of the signaling with reference to a preset formula, where the preset formula includes:

$$\text{Transition time point} = \text{Value of transition time field} \times \text{Time domain length of the resource unit} + \text{End time of the next signaling} \quad \text{Formula (2)}$$

Figure 20:
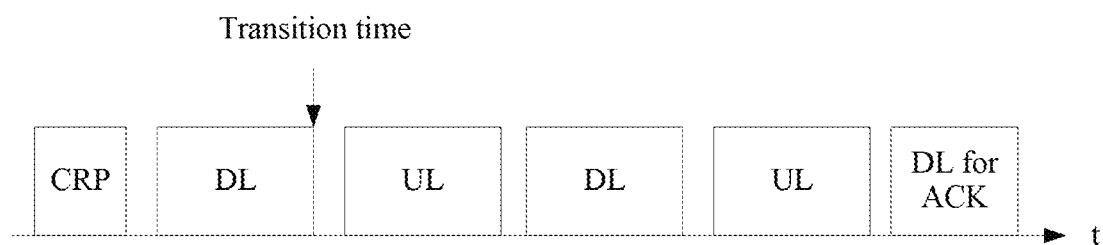
FIG. 20 is a schematic diagram of a location of a transition time point according to an embodiment of the present invention.

Exemplarily, if the value of the transition time field is 010100, where the value is 20 after being converted to a decimal number, and a time domain of each resource unit during this scheduling includes eight OFDM symbols, a time domain length of each resource unit during this scheduling is $13.6 \times 8 = 108.8^{\mu s}$, and it can be obtained, according to formula (2), that the downlink-uplink transition time point during this scheduling=an end time of HEW-SIG2+20× $108.8^{\mu s}$=the end time of the HEW-SIG2+$2176^{\mu s}$. A location of the transition time point is shown in FIG. 20.

Further, if the signaling further includes the frame structure indication field, and the frame structure indication field indicates that the frame structure of this scheduling transmission is the structure cascading downlink and uplink, a time domain location of an uplink transmission resource is:

$$\text{Sending time of the uplink transmission resource} = \text{Transition time point} + \text{Receiving-to-sending switch time} + \text{Uplink time indicated in the next signaling} \quad \text{Formula (3)}$$

Figure 21:
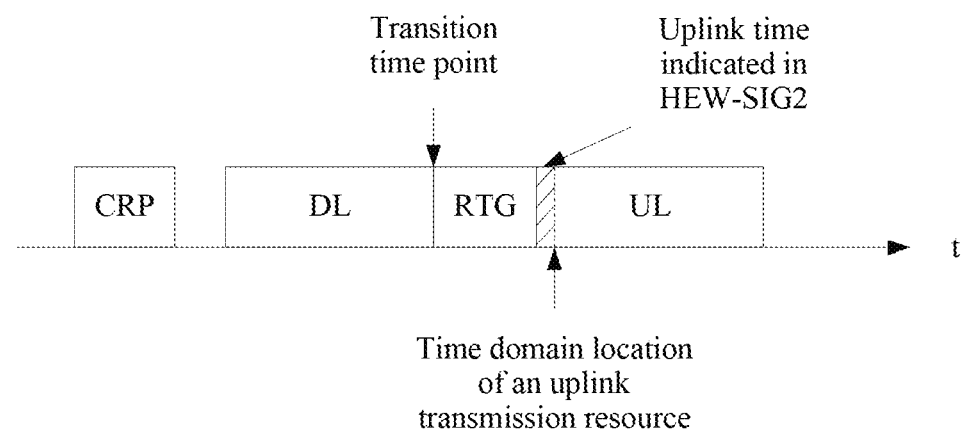
FIG. 21 is a schematic diagram of a time domain location of an uplink transmission resource according to an embodiment of the present invention.

Exemplarily, the foregoing example continues to be used, and it is assumed that the downlink-uplink transition time point during this scheduling=the end time of the HEW-SIG2+$20 \times 108.8^{\mu s}$=the end time of the HEW-SIG2+$2176^{\mu s}$, the receiving-to-sending transition time is $16^{\mu s}$, and a transmission time of the STA indicated in the HEW-SIG2 is $25^{\mu s}$ after uplink transmission starts; it can be obtained, according to formula (3), that the sending time of an uplink transmission resource=the end time of the HEW-SIG2+$2176^{\mu s}$+$16^{\mu s}$+$25^{\mu s}$=the end time of the HEW-SIG2+$2217^{\mu s}$. The time domain location of the uplink transmission resource is shown in FIG. 21, where a receive/transmit transition gap (RTG for short) is the receiving-to-sending switch time in formula (3), and an uplink time indicated in the HEW-SIG2 is the uplink time indicated in the next signaling in formula (3). The STA may obtain the time domain location of the uplink transmission resource by means of calculation according to formula (3).

The method for receiving signaling in a WLAN according to this embodiment of the present invention includes: receiving, by a STA, signaling sent by an AP, where the signaling includes an AP ID field, a BW field, a GI field, a CRC field, and a Tail field, the AP ID field is used to indicate an ID of the AP, the BW field is used to indicate bandwidth required for data transmission subsequent to the signaling, the GI is used to indicate a length of a CP required for data transmission subsequent to the signaling, the CRC field is used to guard a field before the CRC field in the signaling, and the Tail field is used to empty an encoder and a decoder, where the CRC field and the Tail field are the last two fields of the signaling; and parsing, by the STA, the AP ID field, the BW field, and the GI field to respectively obtain the ID of the AP, and the bandwidth and the length of the CP that are required for data transmission subsequent to the signaling, where if the ID of the AP does not match an AP ID associated with the STA, parsing of a field after the AP ID field is stopped. The foregoing solution provides an OFDMA-based design solution for common signaling in a WLAN system, thereby resolving a prior-art problem that there is no OFDMA-based design solution for common signaling in the WLAN system.

Embodiment 2

Figure 22:
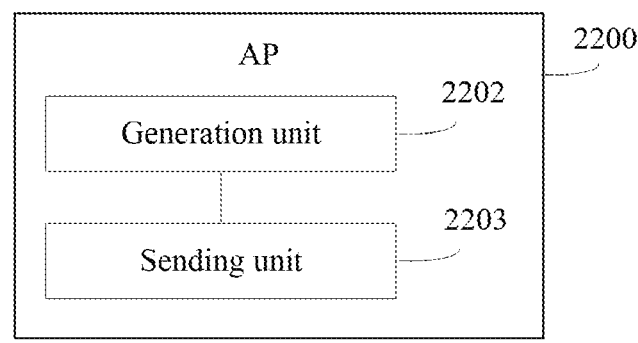
FIG. 22 is a schematic structural diagram 1 of an access point (AP) according to an embodiment of the present invention.

This embodiment of the present invention provides an AP 2200. Specifically, as shown in FIG. 22, the AP 2200 includes a generation unit 2202 and a sending unit 2203.

The generation unit 2202 is configured to generate signaling, where the signaling includes an AP ID field, a bandwidth BW field, a guard interval GI field, a cyclic redundancy check CRC field, and a tail field, the AP ID field is used to indicate an ID of the AP 2200, the BW field is used to indicate bandwidth required for data transmission subsequent to the signaling, the GI is used to indicate a length of a CP required for data transmission subsequent to the signaling, the CRC field is used to guard a field before the CRC field in the signaling, and the Tail field is used to empty an encoder and a decoder, where the CRC field and the Tail field are the last two fields of the signaling.

The sending unit 2203 is configured to send the signaling.

Preferably, the AP ID field is the first field of the signaling.

Further, the signaling further includes at least one of the following fields: a next-signaling MCS field, a next-signaling length field, a frame structure indication field, an SU/MU field, a transition time field, a duration field, a forward error correction FEC encoding field, a STA quantity field, or a STAID length field, where the next-signaling MCS field is used to indicate a transmission MCS of the next signaling, the next-signaling length field is used to indicate a length of the next signaling, the frame structure indication field is used to indicate a frame structure of this scheduling transmission, the SU/MU field is used to indicate whether this scheduling transmission is SU transmission or MU transmission, the transition time field is used to indicate a downlink-uplink transition time point, the duration field is used to indicate a remaining duration of occupying a channel by this scheduling transmission, the FEC encoding field is used to indicate a data encoding mode in this scheduling transmission, the STA quantity field is used to indicate a quantity of STAs in this scheduling transmission, and the STAID length field is used to indicate a length of a STAID of a STA in this scheduling transmission, where the frame structure of this scheduling transmission includes an uplink structure, a downlink structure, or a structure cascading downlink and uplink.

Figure 23:
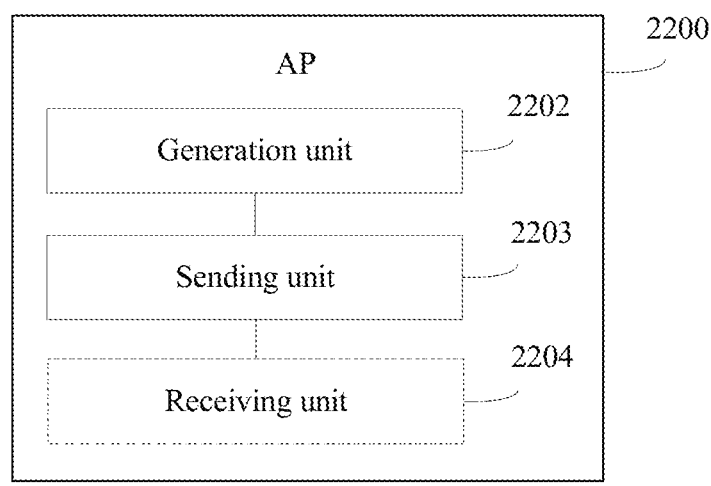
FIG. 23 is a schematic structural diagram 2 of an AP according to an embodiment of the present invention.

Further, as shown in FIG. 23, the AP 2200 further includes a receiving unit 2204.

The receiving unit 2204 is configured to: if the frame structure indication field indicates that the frame structure of this scheduling transmission is the uplink structure, after the sending unit 2203 sends the signaling, receive an uplink data packet sent by the STA; and the sending unit 2203 is further configured to send an acknowledgment message to the STA, where the acknowledgment message is used to indicate that the AP 2200 receives the uplink data packet.

Optionally, as shown in FIG. 23, the AP 2200 further includes a receiving unit 2204.

The sending unit 2203 is further configured to: if the frame structure indication field indicates that the frame structure of this scheduling transmission is the downlink structure, send a downlink data packet to the STA after sending the signaling; and the receiving unit 2204 is configured to receive an acknowledgment message sent by the STA, where the acknowledgment message is used to indicate that the STA receives the downlink data packet.

Optionally, as shown in FIG. 23, the AP 2200 further includes a receiving unit 2204.

The sending unit 2203 is further configured to: if the frame structure indication field indicates that the frame structure of this scheduling transmission is the structure cascading downlink and uplink, send a downlink data packet to the STA after sending the signaling; the receiving unit 2204 is configured to receive an uplink data packet and a first acknowledgment message that are sent by the STA, where the first acknowledgment message is used to indicate that the STA receives the downlink data packet; and the sending unit 2203 is further configured to send a second acknowledgment message to the STA, where the second acknowledgment message is used to indicate that the AP 2200 receives the uplink data packet; or the receiving unit 2204 is further configured to: if the frame structure indication field indicates that the frame structure of this scheduling transmission is the structure cascading downlink and uplink, after the sending unit 2203 sends the signaling, receive an uplink data packet sent by the STA; the sending unit 2203 is further configured to send a downlink data packet and a second acknowledgment message to the STA, where the second acknowledgment message is used to indicate that the AP 2200 receives the uplink data packet; and the receiving unit 2204 is further configured to receive a first acknowledgment message sent by the STA, where the first acknowledgment message is used to indicate that the STA receives the downlink data packet.

Further, if the downlink-uplink transition time point is T, a value M of the transition time field is:

$$M = (T - \text{End time of the next signaling})/\text{Time domain length of each resource unit during this scheduling}$$

Specifically, for a method for sending signaling in a WLAN by using an AP, reference may be made to the description in Embodiment 1, and details are not repeatedly described in this embodiment of the present invention.

Because the AP in this embodiment can be configured to execute the method in the foregoing Embodiment 1, for a technical effect that can be achieved in this embodiment, reference may be made to the description in the foregoing embodiment, and details are not repeatedly described herein.

Embodiment 3

Figure 24:
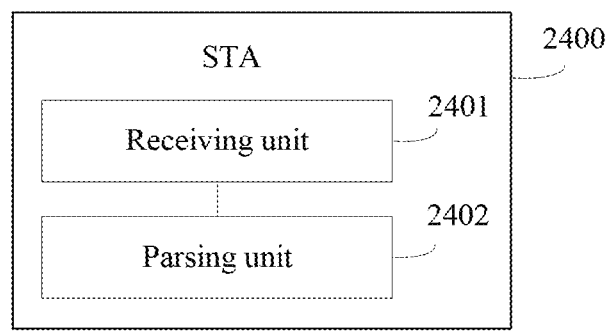
FIG. 24 is a schematic structural diagram 1 of a station (STA) according to an embodiment of the present invention.

This embodiment of the present invention provides a STA 2400. Specifically, as shown in FIG. 24, the STA 2400 includes a receiving unit 2401 and a parsing unit 2402.

The receiving unit 2401 is configured to receive signaling sent by an AP, where the signaling includes an AP identifier ID field, a bandwidth BW field, a guard interval GI field, a cyclic redundancy check CRC field, and a tail field, the AP ID field is used to indicate an ID of the AP, the BW field is used to indicate bandwidth required for data transmission subsequent to the signaling, the GI is used to indicate a length of a cyclic prefix CP required for data transmission subsequent to the signaling, the CRC field is used to guard a field before the CRC field in the signaling, and the Tail field is used to empty an encoder and a decoder, where the CRC field and the Tail field are the last two fields of the signaling.

The parsing unit 2402 is configured to parse the AP ID field, the BW field, and the GI field to respectively obtain the ID of the AP, and the bandwidth and the length of the CP that are required for data transmission subsequent to the signaling.

If the ID of the AP does not match an AP ID associated with the STA 2400, parsing of a field after the AP ID field is stopped.

Preferably, the AP ID field is the first field of the signaling.

Further, the signaling further includes at least one of the following fields: a field of a transmission modulation and coding scheme MCS of next signaling of the signaling, a next-signaling length field, a frame structure indication field, a single-user (SU)/multi-user (MU) field, a transition time field, a duration field, a forward error correction FEC encoding field, a STAs 2400 quantity field, or a STA2400ID length field, where the next-signaling MCS field is used to indicate the transmission MCS of the next signaling, the next-signaling length field is used to indicate a length of the next signaling, the frame structure indication field is used to indicate a frame structure of this scheduling transmission, the SU/MU field is used to indicate whether this scheduling transmission is SU transmission or MU transmission, the transition time field is used to indicate a downlink-uplink transition time point, the duration field is used to indicate a remaining duration of occupying a channel by this scheduling transmission, the FEC encoding field is used to indicate a data encoding mode in this scheduling transmission, the STAs 2400 quantity field is used to indicate a quantity of STAs in this scheduling transmission, and the STAID length field is used to indicate a length of a STAID of a STA in this scheduling transmission, where the frame structure of this scheduling transmission includes an uplink structure, a downlink structure, or a structure cascading downlink and uplink.

The parsing unit 2402 is further configured to parse the at least one of the following fields to obtain at least one piece of the following information: the transmission MCS of the next signaling, the length of the next signaling, the frame structure of this scheduling transmission, whether this scheduling transmission is the SU transmission or the MU transmission, the downlink-uplink transition time point, the remaining duration of occupying the channel by this scheduling transmission, the data encoding mode in this scheduling transmission, the quantity of stations STAs in this scheduling transmission, or the length of the STAID of the STA in this scheduling transmission.

Figure 25:
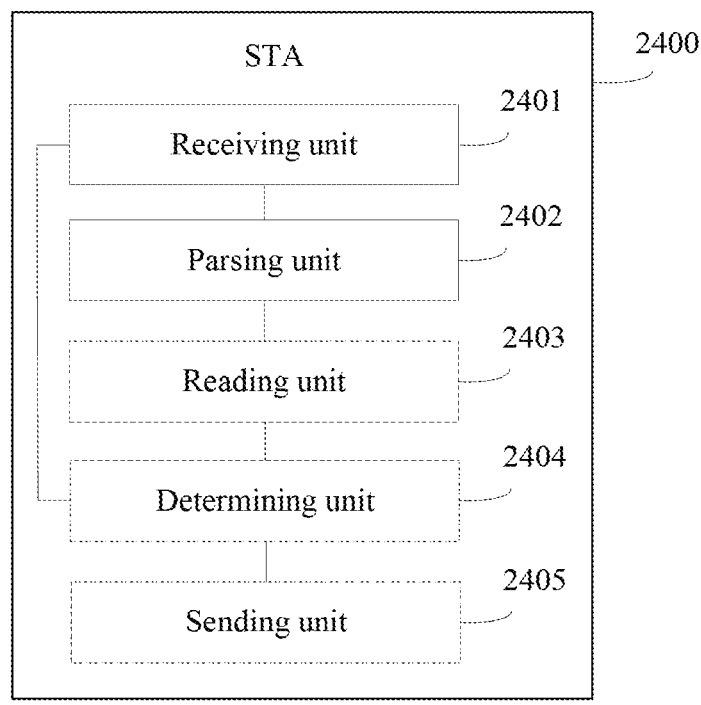
FIG. 25 is a schematic structural diagram 2 of a STA according to an embodiment of the present invention.

Further, as shown in FIG. 25, the STA 2400 further includes a reading unit 2403, a determining unit 2404, and a sending unit 2405.

The reading unit 2403 is configured to read resource indication information in the next signaling; the determining unit 2404 is configured to determine a resource location of the STA 2400 according to the resource indication information; and the receiving unit 2401 is configured to receive a downlink data packet at the resource location; or the sending unit 2405 is configured to send an uplink data packet at the resource location.

Further, if the signaling further includes the transition time field, the parsing unit 2402 is specifically configured to: determine the downlink-uplink transition time point according to a value of the transition time field, a time domain length of a resource unit, and an end time of the signaling with reference to a preset formula, where the preset formula includes:

Transition time point=Value of transition time field×
Time domain length of the resource unit+End
time of the next signaling.

Further, if the signaling further includes the frame structure indication field, and the frame structure indication field indicates that the frame structure of this scheduling transmission is the structure cascading downlink and uplink, a time domain location of an uplink transmission resource is: Sending time of the uplink transmission resource=Transition time point+Receiving-to-sending switch time+Uplink time indicated in the next signaling.

Specifically, for a method for receiving signaling in a WLAN by using a STA, reference may be made to the description in Embodiment 1, and details are not repeatedly described in this embodiment of the present invention.

Because the STA in this embodiment can be configured to execute the method in the foregoing Embodiment 1, for a technical effect that can be achieved in this embodiment, reference may be made to the description in the foregoing embodiment, and details are not repeatedly described herein.

Embodiment 4

Figure 26:
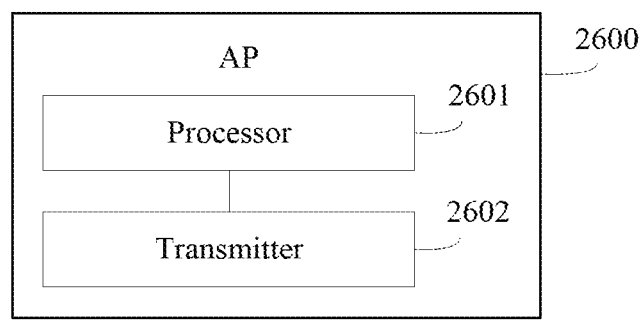
FIG. 26 is a schematic structural diagram 3 of an AP according to an embodiment of the present invention.

This embodiment of the present invention provides an AP 2600. Specifically, as shown in FIG. 26, the AP 2600 includes a processor 2601 and a transmitter 2602.

The processor 2601 is configured to generate signaling, where the signaling includes an AP ID field, a bandwidth BW field, a guard interval GI field, a cyclic redundancy check CRC field, and a tail field, the AP ID field is used to indicate an ID of the AP 2600, the BW field is used to indicate bandwidth required for data transmission subsequent to the signaling, the GI field is used to indicate a length of a CP required for data transmission subsequent to the signaling, the CRC field is used to guard a field before the CRC field in the signaling, and the Tail field is used to empty an encoder and a decoder, where the CRC field and the Tail field are the last two fields of the signaling.

The transmitter 2602 is configured to send the signaling.

Preferably, the AP ID field is the first field of the signaling.

Further, the signaling further includes at least one of the following fields: a next-signaling MCS field, a next-signaling length field, a frame structure indication field, an SU/MU field, a transition time field, a duration field, a forward error correction FEC encoding field, a STA quantity field, or a STAID length field, where the next-signaling MCS field is used to indicate a transmission MCS of the next signaling, the next-signaling length field is used to indicate a length of the next signaling, the frame structure indication field is used to indicate a frame structure of this scheduling transmission, the SU/MU field is used to indicate whether this scheduling transmission is SU transmission or MU transmission, the transition time field is used to indicate a downlink-uplink transition time point, the duration field is used to indicate a remaining duration of occupying a channel by this scheduling transmission, the FEC encoding field is used to indicate a data encoding mode in this scheduling transmission, the STA quantity field is used to indicate a quantity of STAs in this scheduling transmission, and the STAID length field is used to indicate a length of a STAID of a STA in this scheduling transmission, where the frame structure of this scheduling transmission includes an uplink structure, a downlink structure, or a structure cascading downlink and uplink.

Figure 27:
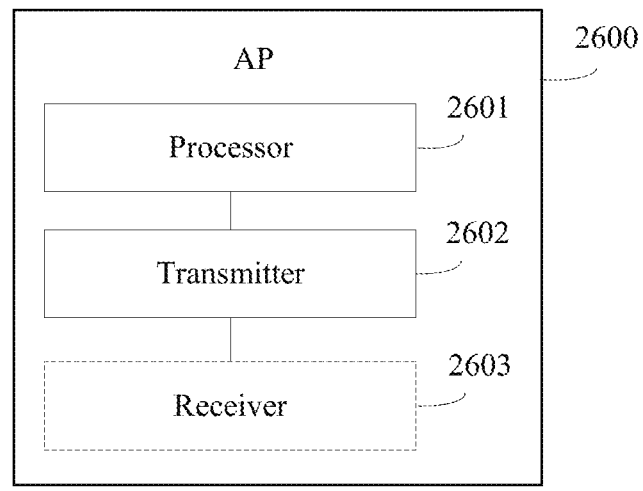
FIG. 27 is a schematic structural diagram 4 of an AP according to an embodiment of the present invention.

Further, as shown in FIG. 27, the AP 2600 further includes a receiver 2603.

The receiver 2603 is configured to: if the frame structure indication field indicates that the frame structure of this scheduling transmission is the uplink structure, after the transmitter 2602 sends the signaling, receive an uplink data packet sent by the STA; and the transmitter 2602 is further configured to send an acknowledgment message to the STA, where the acknowledgment message is used to indicate that the AP 2600 receives the uplink data packet.

Optionally, as shown in FIG. 27, the AP 2600 further includes a receiver 2603, where the transmitter 2602 is further configured to: if the frame structure indication field indicates that the frame structure of this scheduling transmission is the downlink structure, send a downlink data packet to the STA after sending the signaling; and the receiver 2603 is configured to receive an acknowledgment message sent by the STA, where the acknowledgment message is used to indicate that the STA receives the downlink data packet.

Optionally, as shown in FIG. 27, the AP 2600 further includes a receiver 2603, where the transmitter 2602 is further configured to: if the frame structure indication field indicates that the frame structure of this scheduling transmission is the structure cascading downlink and uplink, send a downlink data packet to the STA after sending the signaling; the receiver 2603 is configured to receive an uplink data packet and a first acknowledgment message that are sent by the STA, where the first acknowledgment message is used to indicate that the STA receives the downlink data packet; and the transmitter 2602 is further configured to send a second acknowledgment message to the STA, where the second acknowledgment message is used to indicate that the AP 2600 receives the uplink data packet; or the receiver 2603 is further configured to: if the frame structure indication field indicates that the frame structure of this scheduling transmission is the structure cascading downlink and uplink, after the transmitter 2602 sends the signaling, receive an uplink data packet sent by the STA; the transmitter 2602 is further configured to send a downlink data packet and a second acknowledgment message to the STA, where the second acknowledgment message is used to indicate that the AP 2600 receives the uplink data packet; and the receiver 2603 is further configured to receive a first acknowledgment message sent by the STA, where the first acknowledgment message is used to indicate that the STA receives the downlink data packet.

Further, if the downlink-uplink transition time point is T, a value M of the transition time field is:

$$M=(T-\text{End time of the next signaling})/\text{Time domain length of each resource unit during this scheduling}$$

Specifically, for a method for sending signaling in a WLAN by using an AP, reference may be made to the description in Embodiment 1, and details are not repeatedly described in this embodiment of the present invention.

Because the AP in this embodiment can be configured to execute the method in the foregoing Embodiment 1, for a technical effect that can be achieved in this embodiment, reference may be made to the description in the foregoing embodiment, and details are not repeatedly described herein.

Embodiment 5

Figure 28:
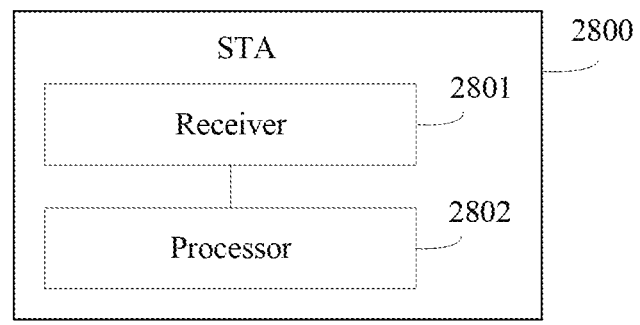
FIG. 28 is a schematic structural diagram 3 of a STA according to an embodiment of the present invention.
Figure 29:
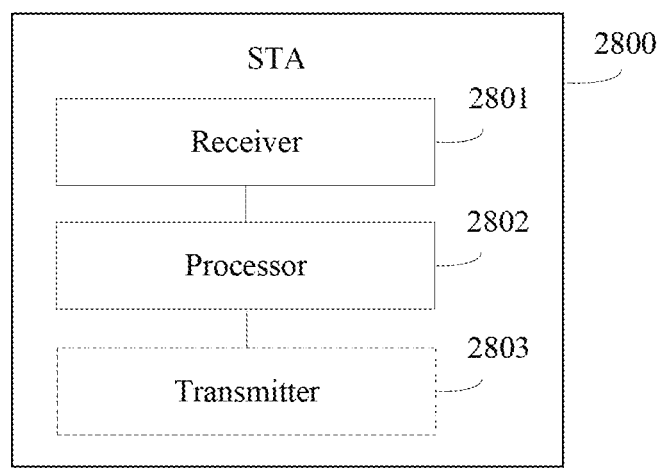
FIG. 29 is a schematic structural diagram 4 of a STA according to an embodiment of the present invention.

This embodiment of the present invention provides a STA 2800. Specifically, as shown in FIG. 28, the STA 2800 includes a receiver 2801 and a processor 2802.

The receiver 2801 is configured to receive signaling sent by an access point AP, where the signaling includes an AP identifier ID field, a bandwidth BW field, a guard interval GI field, a cyclic redundancy check CRC field, and a tail field, the AP ID field is used to indicate an ID of the AP, the BW field is used to indicate bandwidth required for data transmission subsequent to the signaling, the GI is used to indicate a length of a cyclic prefix CP required for data transmission subsequent to the signaling, the CRC field is used to guard a field before the CRC field in the signaling, and the Tail field is used to empty an encoder and a decoder, where the CRC field and the Tail field are the last two fields of the signaling.

The processor 2802 is configured to parse the AP ID field, the BW field, and the GI field to respectively obtain the ID of the AP, and the bandwidth and the length of the CP that are required for data transmission subsequent to the signaling, where if the ID of the AP does not match an AP ID associated with the STA 2800, parsing of a field after the AP ID field is stopped.

Preferably, the AP ID field is the first field of the signaling.

Further, the signaling further includes at least one of the following fields: a field of a transmission modulation and coding scheme MCS of next signaling of the signaling, a next-signaling length field, a frame structure indication field, a SU/MU field, a transition time field, a duration field, a forward error correction FEC encoding field, a STA quantity field, or a STAID length field, where the next-signaling MCS field is used to indicate the transmission MCS of the next signaling, the next-signaling length field is used to indicate a length of the next signaling, the frame structure indication field is used to indicate a frame structure of this scheduling transmission, the SU/MU field is used to indicate whether this scheduling transmission is SU transmission or MU transmission, the transition time field is used to indicate a downlink-uplink transition time point, the duration field is used to indicate a remaining duration of occupying a channel by this scheduling transmission, the FEC encoding field is used to indicate a data encoding mode in this scheduling transmission, the STA quantity field is used to indicate a quantity of STAs in this scheduling transmission, and the STAID length field is used to indicate a length of a STAID of a STA in this scheduling transmission, where the frame structure of this scheduling transmission includes an uplink structure, a downlink structure, or a structure cascading downlink and uplink.

The processor 2802 is further configured to parse the at least one of the following fields to obtain at least one piece of the following information: the transmission MCS of the next signaling, the length of the next signaling, the frame structure of this scheduling transmission, whether this scheduling transmission is the SU transmission or the MU transmission, the downlink-uplink transition time point, the remaining duration of occupying the channel by this scheduling transmission, the data encoding mode in this scheduling transmission, the quantity of stations STAs in this scheduling transmission, or the length of the STAID of the STA in this scheduling transmission.

Further, the STA 2800 further includes a transmitter 2803.

The processor 2802 is further configured to read resource indication information in the next signaling, and determine a resource location of the STA 2800 according to the resource indication information; and the receiver 2801 is further configured to receive a downlink data packet at the resource location; or the transmitter 2803 is configured to send an uplink data packet at the resource location.

Further, if the signaling includes the transition time field, the processor 2802 is specifically configured to: determine the downlink-uplink transition time point according to a value of the transition time field, a time domain length of a resource unit, and an end time of the signaling with reference to a preset formula, where the preset formula includes: Transition time point=Value of transition time field×Time domain length of the resource unit+End time of the next signaling.

Further, if the signaling further includes the frame structure indication field, and the frame structure indication field indicates that the frame structure of this scheduling transmission is the structure cascading downlink and uplink, a time domain location of an uplink transmission resource is: Sending time of the uplink transmission resource=Transition time point+Receiving-to-sending switch time+Uplink time indicated in the next signaling.

Specifically, for a method for receiving signaling in a WLAN by using a STA, reference may be made to the description in Embodiment 1, and details are not repeatedly described in this embodiment of the present invention.

Because the STA in this embodiment can be configured to execute the method in the foregoing Embodiment 1, for a technical effect that can be achieved in this embodiment, reference may be made to the description in the foregoing embodiment, and details are not repeatedly described herein.

Embodiment 6

Figure 30:
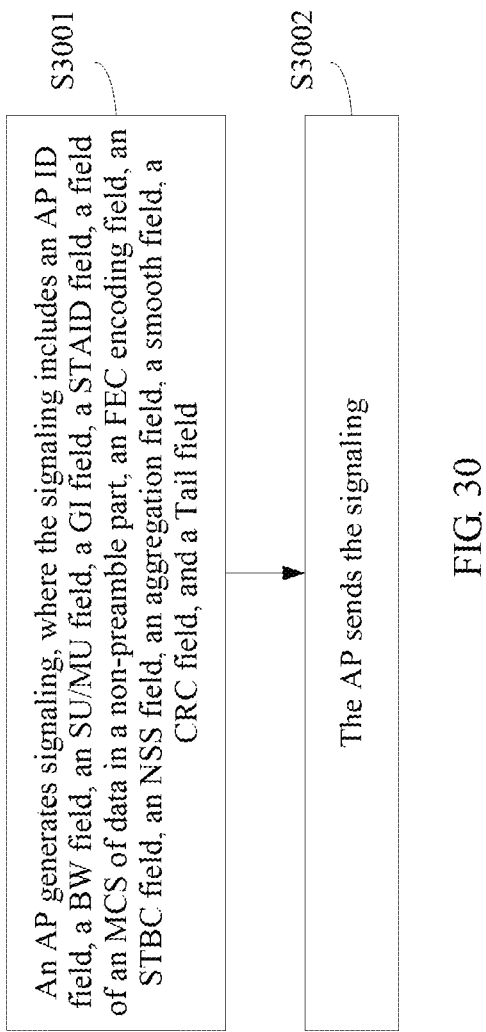
FIG. 30 is a schematic flowchart of a method for sending signaling in a WLAN according to an embodiment of the present invention.

This embodiment of the present invention provides a method for sending signaling in a WLAN, and the method is specifically applied to a scenario in which only SU transmission exists. As shown in FIG. 30, the method includes.

S3001. An AP generates signaling, where the signaling includes an AP ID field, a BW field, an SU/MU field, a GI field, a STAID field, a field of an MCS of data in a non-preamble part, an FEC encoding field, an STBC field, a field of a number of spatial streams (NSS for short), an aggregation field, a smooth field, a CRC field, and a Tail field.

The AP ID field is used to indicate an ID of the AP, the BW field is used to indicate bandwidth required for data transmission subsequent to the signaling, the SU/MU field is used to indicate that this transmission is the SU transmission, the GI field is used to indicate a length of a CP required for data transmission subsequent to the signaling, the STAID field is used to indicate an identifier of a STA in this transmission, the field of the transmission MCS of the data in the non-preamble part is used to indicate the transmission MCS of the data in the non-preamble part, the FEC encoding field is used to indicate a data encoding mode of the data in the non-preamble part, the STBC field is used to indicate whether data transmission subsequent to the signaling in the SU transmission is performed in an STBC manner, the NSS field is used to indicate a quantity of streams used in the SU transmission, the aggregation field is used to indicate whether the data in the non-preamble part is a single MPDU or aggregation of MPDUs, the smooth field is used to indicate information about sending in a beam forming manner, the CRC field is used to guard a field before the CRC field in the signaling, and the Tail field is used to empty an encoder and a decoder, where the CRC field and the Tail field are the last two fields of the signaling.

S3002. The AP sends the signaling.

Figure 31:
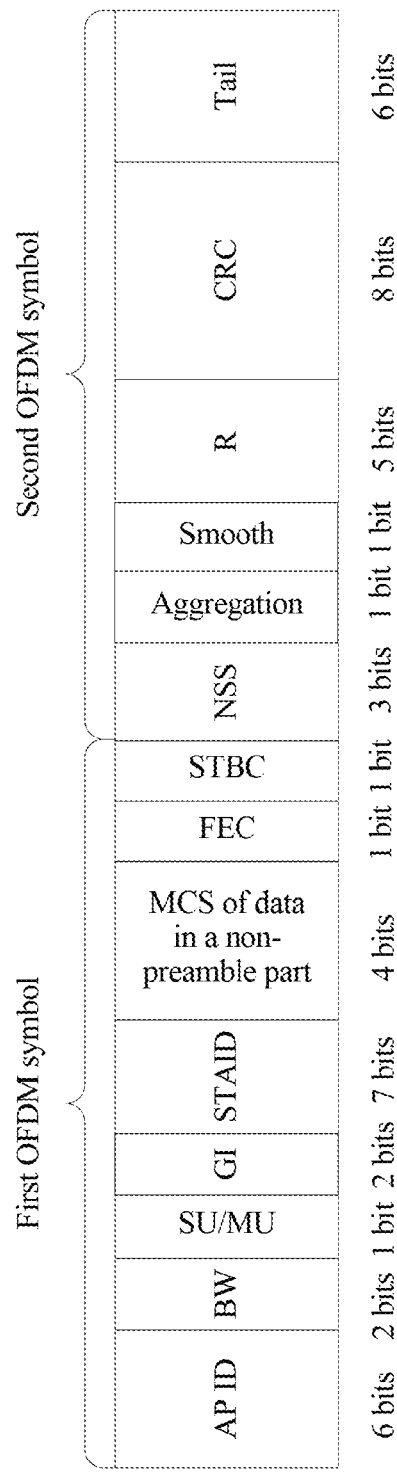
FIG. 31 is a schematic structural diagram 6 of HEW-SIG1 according to an embodiment of the present invention.

Specifically, an example in which the signaling generated by the AP is referred to as HEW-SIG1 is used for description. It is assumed that a location of the HEW-SIG1 in a data frame is shown in FIG. 9, one OFDM symbol carries 24-bit information, and the HEW-SIG1 includes two $4^{\mu s}$ OFDM symbols; in the scenario in which only SU transmission exists, as shown in FIG. 31, the HEW-SIG1 includes an AP ID field, a BW field, an SU/MU field, a GI field, a STAID field, a field of an MCS of data in a non-preamble part, an FEC encoding field, an STBC field, an NSS field, an aggregation field, a smooth field, a CRC field, and a tail field. An order of the fields and a quantity of bits of each field are shown in FIG. 31.

It should be noted that, in this example, the NSS field is indicated by using 3 bits. That 000 represents one spatial stream, 001 represents two spatial streams, 010 represents three spatial streams, 011 represents four spatial streams, 100 represents five spatial streams, 101 represents six spatial streams, no represents seven spatial streams, and 111 represents eight spatial streams may be designed.

It should be noted that, in this example, the smooth field is used to indicate information about sending in a beam forming manner, and specifically, may instruct a receive end to determine, according to whether beam forming is performed, whether channel smoothing can be performed.

It should be noted that, in this embodiment of the present invention, an indication manner of the field of the transmission MCS of the data in the non-preamble part is the same as an indication manner of an MCS field in a current standard (such as 802.11a, 802.11n, or 802.11ac), an indication manner of the STBC field is the same as an indication manner of an STBC field in a current standard (such as 802.11n or 802.11ac), and indication manners of the aggregation field and the smooth field are the same as indication manners of an aggregation field and a smooth field in a current standard (such as 802.11n). This is not specifically limited in this embodiment of the present invention.

It should be noted that a structure shown in FIG. 31 is applicable to both uplink transmission and downlink transmission. Specifically, whether uplink transmission or downlink transmission is performed may be determined according to an AP ID, a STAID, and a received/sent signal. For example, if a STA is a receive end, and an AP is a transmit end, after receiving and parsing signaling sent by the AP, the STA learns that an AP ID included in the signaling matches an ID of an AP associated with the STA, and then the downlink transmission may be determined. Optionally, a UL/DL indication field may be further added to FIG. 31. This is not specifically limited in this embodiment of the present invention.

It should be noted that FIG. 31 exemplarily presents a structural design solution of HEW-SIG1. Certainly, a location of a specific field, a symbol in which a specific field is located, and a quantity of bits used by each field in FIG. 31 all may be adjusted, for example, the STAID field may be indicated by using 5-10 bits, and the NSS field may be indicated by using 2 bits or 4 bits. This is not specifically limited in this embodiment of the present invention.

Figure 32:
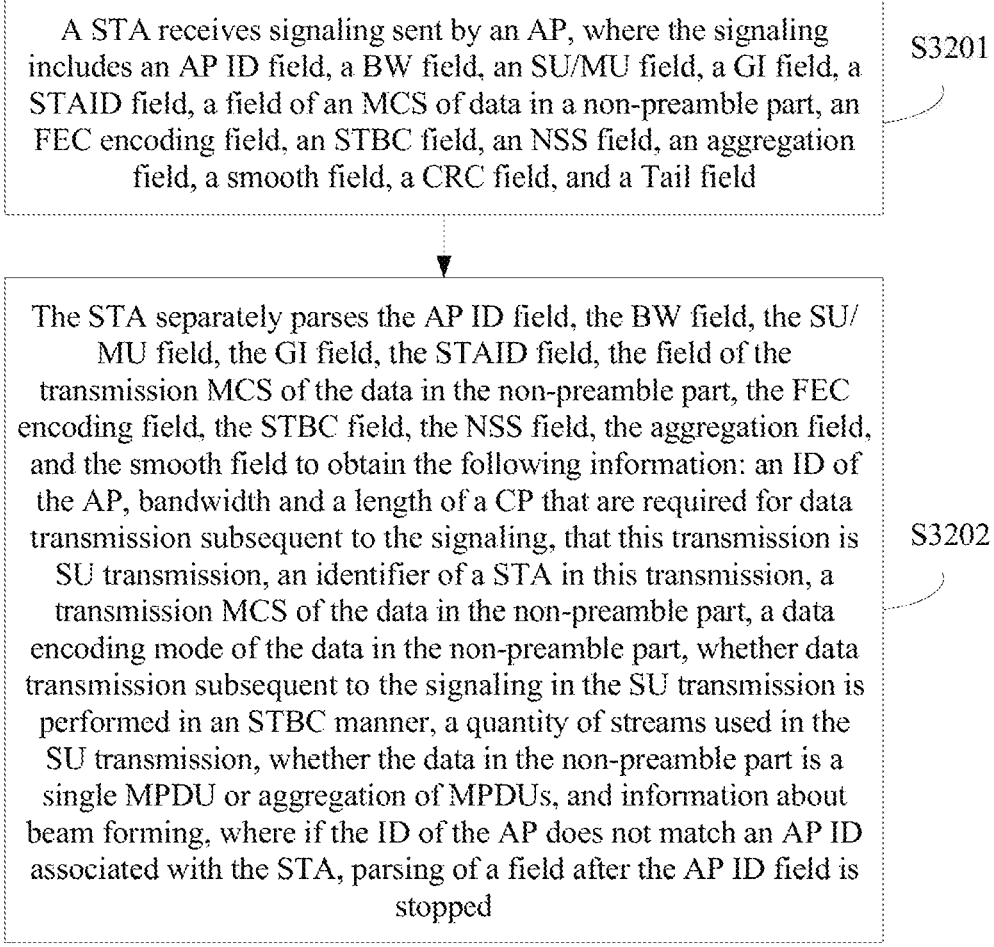
FIG. 32 is a schematic flowchart of a method for sending signaling in a WLAN according to an embodiment of the present invention.

An embodiment of the present invention further provides a method for sending signaling in a WLAN, and the method is specifically applied to a scenario in which only SU transmission exists. As shown in FIG. 32, the method includes:

S3201. A STA receives signaling sent by an AP, where the signaling includes an AP ID field, a BW field, an SU/MU field, a GI field, a STAID field, a field of an MCS of data in a non-preamble part, an FEC encoding field, an STBC field, an NSS field, an aggregation field, a smooth field, a CRC field, and a Tail field.

The AP ID field is used to indicate an ID of the AP, the BW field is used to indicate bandwidth required for data transmission subsequent to the signaling, the SU/MU field is used to indicate that this transmission is the SU transmission, the GI field is used to indicate a length of a CP required for data transmission subsequent to the signaling, the STAID field is used to indicate an identifier of a STA in this transmission, the field of the transmission MCS of the data in the non-preamble part is used to indicate the transmission MCS of the data in the non-preamble part, the FEC encoding field is used to indicate a data encoding mode of the data in the non-preamble part, the STBC field is used to indicate whether data transmission subsequent to the signaling in the SU transmission is performed in an STBC manner, the NSS field is used to indicate a quantity of streams used in the SU transmission, the aggregation field is used to indicate whether the data in the non-preamble part is a single MPDU or aggregation of MPDUs, the smooth field is used to indicate information about sending in a beam forming manner, the CRC field is used to guard a field before the CRC field in the signaling, and the Tail field is used to empty an encoder and a decoder, where the CRC field and the Tail field are the last two fields of the signaling.

S3202. The STA parses the AP ID field, the BW field, the SU/MU field, the GI field, the STAID field, the field of the transmission MCS of the data in the non-preamble part, the FEC encoding field, the STBC field, the NSS field, the aggregation field, and the smooth field to respectively obtain the following information: an ID of the AP, bandwidth and a length of a CP that are required for data transmission subsequent to the signaling, that this transmission is the SU transmission, an identifier of a STA in this transmission, the transmission MCS of the data in the non-preamble part, a data encoding mode of the data in the non-preamble part, whether data transmission subsequent to the signaling in the SU transmission is performed in an STBC manner, a quantity of streams used in the SU transmission, whether the data in the non-preamble part is a single MPDU or aggregation of MPDUs, and information about beam forming, where if the ID of the AP does not match an AP ID associated with the STA, parsing of a field after the AP ID field is stopped.

Specifically, in this embodiment of the present invention, for a schematic structural diagram of the signaling received by the STA, reference may be made to FIG. 31, and details are not repeatedly described in this embodiment of the present invention.

Figure 33A:
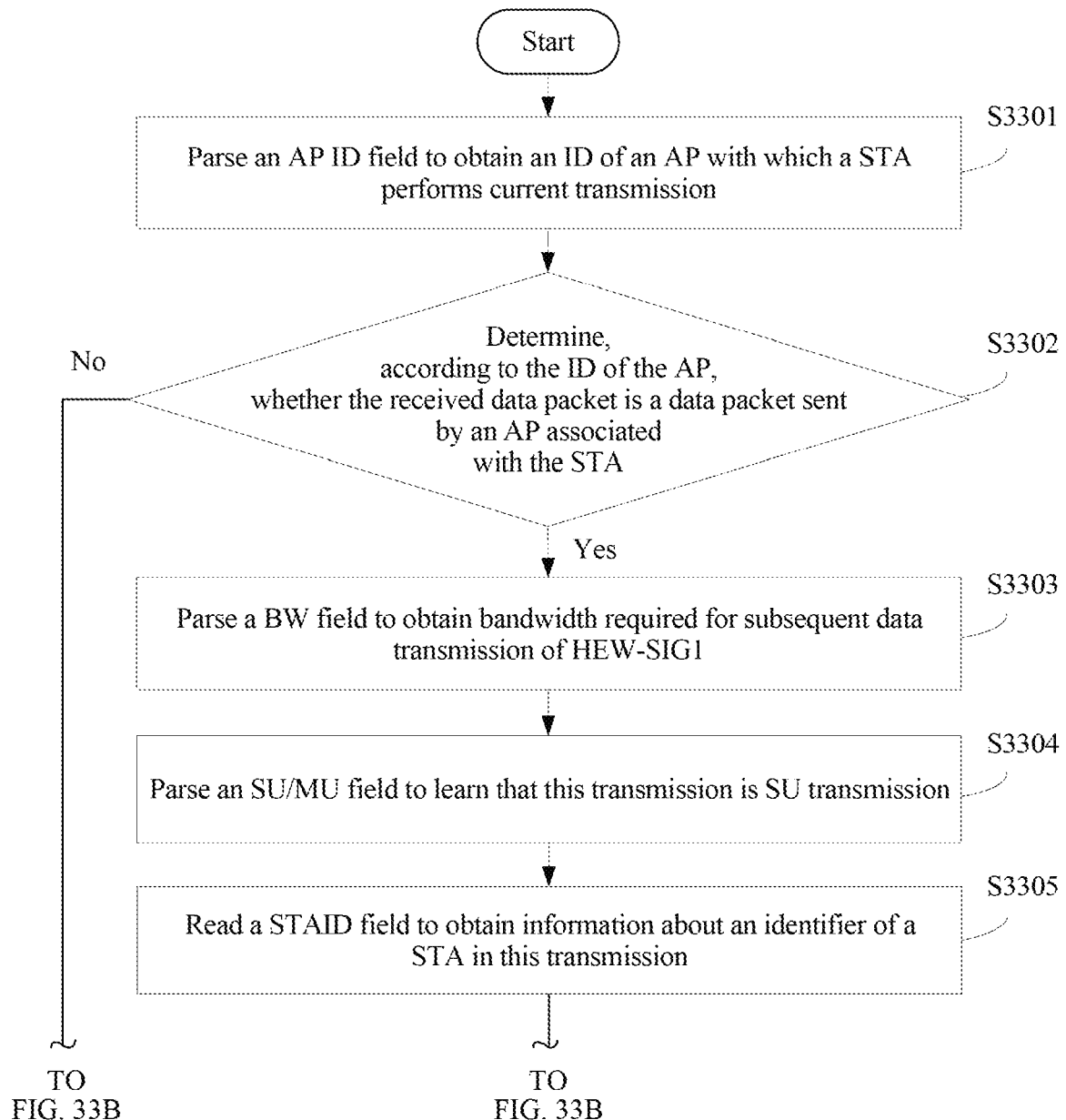
FIG. 33A and FIG. 33B are a schematic flowchart of parsing signaling HEW-SIG1 according to an embodiment of the present invention.
Figure 33B:
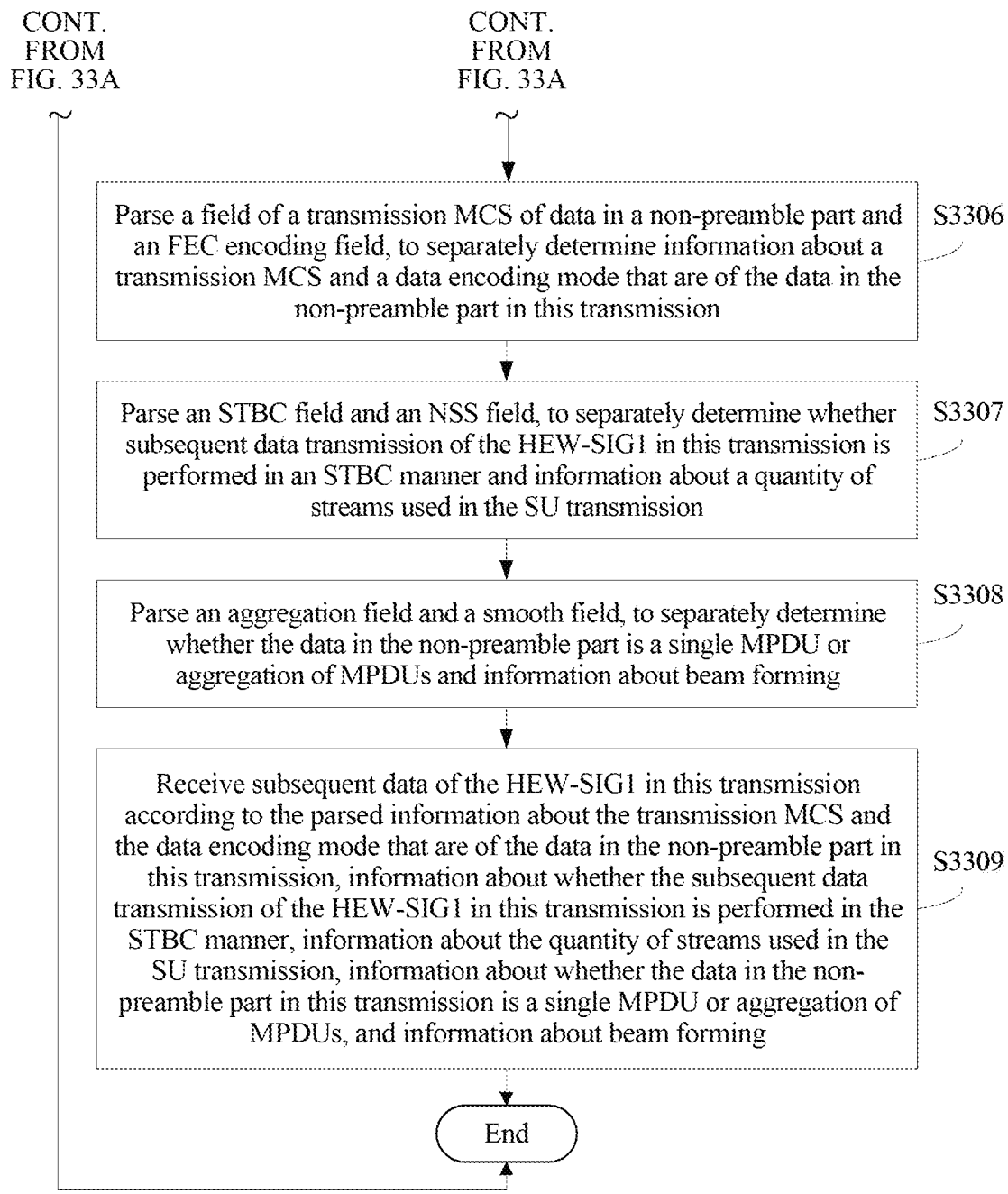

It is assumed that the schematic structural diagram of the signaling received by the STA is shown in FIG. 31. A schematic flowchart of parsing signaling HEW-SIG1 by the STA after receiving a data packet is provided herein. As shown in FIG. 33A and FIG. 33B, a procedure includes the following steps.

S3301. Parse an AP ID field to obtain an ID of an AP with which the STA performs current transmission.

S3302. Determine, according to the ID of the AP, whether the received data packet is a data packet sent by an AP associated with the STA.

If the received data packet is the data packet sent by the AP associated with the STA, step S3303 is performed; or if the received data packet is not the data packet sent by the AP associated with the STA, the procedure ends.

S3303. Parse a BW field to obtain bandwidth required for subsequent data transmission of the HEW-SIG1.

S3304. Parse an SU/MU field to learn that this transmission is SU transmission.

S3305. Read a STAID field to obtain information about an identifier of a STA in this transmission.

S3306. Parse a field of a transmission MCS of data in a non-preamble part and an FEC encoding field, to determine information about a transmission MCS and a data encoding mode that are of the data in the non-preamble part in this transmission.

S3307. Parse an STBC field and an NSS field, to determine whether subsequent data transmission of the HEW-SIG1 in this transmission is performed in an STBC manner and information about a quantity of streams used in the SU transmission.

S3308. Parse an aggregation field and a smooth field, to determine whether the data in the non-preamble part is a single MPDU or aggregation of MPDUs and information about beam forming.

S3309. Receive subsequent data of the HEW-SIG1 in this transmission according to the parsed information about the transmission MCS and the data encoding mode that are of the data in the non-preamble part in this transmission, information about whether the subsequent data transmission of the HEW-SIG1 in this transmission is performed in the STBC manner, information about the quantity of streams used in the SU transmission, information about whether the data in the non-preamble part in this transmission is a single MPDU or aggregation of MPDUs, and information about beam forming.

It should be noted that, if this transmission is MU transmission, the STA may receive data according to a carrier allocation format of MU. This is not specifically limited in this embodiment of the present invention.

Optionally, in the method for sending signaling in a WLAN according to this embodiment of the present invention, in a scenario of SU transmission, signaling may also be generated by the STA, and the AP receives the signaling sent by the STA, where a structure of the signaling is the same as that in FIG. 31, and a schematic flowchart of parsing signaling HEW-SIG1 by the AP after receiving the signaling is similar to FIG. 33A and FIG. 33B. A difference lies only in that, if the AP parses the signaling HEW-SIG1, the "determine, according to the ID of the AP, whether the received data packet is a data packet sent by an AP associated with the STA" in step S3302 needs to be replaced with "determine, according to the ID of the AP, whether the data packet is sent to the AP". This case is not described in detail in this embodiment of the present invention, and for details, reference may be made to the description in the foregoing embodiment.

The foregoing solution provides an OFDMA-based design solution for common signaling in a WLAN system, thereby resolving a prior-art problem that there is no OFDMA-based design solution for common signaling in the WLAN system.

Embodiment 7

Figure 34:
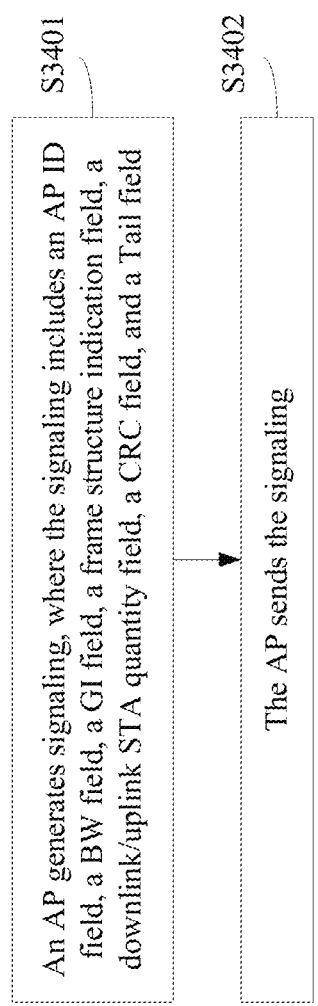
FIG. 34 is a schematic flowchart of a method for sending signaling in a WLAN according to an embodiment of the present invention.

This embodiment of the present invention provides a method for sending signaling in a WLAN. As shown in FIG. 34, the method includes.

S3401. An AP generates signaling, where the signaling includes an AP ID field, a BW field, a GI field, a frame structure indication field, a downlink/uplink STA quantity field, a CRC field, and a Tail field.

The AP ID field is used to indicate an ID of the AP, the BW field is used to indicate bandwidth required for data transmission subsequent to the signaling, the GI is used to indicate a length of a CP required for data transmission subsequent to the signaling, the frame structure indication field is used to indicate that a frame structure of this scheduling transmission is a structure cascading downlink and uplink, the downlink/uplink STA quantity field is used to indicate a quantity of downlink/uplink users in this scheduling transmission, the CRC field is used to guard a field before the CRC field in the signaling, and the Tail field is used to empty an encoder and a decoder, where the CRC field and the Tail field are the last two fields of the signaling.

S3402. The AP sends the signaling.

Specifically, the downlink/uplink STA quantity field is introduced in this embodiment of the present invention. If the frame structure indication field indicates that the frame structure of this scheduling transmission is the structure cascading downlink and uplink, the downlink/uplink STA quantity field in this transmission is read, to determine whether the signaling in resource indication information indicates a downlink transmission resource or an uplink transmission resource.

It should be noted that, the signaling in this embodiment of the present invention may further include another field in addition to the AP ID field, the BW field, the GI field, the frame structure indication field, the downlink/uplink STA quantity field, the CRC field, and the Tail field. This is not specifically limited in this embodiment of the present invention.

Figure 35:
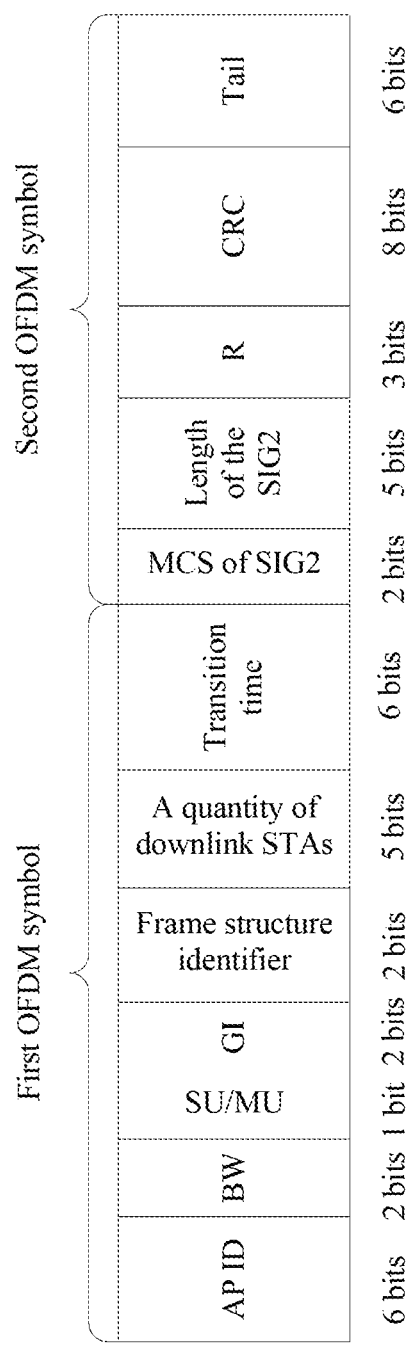
FIG. 35 is a schematic structural diagram 7 of HEW-SIG1 according to an embodiment of the present invention.

An example in which the signaling generated by the AP is referred to as HEW-SIG1 is used for description. It is assumed that a location of the HEW-SIG1 in a data frame is shown in FIG. 9, one OFDM symbol carries 24-bit information, and the HEW-SIG1 includes two $4^{\mu s}$ OFDM symbols. Exemplarily, as shown in FIG. 35, the HEW-SIG1 includes an AP ID field, a BW field, an SU/MU field, a GI field, a frame structure indication field, a downlink STA quantity field, a transition time field, an HEW-SIG2 MCS field, an HEW-SIG2 length field, a CRC field, and a tail field. An order of the fields and a quantity of bits of each field are shown in FIG. 31.

Figure 36:
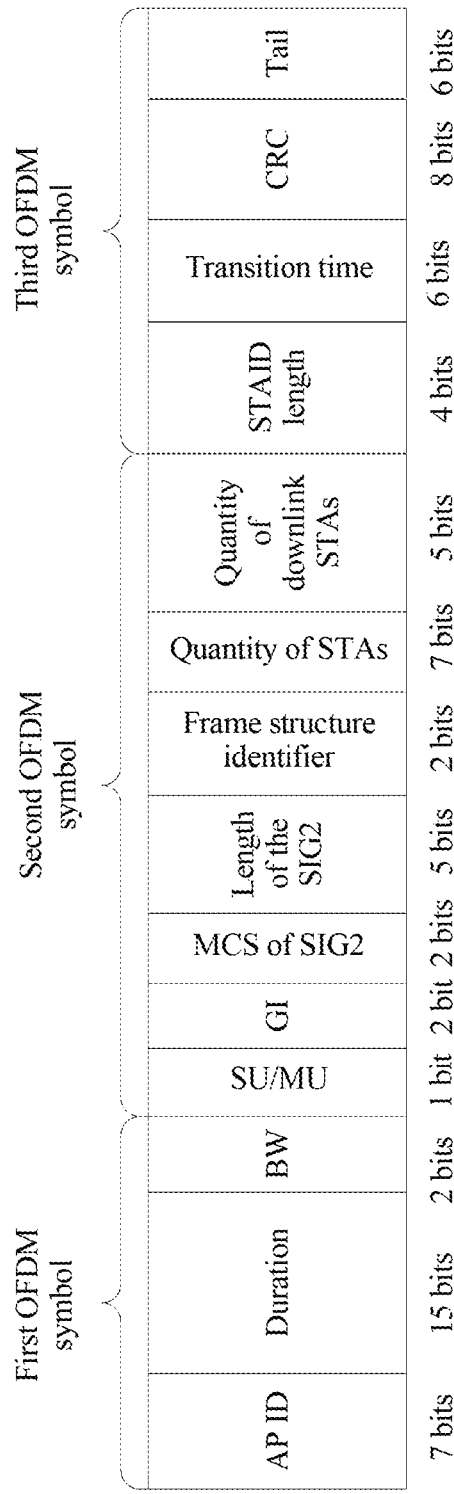
FIG. 36 is a schematic structural diagram 8 of HEW-SIG1 according to an embodiment of the present invention.

Exemplarily, assuming that the HEW-SIG1 includes three $4^{\mu s}$ OFDM symbols, as shown in FIG. 36, the HEW-SIG1 includes an AP ID field, a duration field, a BW field, an SU/MU field, a GI field, an HEW-SIG2 MCS field, an HEW-SIG2 MCS field, a frame structure indication field, a STA quantity field, a downlink STA quantity field, a STAID length field, a transition time field, a CRC field, and a tail field. An order of the fields and a quantity of bits of each field are shown in FIG. 36.

It should be noted that FIG. 35 and FIG. 36 exemplarily present structural design solutions of HEW-SIG1. Certainly, a location of a specific field, a symbol in which a specific field is located, and a quantity of bits used by each field in FIG. 35 and FIG. 36 may be adjusted. This is not specifically limited in this embodiment of the present invention.

Figure 37:
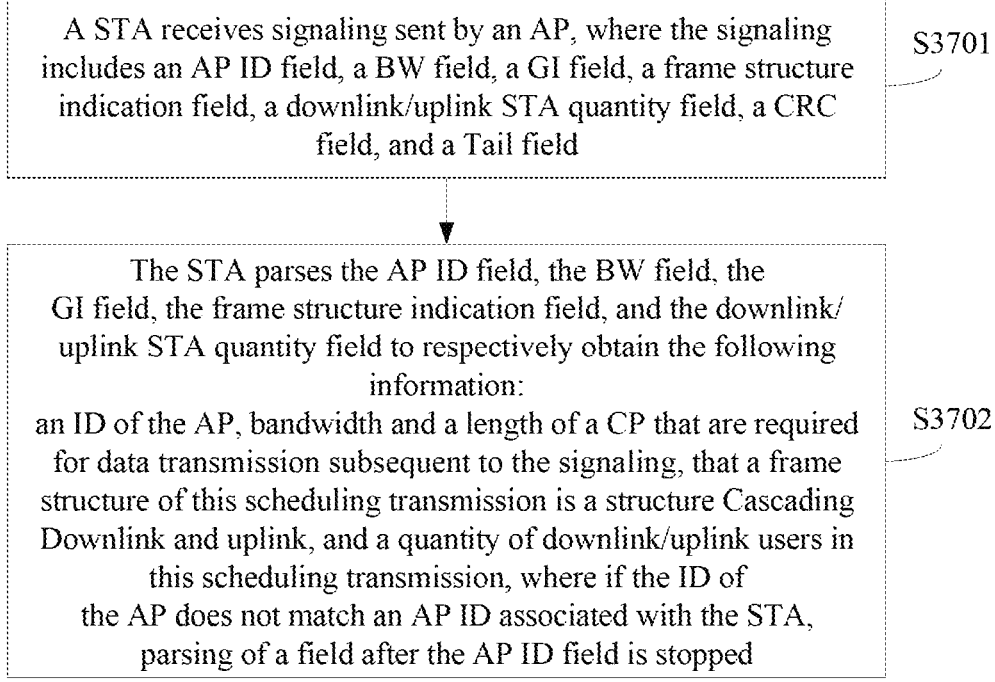
FIG. 37 is a schematic flowchart of a method for sending signaling in a WLAN according to an embodiment of the present invention.

An embodiment of the present invention provides a method for sending signaling in a WLAN. As shown in FIG. 37, the method includes.

S3701. A STA receives signaling sent by an AP, where the signaling includes an AP ID field, a BW field, a GI field, a frame structure indication field, a downlink/uplink STA quantity field, a CRC field, and a Tail field.

The AP ID field is used to indicate an ID of the AP, the BW field is used to indicate bandwidth required for data transmission subsequent to the signaling, the GI field is used to indicate a length of a CP required for data transmission subsequent to the signaling, the frame structure indication field is used to indicate that a frame structure of this scheduling transmission is a structure cascading downlink and uplink, the downlink/uplink STA quantity field is used to indicate a quantity of downlink/uplink users in this scheduling transmission, the CRC field is used to guard a field before the CRC field in the signaling, and the Tail field is used to empty an encoder and a decoder, where the CRC field and the Tail field are the last two fields of the signaling.

S3702. The STA parses the AP ID field, the BW field, the GI field, the frame structure indication field, and the downlink/uplink STA quantity field to respectively obtain the following information: an ID of the AP, bandwidth and a length of a CP that are required for data transmission subsequent to the signaling, that a frame structure of this scheduling transmission is a structure cascading downlink and uplink, and a quantity of downlink/uplink users in this scheduling transmission, where if the ID of the AP does not match an AP ID associated with the STA, parsing of a field after the AP ID field is stopped.

Specifically, in this embodiment of the present invention, for a schematic structural diagram of the signaling received by the STA, reference may be made to FIG. 35 and FIG. 36, and details are not repeatedly described in this embodiment of the present invention.

Specifically, assuming that the schematic structural diagram of the signaling received by the STA is specifically shown in FIG. 35, after reading the frame structure indication field of the HEW-SIG1 to learn that the frame structure of this scheduling transmission is the structure cascading downlink and uplink, the STA further reads a downlink STA quantity field, to determine a quantity of users scheduled in the downlink. For example, if k users are scheduled in the downlink, when reading resource allocation information and reading the first k pieces of resource allocation information of the STAs, the STA learns that information that has been allocated at this time is downlink information, and information allocated after the k pieces of resource allocation information is uplink information. Therefore, there is no need to indicate, in each piece of resource allocation information of a STA, that the allocation information is downlink allocation information or uplink allocation information.

Certainly, in a signaling structure shown in FIG. 35, the downlink STA quantity field may be replaced with an uplink STA quantity field. The uplink STA quantity field is used to indicate a quantity of uplink users in this scheduling transmission, that is, a quantity of users scheduled in the uplink. After reading the frame structure indication field of the HEW-SIG1 to learn that the frame structure of this scheduling transmission is the structure cascading downlink and uplink, the STA further reads the uplink STA quantity field, to determine the quantity of users scheduled in the uplink. It is assumed that k users are scheduled in the uplink, when reading resource allocation information and reading the first k pieces of resource allocation information of the STAs, the STA learns that information that has been allocated at this time is uplink information, and information allocated after the k pieces of resource allocation information is downlink information. Similarly, there is no need to indicate, in each piece of resource allocation information of a STA, that the allocation information is uplink allocation information or downlink allocation information.

Specifically, assuming that the schematic structural diagram of the signaling received by the STA is specifically shown in FIG. 36, the STA may determine, according to a STA quantity field and the downlink STA quantity field, whether resource allocation indication information is a downlink indication or an uplink indication; therefore, there is no need to add an indication indicating whether allocation information is downlink allocation information or uplink allocation information to the resource allocation indication information for each piece of allocation information. For example, if a quantity of scheduled STAs is 16, and a quantity of downlink STAs is 8, the first eight pieces of resource allocation information are downlink allocation information indications, and the remaining eight pieces of resource allocation information are uplink allocation information indications.

Similarly, the downlink STA quantity field in FIG. 36 may also be replaced with an uplink STA quantity field. The uplink STA quantity field is used to indicate a quantity of uplink users in this scheduling transmission, that is, a quantity of users scheduled in the uplink. A using principle is the same as that in the foregoing method. For example, if a quantity of scheduled STAs is 16, and a quantity of uplink STAs is 8, the first eight pieces of resource allocation information are uplink allocation information indications, and the remaining eight pieces of resource allocation information are downlink allocation information indications. In this way, it may be implemented that there is no need to add an indication indicating whether allocation information is downlink allocation information or uplink allocation information to the resource allocation indication information for each piece of allocation information.

The foregoing solution provides an OFDMA-based design solution for common signaling in a WLAN system, thereby resolving a prior-art problem that there is no OFDMA-based design solution for common signaling in the WLAN system.

Embodiment 8

Figure 38:
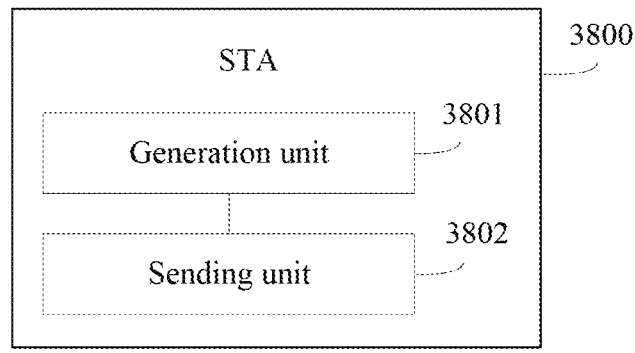
FIG. 38 is a schematic structural diagram 5 of a STA according to an embodiment of the present invention.

This embodiment of the present invention provides a STA 3800. As shown in FIG. 38, the STA 3800 includes a generation unit 3801 and a sending unit 3802.

The generation unit 3801 is configured to generate signaling if this transmission is SU transmission, where the signaling includes an access point identifier AP ID field, a bandwidth BW field, an SU/multi-user MU field, a guard interval GI field, a station identifier STAID field, a field of a transmission modulation and coding scheme MCS of data in a non-preamble part, a forward error correction FEC encoding field, a space time block coding STBC field, a number of spatial streams NSS field, an aggregation field, a smooth field, a cyclic redundancy check CRC field, and a tail field, the AP ID field is used to indicate an ID of the AP, the BW field is used to indicate bandwidth required for data transmission subsequent to the signaling, the SU/MU field is used to indicate that this transmission is the SU transmission, the GI field is used to indicate a length of a cyclic prefix CP required for data transmission subsequent to the signaling, the STAID field is used to indicate an identifier of a STA in this transmission, the field of the transmission MCS of the data in the non-preamble part is used to indicate the transmission MCS of the data in the non-preamble part, the FEC encoding field is used to indicate a data encoding mode of the data in the non-preamble part, the STBC field is used to indicate whether data transmission subsequent to the signaling in the SU transmission is performed in an STBC manner, the NSS field is used to indicate a quantity of streams used in the SU transmission, the aggregation field is used to indicate whether the data in the non-preamble part is a single media access control protocol data unit MPDU or aggregation of MPDUs, the smooth field is used to indicate information about sending in a beam forming manner, the CRC field is used to guard a field before the CRC field in the signaling, and the Tail field is used to empty an encoder and a decoder, where the CRC field and the Tail field are the last two fields of the signaling.

The sending unit 3802 is configured to send the signaling.

Because the STA 3800 in this embodiment can be configured to execute the method in the foregoing Embodiment 6, for a technical effect that can be achieved in this embodiment, reference may be made to the description in the foregoing embodiment, and details are not repeatedly described herein.

Embodiment 9

Figure 39:
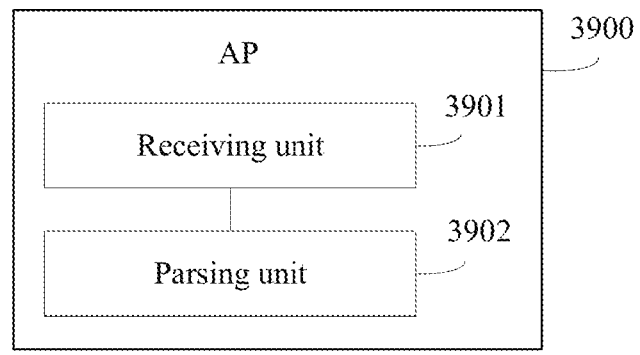
FIG. 39 is a schematic structural diagram 5 of an AP according to an embodiment of the present invention.

This embodiment of the present invention provides an AP 3900. As shown in FIG. 39, the AP 3900 includes a receiving unit 3901 and a parsing unit 3902.

The receiving unit 3901 is configured to: if this transmission is SU transmission, receive signaling sent by a station STA, where the signaling includes an AP identifier ID field, a bandwidth BW field, an SU/MU field, a guard interval GI field, a station identifier STAID field, a field of a transmission modulation and coding scheme MCS of data in a non-preamble part, a forward error correction FEC encoding field, a space time block coding STBC field, a number of spatial streams NSS field, an aggregation field, a smooth field, a cyclic redundancy check CRC field, and a tail field, the AP ID field is used to indicate an ID of the AP 3900, the BW field is used to indicate bandwidth required for data transmission subsequent to the signaling, the SU/MU field is used to indicate that this transmission is the SU transmission, the GI field is used to indicate a length of a cyclic prefix CP required for data transmission subsequent to the signaling, the STAID field is used to indicate an identifier of a STA in this transmission, the field of the transmission MCS of the data in the non-preamble part is used to indicate the transmission MCS of the data in the non-preamble part, the FEC encoding field is used to indicate a data encoding mode of the data in the non-preamble part, the STBC field is used to indicate whether data transmission subsequent to the signaling in the SU transmission is performed in an STBC manner, the NSS field is used to indicate a quantity of streams used in the SU transmission, the aggregation field is used to indicate whether the data in the non-preamble part is a single MPDU or aggregation of MPDUs, the smooth field is used to indicate information about sending in a beam forming manner, the CRC field is used to guard a field before the CRC field in the signaling, and the Tail field is used to empty an encoder and a decoder, where the CRC field and the Tail field are the last two fields of the signaling.

The parsing unit 3902 is configured to parse the AP ID field, the BW field, the GI field, the SU/MU field, the STAID field, the field of the transmission MCS of the data in the non-preamble part, the FEC encoding field, the STBC field, the NSS field, the aggregation field, and the smooth field to respectively obtain the following information: the ID of the AP 3900, the bandwidth and the length of the CP that are required for data transmission subsequent to the signaling, that this transmission is the SU transmission, the identifier of the STA in this transmission, the transmission MCS of the data in the non-preamble part, the data encoding mode of the data in the non-preamble part, whether the data transmission subsequent to the signaling in the SU transmission is performed in the STBC manner, the quantity of streams used in the SU transmission, whether the data in the non-preamble part is a single MPDU or aggregation of MPDUs, and the information about beam forming, where if the ID of the AP does not match an AP ID of the AP, parsing of a field after the AP ID field is stopped.

Because the AP 3900 in this embodiment can be configured to execute the method in the foregoing Embodiment 6, for a technical effect that can be achieved in this embodiment, reference may be made to the description in the foregoing embodiment, and details are not repeatedly described herein.

The foregoing descriptions are merely specific implementation manners of the present embodiments, but are not intended to limit the protection scope of the present embodiments. Any variation or replacement readily figured out by persons skilled in the art within the technical scope disclosed in the present embodiments shall fall within the protection scope of the present embodiments. Therefore, the protection scope of the present embodiments shall be subject to the protection scope of the claims.

Figure 9A:
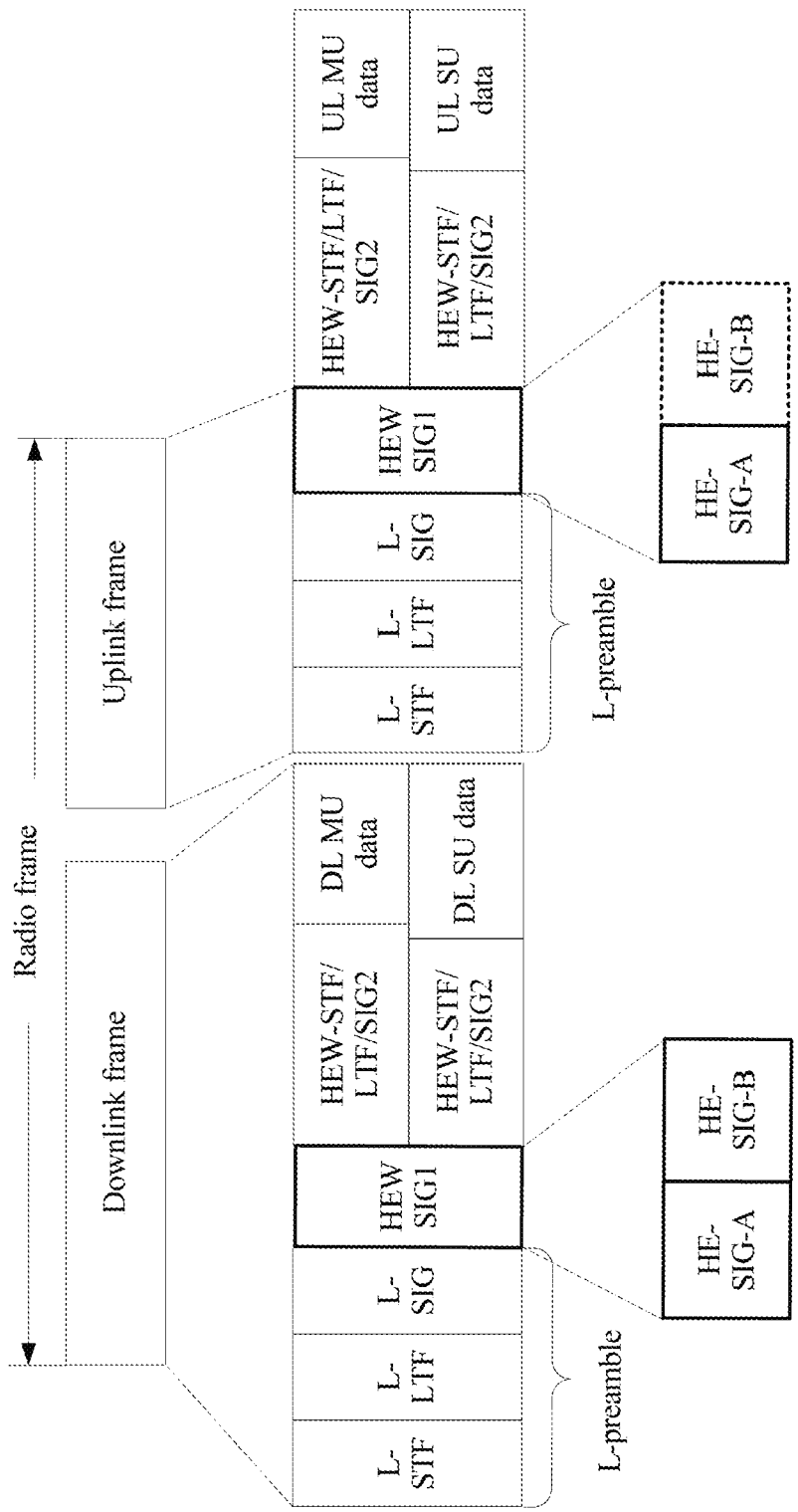
FIG. 9a is a schematic structural diagram of a data frame according to an embodiment of the present invention.

Persons skilled in the art may understand that, in addition to FIG. 9, a frame structure involved in the present embodiments may be further shown in FIG. 9a, where in an uplink frame or a downlink frame, signaling HEW-SIG1 is located after a legacy preamble, or signaling HEW-SIG2 is further included, and the signaling HEW-SIG1 may include HE-SIG-A or further include HE-SIG-B. Specifically, the uplink frame may also include a legacy preamble (L-preamble) and signaling HEW SIG1. HEW-SIG2 in the downlink frame, and the L-preamble, the HEW-SIG1, or HEW-SIG2 in the uplink frame are optional. HE-SIG-A or HE-SIG-B in the HEW-SIG1 is also optional.

In the downlink frame, the HEW SIG1 may be divided into two parts. A first part (which may be referred to as HE-SIG-A) is transmitted by using a fixed MCS, that is, a symbol length and a quantity of symbols are fixed, to transmit basic signaling and determine that the radio frame is in a 11ax frame format. For a second part (which may be referred to as HE-SIG-B), a variable length and different quantities of symbols may be used, where the variable length herein means that a CP length is selected according to a channel environment. The CP length and the quantity of symbols of the HE-SIG-B may be indicated in the HE-SIG-A. In an SU scenario, for the HE-SIG-B, the length and the quantity of symbols may be variable, or the CP length may be fixed, or the quantity of symbols is fixed, or both the CP length and the quantity of symbols are fixed. Signaling for a specific STA may also be placed at a start part of a resource allocated by the STA, for example, the HEW-SIG2 in the downlink frame in FIG. 9a.

Figure 40A:
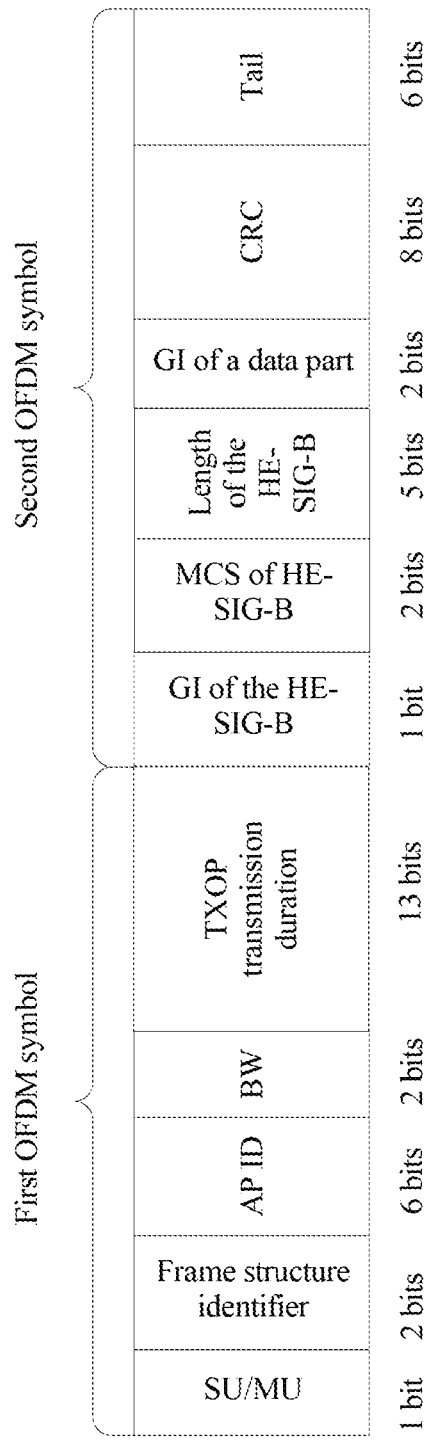
Figure 40B:
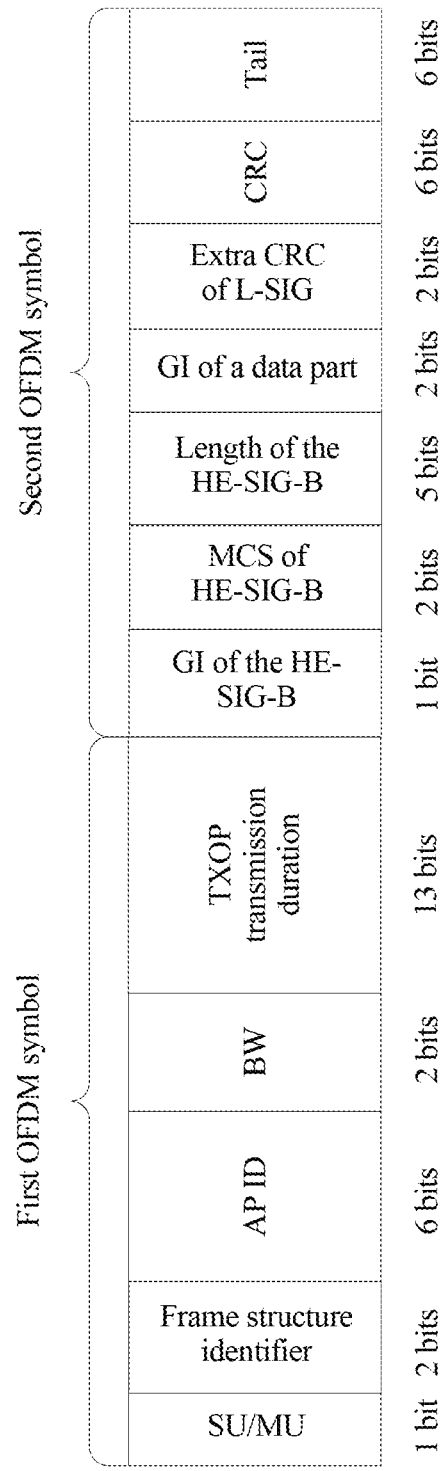
Figure 40C:
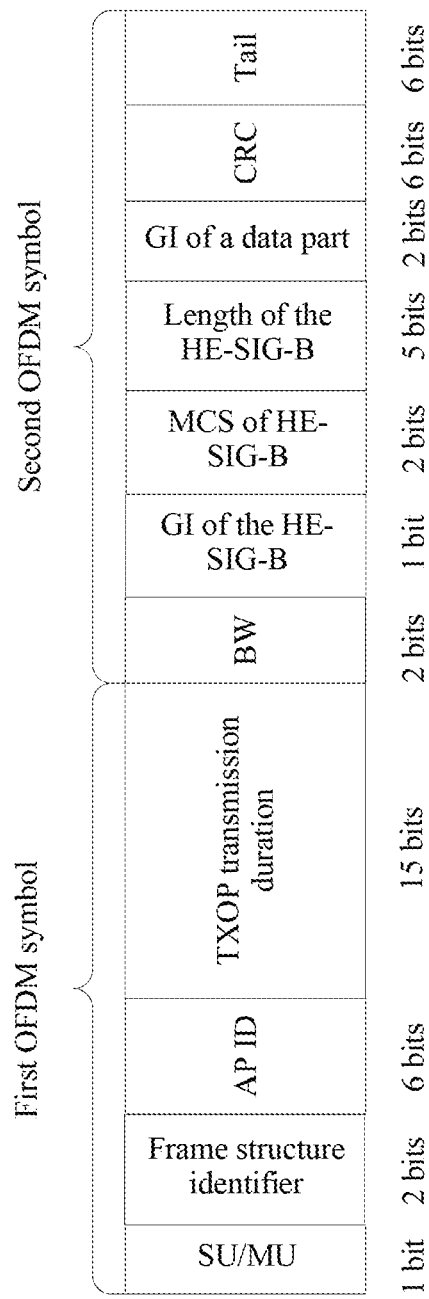
Figure 41:
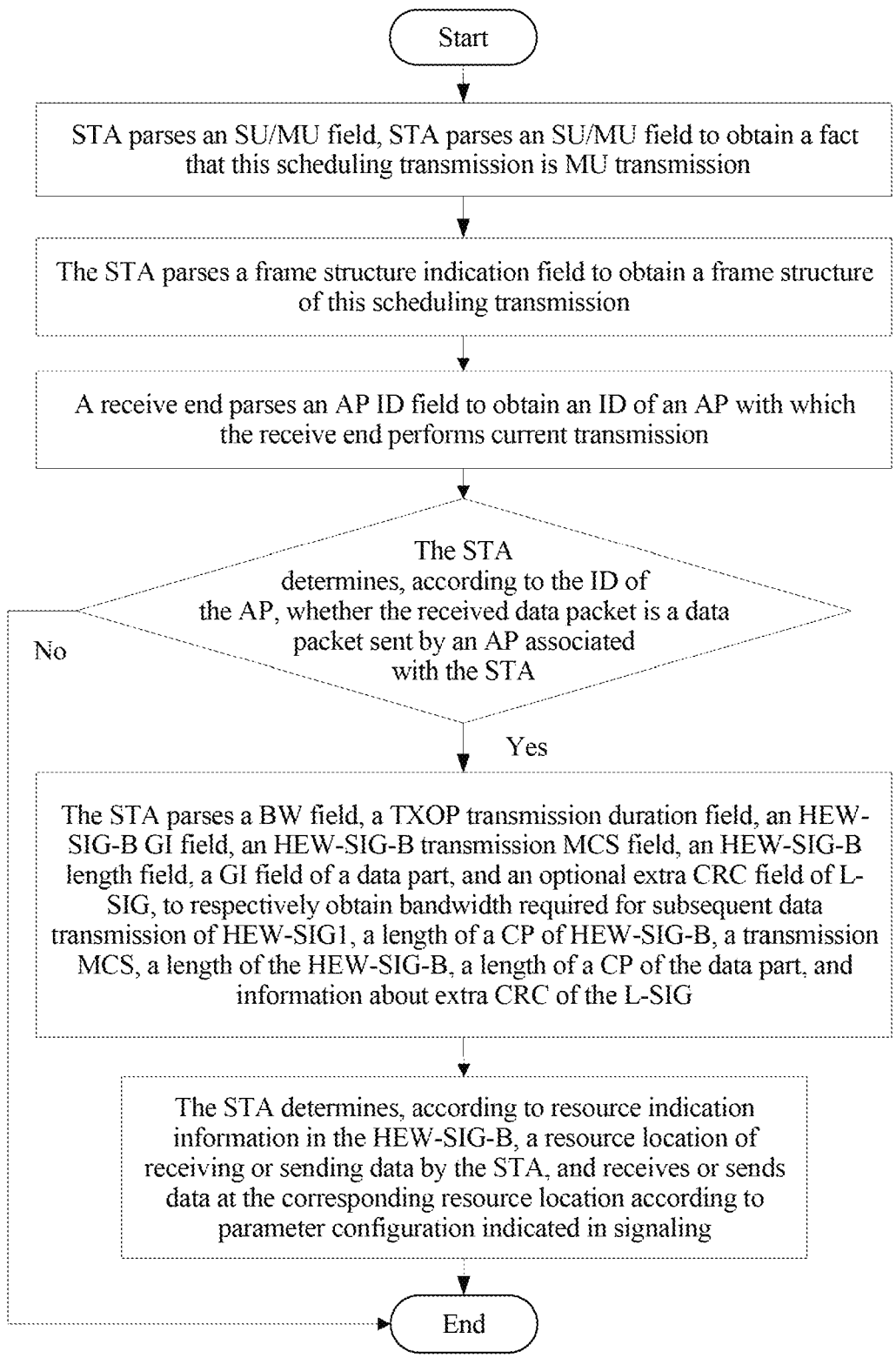
FIG. 41 is a schematic diagram of a processing procedure of a receive end according to an embodiment of the present invention.
Figure 42:
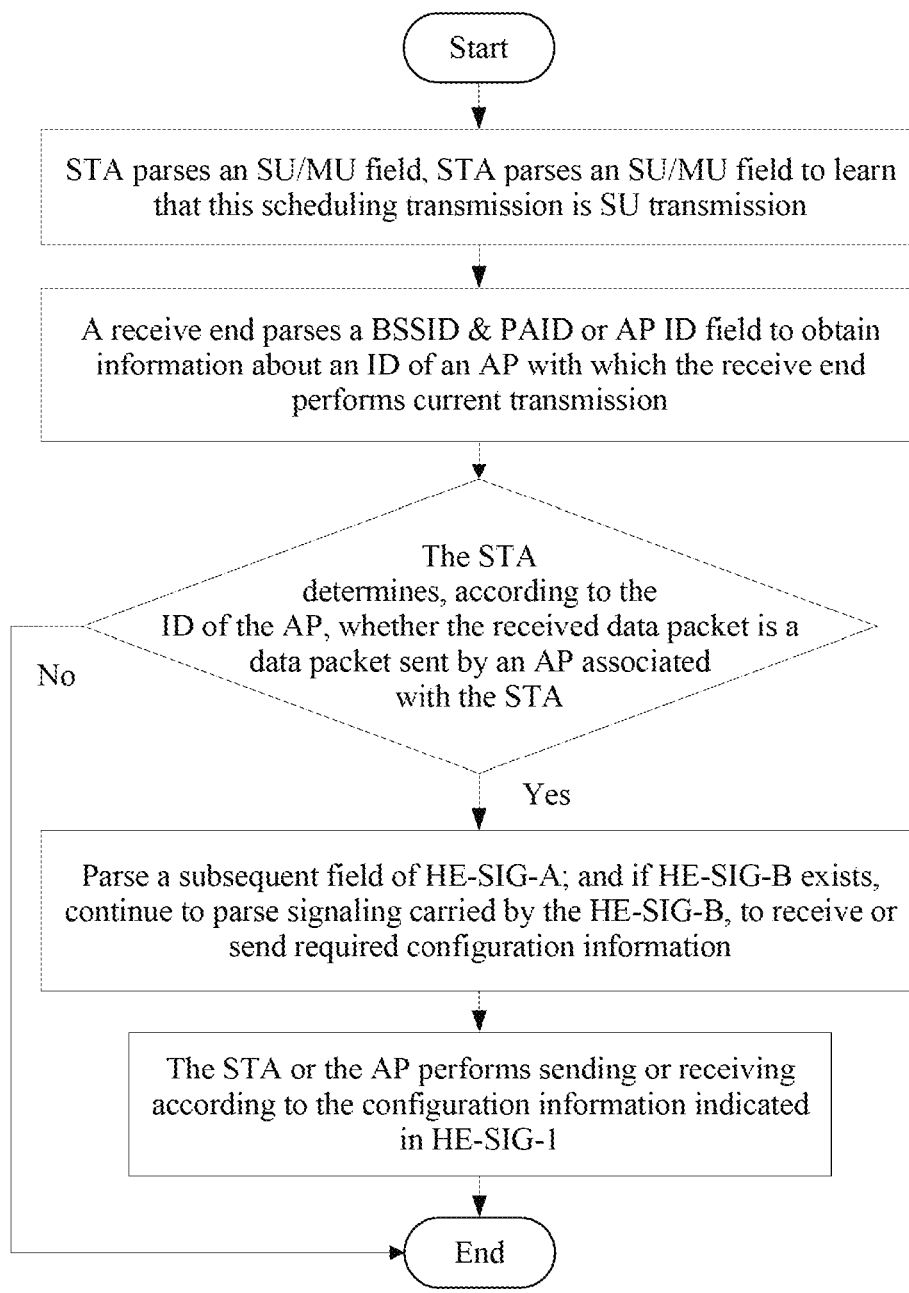
FIG. 42 is another schematic diagram of a processing procedure of a receive end according to an embodiment of the present invention.

In an MU scenario, when the first signaling HE-SIG-A is repeatedly transmitted, in a subcarrier allocation manner in the 802.11a, on each bandwidth of 20 MHz of a channel in a BSS established by an AP, fields of a first signaling HE-SIG-A may be further in formats shown in FIG. 40a, FIG. 40b, and FIG. 40c. A schematic flowchart of parsing the signaling HEW-SIG-A by a receive end after receiving a data packet is exemplarily provided herein, as shown in FIG. 41. In the MU scenario, for indication manners of the HE-SIG-A shown in FIG. 40a, FIG. 40b, and FIG. 40c, resource indication information and a configuration parameter of a specific data part such as a transmission MCS, a STAID/GID, a number of transmitted space time streams, an indication of a specific resource location, an indication that is for each STA and indicates whether LDPC is used, or an indication indicating whether STBC is used are placed in the HE-SIG-B for indicating.

As shown in FIG. 41, FIG. 41 is a schematic flowchart of parsing signaling HEW-SIG-A by a STA. In general, the STA sequentially parses content in the HEW-SIG-A and performs a corresponding operation according to content obtained by parsing, and details are not repeatedly described herein.

Figure 40D:
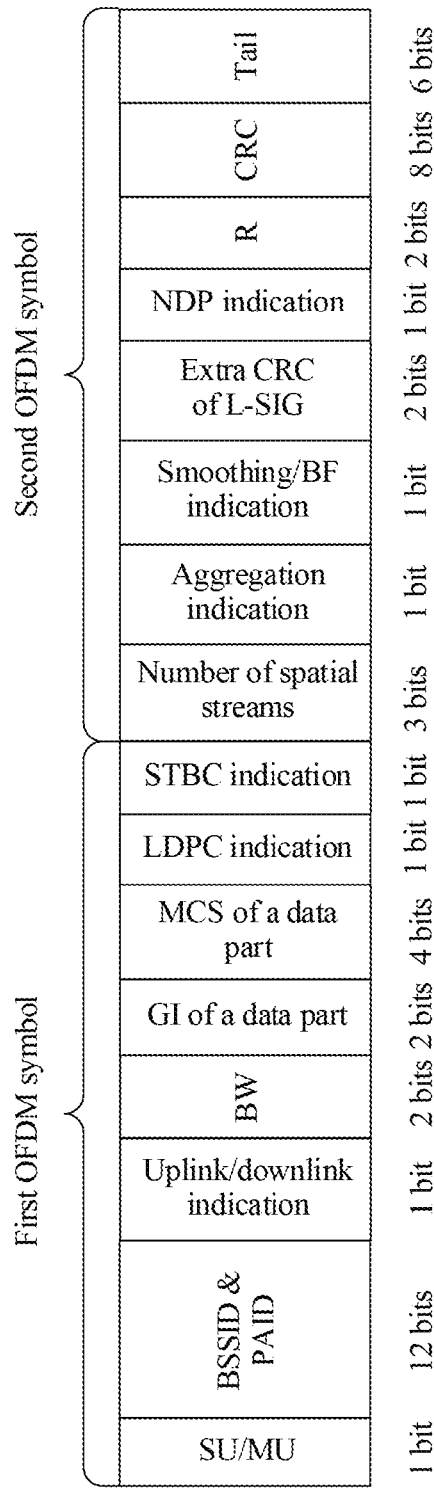

Certainly, an implementation manner of the present embodiments further includes another specific frame structure. For example, when an SU/MU field indicates SU transmission, that is, in an SU scenario, when the first signaling HE-SIG-A is repeatedly transmitted, in the subcarrier allocation manner in the 802.11a, on each bandwidth of 20 MHz of the channel in the BSS established by the AP, the first signaling HE-SIG-A may include two OFDM symbols, and signaling information carried on each OFDM symbol is shown in FIG. 40d. Optionally, the HE-SIG-A may include four OFDM symbols, where the second OFDM symbol has content of the first OFDM symbol, and the fourth OFDM symbol has content of the third OFDM symbol, that is, the second OFDM and the fourth OFDM symbols are respectively repetitions of the first OFDM symbol and the third OFDM in a time domain. In this case, content carried on the first symbol, the second symbol, the third symbol, and the fourth symbol are shown in FIG. 40e. Optionally, each OFDM symbol may also be repeated in a frequency domain, and each OFDM symbol carries 12-bit information. Content, of the HE-SIG-A, carried by using four OFDM symbols that are repeated in the frequency domain may be represented by using FIG. 40e.

Figure 40F:
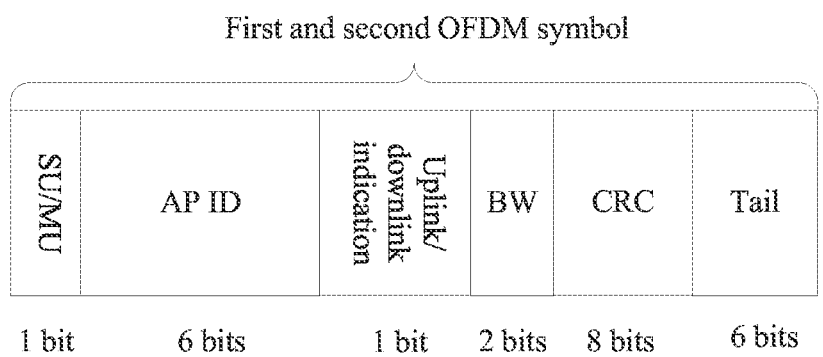
Figure 40G:
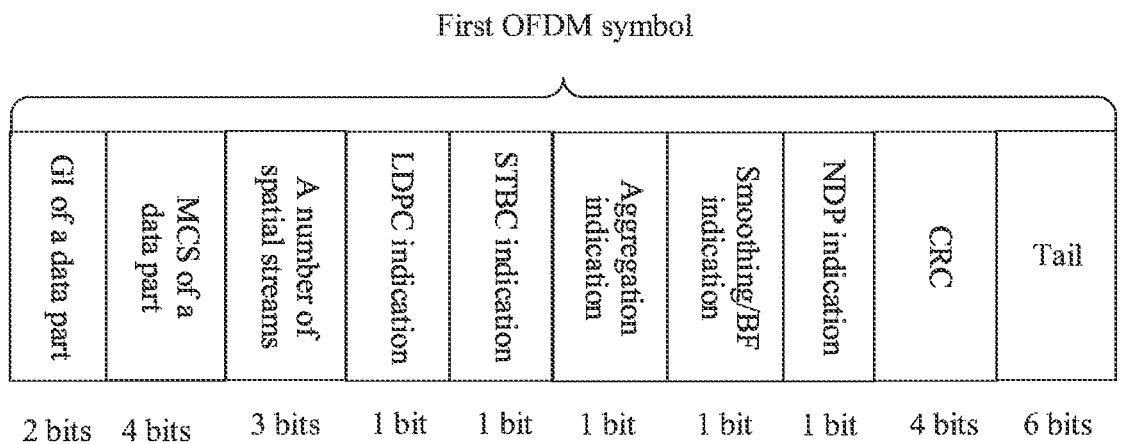
Figure 40H:
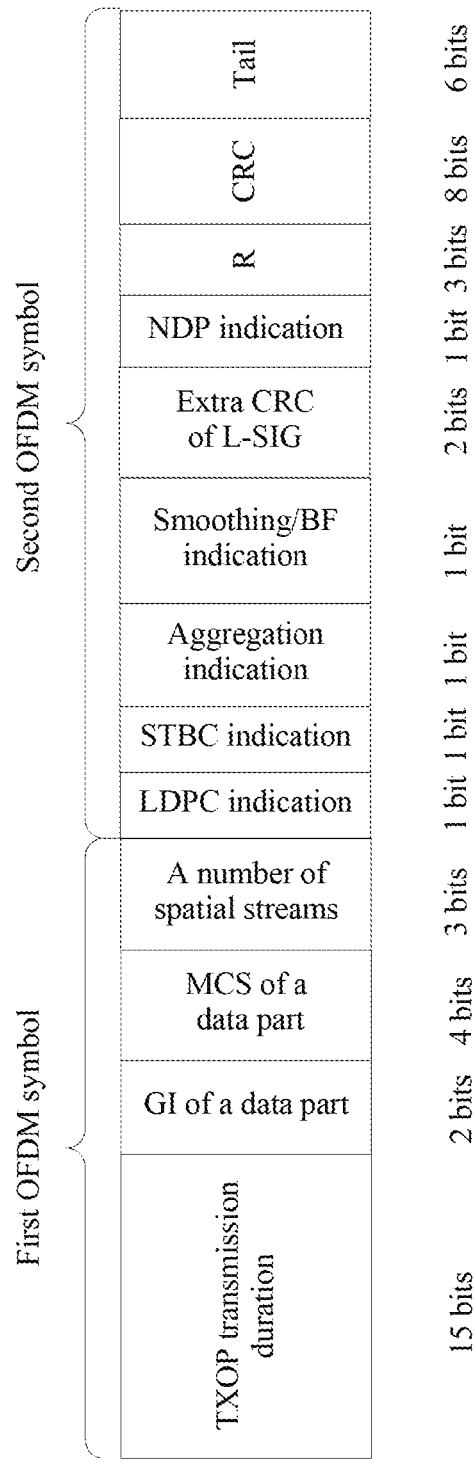

Optionally, during SU transmission, to ensure transmission reliability of the HE-SIG-A, when symbols of the HE-SIG-A are repeated in a time domain, only two repeated symbols may be used to carry information of the HE-SIG-A. As shown in FIG. 40f, the second OFDM symbol is a repetition of the first OFDM in the time domain. Optionally, each symbol may be repeated in a frequency domain of the symbol, and in this case, content, of the HE-SIG-A, carried on the two symbols may also be represented by using FIG. 40f. When the HE-SIG-A is carried by using only two symbols repeated in the time domain or in the frequency domain shown in FIG. 40f, some common signaling needs to be indicated in the HE-SIG-B. The HE-SIG-B may not be transmitted in a time-domain-repetition or frequency-domain-repetition transmission manner, but is independently transmitted on each symbol. Optionally, the HE-SIG-B may be transmitted by using a high-order MCS. Optionally, the HE-SIG-B may not be repeatedly transmitted on each bandwidth of 20 MHz, but is transmitted on an entire channel in the BSS established by the AP. Optionally, the HE-SIG-B may be repeatedly transmitted on each bandwidth of 20 MHz. When the HE-SIG-B is transmitted on a bandwidth of 20 MHz by using an MCS0, content carried by the HE-SIG-B may be shown in FIG. 40g and FIG. 40h. FIG. 40g shows the HE-SIG-B carried by using only one symbol during SU transmission, and FIG. 40h shows content of the HE-SIG-B carried by using two symbols during SU transmission. Optionally, when the HE-SIG-B is transmitted by using a high-order MCS higher than the MCS0 or by using a bandwidth greater than 20 MHz, some or all content carried by the HE-SIG-B may be consistent with FIG. 40g and FIG. 40h, and only combinations of fields on an OFDM symbol may be different.

Figure 40I:
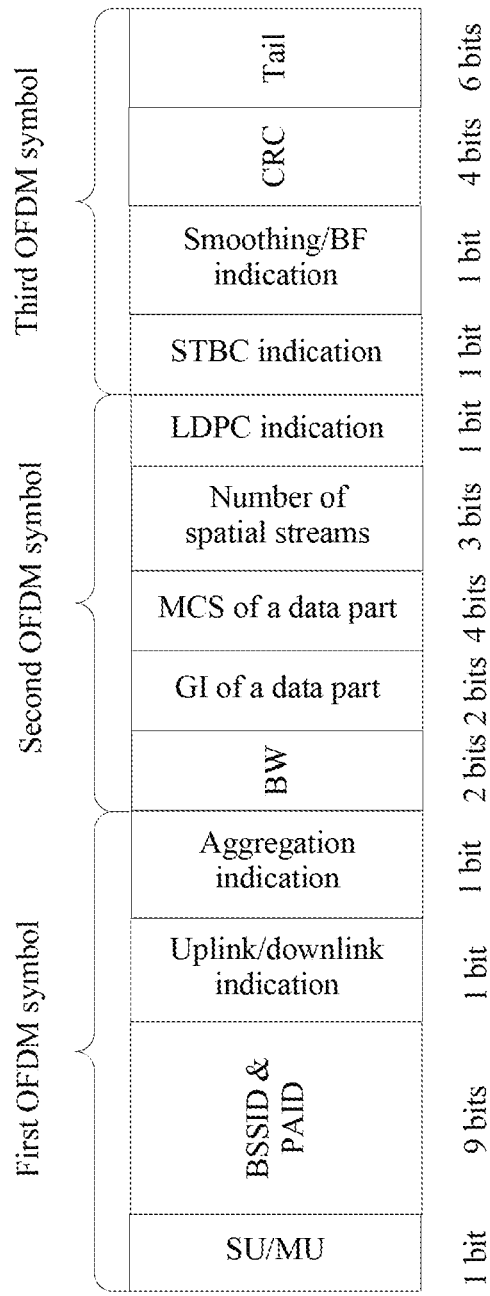
Figure 40J:
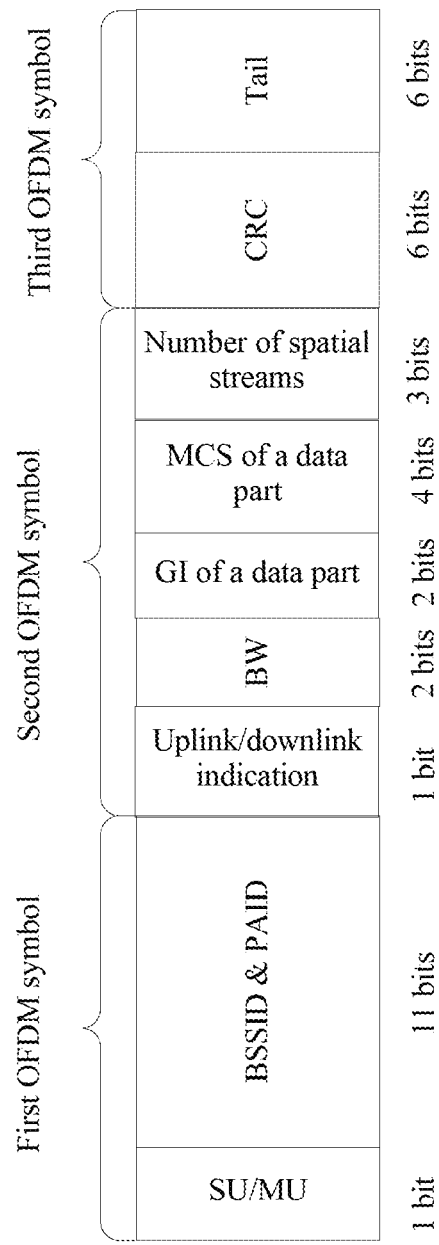
Figure 40K:
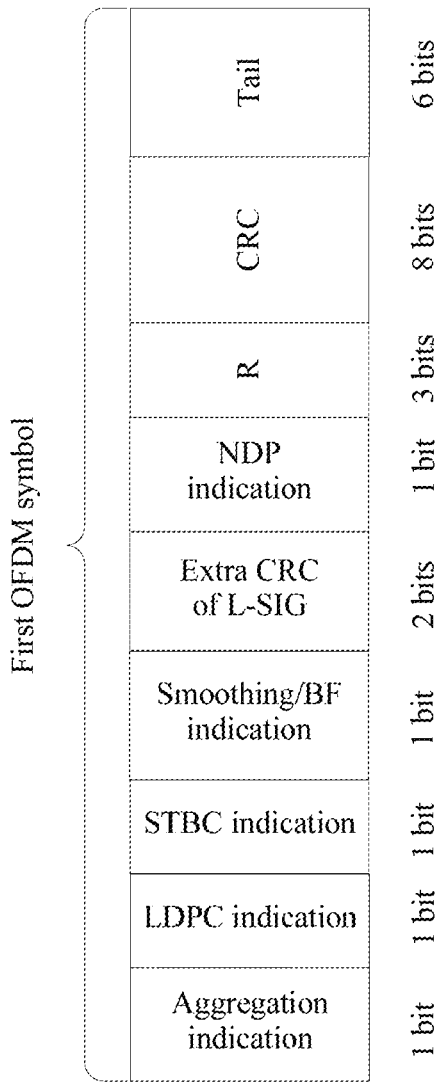
Figure 40L:
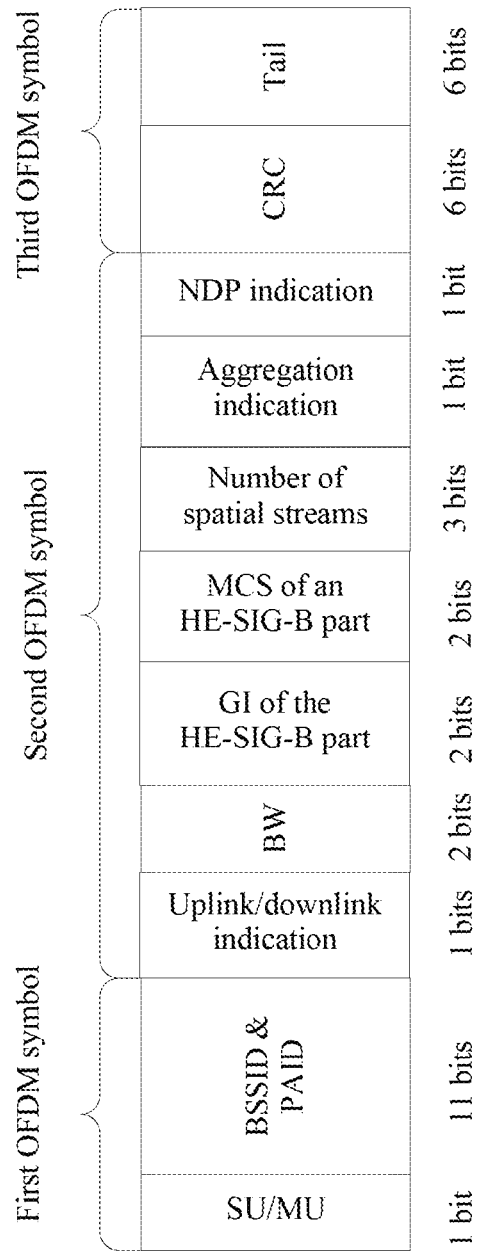
Figure 40M:
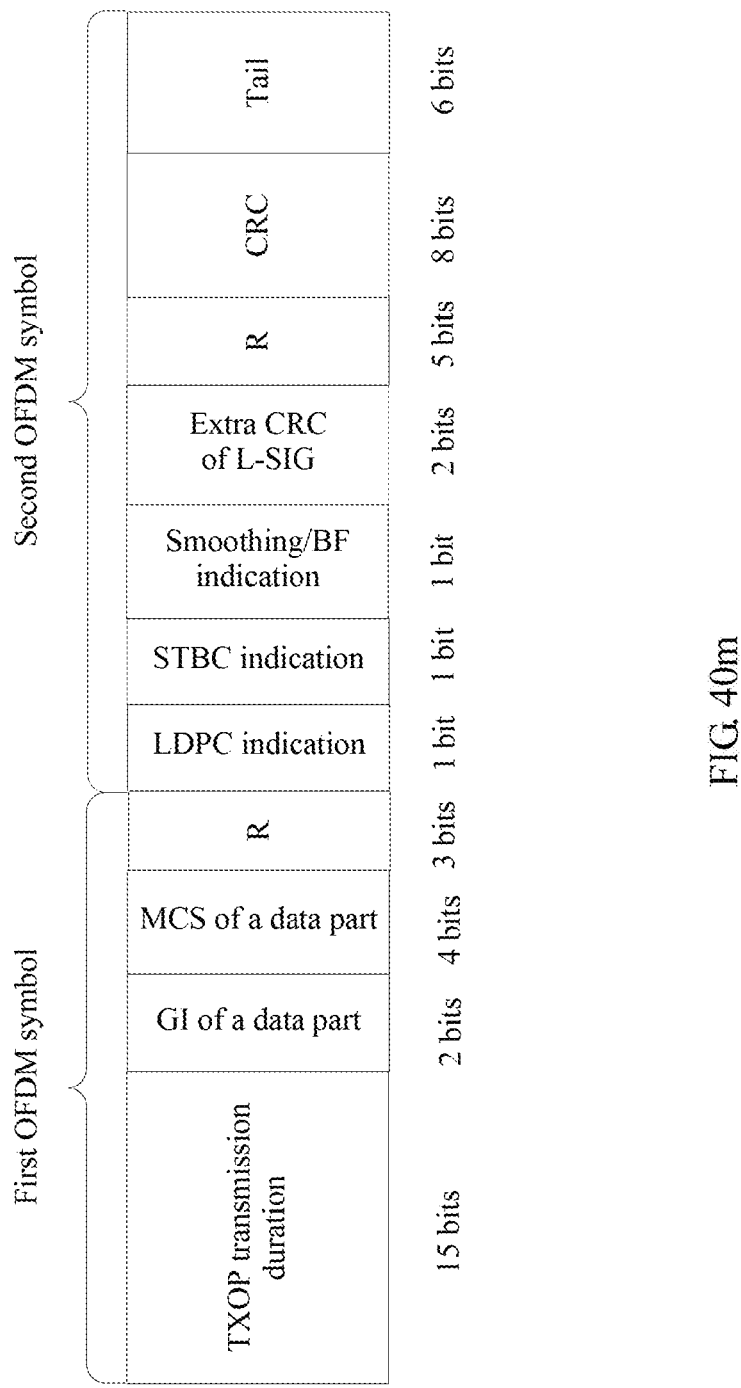

Optionally, during SU transmission, three OFDM symbols may be used to carry the content of the HE-SIG-A, where each symbol is repeated in the frequency domain; therefore, each OFDM symbol can carry 12-bit information. The content, of the HE-SIG-A, carried on the three OFDM symbols may be separately shown in FIG. 40i, FIG. 40j, and FIG. 40l. When the HE-SIG-A shown in FIG. 40i is used, the HE-SIG-B part may not be needed. When the HE-SIG-A shown in FIG. 40j is used, the HE-SIG-B part is needed to supplement a signaling indication during SU transmission. The HE-SIG-B may not be transmitted in a time-domain-repetition or frequency-domain-repetition transmission manner, but is independently transmitted on each symbol. Optionally, the HE-SIG-B may be transmitted by using a high-order MCS. Optionally, the HE-SIG-B may not be repeatedly transmitted on each bandwidth of 20 MHz, but is transmitted on an entire channel in the BSS established by the AP. Optionally, the HE-SIG-B may be repeatedly transmitted on each bandwidth of 20 MHz. When the HE-SIG-B is transmitted on a bandwidth of 20 MHz by using an MCS0, content carried by the HE-SIG-B may be shown in FIG. 40k, where one OFDM symbol is used to carry the content of the HE-SIG-B. Optionally, when the HE-SIG-B is transmitted by using a high-order MCS higher than the MCS0 or by using a bandwidth greater than 20 MHz, some or all content carried by the HE-SIG-B may be consistent with FIG. 40k, and only combinations of fields on an OFDM symbol may be different. During SU transmission and when the HE-SIG-A shown in FIG. 40l is used, the HE-SIG-B part is needed to supplement a signaling indication during the SU transmission. The HE-SIG-B may not be transmitted in a time-domain-repetition or frequency-domain-repetition transmission manner, but is independently transmitted on each symbol. Optionally, the HE-SIG-B may be transmitted by using a high-order MCS. Optionally, the HE-SIG-B may not be repeatedly transmitted on each bandwidth of 20 MHz, but is transmitted on an entire channel in the BSS established by the AP. Optionally, the HE-SIG-B may be repeatedly transmitted on each bandwidth of 20 MHz. When the HE-SIG-B is transmitted on a bandwidth of 20 MHz by using an MCS0, content carried by the HE-SIG-B may be shown in FIG. 40m, where two OFDM symbols are used to carry the content of the HE-SIG-B. Optionally, when the HE-SIG-B is transmitted by using a high-order MCS higher than the MCS0 or by using a bandwidth greater than 20 MHz, some or all content carried by the HE-SIG-B may be consistent with FIG. 40m, and only combinations of fields on an OFDM symbol may be different.

When a signaling structure of HE-SIG-1 is shown in FIG. 40f to FIG. 40m, FIG. 42 exemplarily shows a schematic flowchart of parsing the signaling HEW-SIG-1 by a receive end after receiving a data packet, and details are not repeatedly described herein.

In another example, in a structure shown in FIG. 9a, and in a case of SU transmission, a structure, a field, or a sequence of HE-SIG-1 in a downlink frame may be the same as those in an uplink frame. In a case of MU transmission, content, the structure, and the sequence of the HE-SIG-1 in the downlink frame are described in the foregoing embodiment: and a structure, a field, or a sequence of HE-SIG-1 in the uplink frame, especially a structure, a field, or a sequence of HE-SIG-A may be consistent with those of HE-SIG-A in the downlink frame, but specifically carried content may be different.

Specifically, during uplink transmission, the HE-SIG-A is repeatedly transmitted, in a subcarrier allocation manner in the 802.11a, on each bandwidth of 20 MHz of a channel in a BSS established by an AP. During uplink multi-user transmission, to enable the AP and/or another STA to parse the HE-SIG-A, a STA that performs uplink multi-user transmission needs to transmit the same content in the HE-SIG-A, to ensure that formed air-interface waveforms are consistent. Same waveforms sent by multiple STAs are superposed in the air, so as to form a same wavelength. In this case, HE-SIG-A of each STA carries the same content. Because the STA or the AP learns whether transmission is downlink transmission or uplink transmission only after parsing the HE-SIG-A, a quantity of symbols, a field, and a structure of HE-SIG-A transmitted in the uplink needs to be consistent with those of HE-SIG-A transmitted in the downlink.

To ensure that waveforms of HE-SIG-As sent in the uplink by all STAs in multi-user transmission are consistent, content of fields of the HE-SIG-As sent by all the STAs needs to be the same. Because scheduling is performed by an AP in uplink transmission, and a receive end in the uplink transmission is the AP, the AP knows related parameter information and resource configuration information of the uplink transmission. In this way, transmission parameters and resource configuration information of HE-SIG-A in the uplink multi-user transmission may be configured by default, for example, values of fields in HE-SIG-As of all STAs in the uplink multi-user transmission are set to 0, or to a specific default field or sequence.

However, some fields need to indicate corresponding information to a receive end or another STA, and the fields cannot be set to a default value, but need to indicate corresponding information according to an actual status. These fields include but are not limited to an SU/MU indication field, an AP ID field, a TXOP transmission duration field, and the like. The SU/MU indication field needs to indicate that a following radio frame is single-user transmission SU or multi-user transmission MU; therefore, the indication needs to be performed according to an actual status, so that the receive end performs receiving according to a correct frame format. The AP ID field is used to indicate information about an AP related to the wireless packet, so that another AP or STA determines whether the radio frame is related to the AP or STA. If the radio frame is related to the AP or STA, the AP or STA continues to receive and parse the wireless packet. If the radio frame is not related to the AP or STA, the AP or STA directly quits receiving or stops parsing. Therefore, the AP ID field also needs to perform indication according to an actual status, and cannot be randomly configured by default. The TXOP transmission duration field is used to indicate a remaining duration of a current scheduling period of an AP, so that another AP or STA obtains information about the remaining duration of occupying a channel, and configures NAV information. Therefore, the TXOP transmission duration field also needs to be configured according to an actual status, instead of being randomly configured by default.

It should be noted that, even if the SU/MU indication field, the AP ID field, the TXOP transmission duration field, and the like need to perform indication according to an actual status and cannot be randomly configured, configurations of the fields of STAs in uplink multi-user transmission need to be the same, that is, content carried by SU/MU indication fields, AP ID fields, and TXOP transmission duration fields of the STAs in uplink multi-user transmission need to be identical. The SU/MU indication field is used to indicate single-user transmission or multi-user transmission, and therefore, the SU/MU indication fields of the STAs in the uplink multi-user transmission are easily consistent with each other. The AP ID field is used to indicate information about an AP related to a following radio frame, and because the STAs in uplink multi-user transmission perform uplink transmission to a same AP, the AP ID fields of the STAs in uplink multi-user transmission are easily consistent with each other. The TXOP transmission duration field is used to indicate a remaining duration of a current scheduling period of an AP, so that another AP or STA obtains information about the remaining duration of occupying a channel, and configures NAV information. For the STAs in uplink multi-user transmission, the information is consistent; but, the information needs to be calculated according to a TXOP transmission duration and a duration of a downlink frame that are indicated in an SIG part in the downlink frame. Optionally, an inter-frame duration of transition between a downlink and an uplink, and a duration of a preamble (the preamble may include two parts: a legacy preamble and an HEW-preamble) before a downlink frame and/or an uplink frame are further needed to perform calculation.

It should be noted, the SU herein means that only one station (user) performs transmission, and the MU means that multiple stations (users) simultaneously perform transmission, and includes but is not limited to manners such as MU-MIMO and OFDMA. The foregoing figures and descriptions thereof are examples of content carried by the HE-SIG-A or the HE-SIG-B, and a specific order of fields may be adjusted, or only some fields or a combination of some fields may be carried.

What is claimed is:

1. An apparatus, comprising:
a processor, configured to generate a physical protocol data unit (PPDU) for a downlink multiple-user transmission, wherein the PPDU includes: a legacy preamble, a high efficiency Wi-Fi Signaling Field 1 (HEW-SIG1), a high efficiency Wi-Fi Signaling Field 2 (HEW-SIG2), adjacent to the HEW-SIG1, and a data portion, and wherein the HEW-SIG1 comprises a HEW-SIG2 modulation and coding scheme (HEW-SIG2 MCS) field, the HEW-SIG2 MCS field indicates a transmission modulation and coding scheme (MCS) used to transmit the HEW-SIG2, the HEW-SIG1 further comprises a frame structure indication field, and the frame structure indication field indicates whether a frame structure of a scheduling transmission is an uplink structure or a downlink structure, and the HEW-SIG2 comprises resource indication information; and a transmitter coupled to the processor, wherein the transmitter is configured to send the PPDU in a wireless local area network (WLAN).

2. The apparatus according to claim 1, wherein the resource indication information in the HEW-SIG2 comprises resource locations for communicating data by multiple users.

3. The apparatus according to claim 1, wherein the HEW-SIG1 further comprises a HEW-SIG2 length field, and the HEW-SIG2 length field indicates a length of HEW-SIG2 signaling.

4. The apparatus according to claim 1, wherein the HEW-SIG1 further comprises a duration field, and the duration field indicates a remaining duration of occupying a channel.

5. The apparatus according to claim 1, wherein the legacy preamble includes: a legacy short training field (L-STF), a legacy long training field (L-LTF), and a legacy signaling (L-SIG) located after the L-LTF, and wherein the L-SIG includes information usable for identifying a rate and length information of the PPDU.

6. The apparatus according to claim 1, wherein the HEW-SIG1 further comprises a transition time field indicating a downlink-uplink transition time point.

7. The apparatus according to claim 1, wherein the apparatus is an access point.

8. The apparatus according to claim 1, wherein the apparatus is a chip in an access point.

9. An apparatus, comprising:
a receiver, configured to receive a physical protocol data unit (PPDU) for a downlink multiple-user transmission, wherein the PPDU includes: a legacy preamble, a high efficiency Wi-Fi Signaling Field 1 (HEW-SIG1), a high efficiency Wi-Fi Signaling Field 2 (HEW-SIG2) adjacent to the HEW-SIG1, and a data portion, and wherein the HEW-SIG1 comprises a HEW-SIG2 modulation and coding scheme (HEW-SIG2 MCS) field, the HEW-SIG2 MCS field indicates a transmission modulation and coding scheme (MCS) used to transmit the HEW-SIG2, the HEW-SIG1 further comprises a frame structure indication field, and the frame structure indication field indicates whether a frame structure of a scheduling transmission is an uplink structure or a downlink structure, and the HEW-SIG2 comprises resource indication information; and a processor coupled to the receiver, wherein the processor is configured to parse the PPDU to obtain the data portion according to the HEW-SIG1 and the HEW-SIG2; and wherein the apparatus is applied in a wireless local area network (WLAN).

10. The apparatus according to claim 9, wherein the resource indication information in the HEW-SIG2 comprises resource locations for communicating data by multiple users.

11. The apparatus according to claim 9, wherein the HEW-SIG1 further comprises a HEW-SIG2 length field, and the HEW-SIG2 length field indicates a length of HEW-SIG2 signaling.

12. The apparatus according to claim 9, wherein the HEW-SIG1 further comprises a duration field, and the duration field indicates a remaining duration of occupying a channel.

13. The apparatus according to claim 9, wherein the legacy preamble includes: a legacy short training field (L-STF), a legacy long training field (L-LTF), and a legacy signaling (L-SIG) located after the L-LTF, and wherein the L-SIG includes information for identifying a rate and length information of the PPDU.

14. The apparatus according to claim 9, wherein the HEW-SIG1 further comprises a transition time field indicating a downlink-uplink transition time point.

15. The apparatus according to claim 9, wherein the apparatus is a station.

16. The apparatus according to claim 9, wherein the apparatus is a chip in a station.

17. The apparatus according to claim 1, wherein the HEW-SIG2 MCS field is located in the HEW-SIG1 field between a guard interval (GI) and a HEW-SIG2 length field.

18. The apparatus according to claim 17, wherein the HEW-SIG2 MCS field is two bits, the HEW-SIG2 length field is five bits, and the GI field is two bits.

19. The apparatus according to claim 1, wherein the HEW-SIG1 field further comprises, in sequence, an access point identifier field, a bandwidth field, a guard interval field, the HEW-SIG2 MCS field, a HEW-SIG2 length field, and a frame structure identifier field.

20. The apparatus according to claim 19, wherein the access point identifier field is a longest field in the HEW-SIG1 field.

* * * * *